(12) United States Patent
Shinoda et al.

(10) Patent No.: US 12,546,545 B2
(45) Date of Patent: Feb. 10, 2026

(54) ALUMINUM ALLOY HEAT EXCHANGER

(71) Applicant: DENSO CORPORATION, Kariya (JP)

(72) Inventors: Takahiro Shinoda, Kariya (JP); Shogo Yamada, Kariya (JP); Nobuhiro Honma, Kariya (JP); Naoki Sugimoto, Kariya (JP); Taketoshi Toyama, Kariya (JP)

(73) Assignee: DENSO CORPORATION, Kariya (JP)

( * ) Notice: Subject to any disclaimer, the term of this patent is extended or adjusted under 35 U.S.C. 154(b) by 679 days.

(21) Appl. No.: 17/962,695

(22) Filed: Oct. 10, 2022

(65) Prior Publication Data

US 2023/0050357 A1 Feb. 16, 2023

Related U.S. Application Data

(62) Division of application No. 16/595,565, filed on Oct. 8, 2019, now abandoned.

(30) Foreign Application Priority Data

Oct. 10, 2018 (JP) .................. 2018-192060

(51) Int. Cl.
*F28F 21/08* (2006.01)
*B21D 53/02* (2006.01)
(Continued)

(52) U.S. Cl.
CPC ............ *F28F 21/084* (2013.01); *B21D 53/02* (2013.01); *B23K 1/0012* (2013.01);
(Continued)

(58) Field of Classification Search
CPC .......... F28F 21/084; F28F 21/08; F28F 3/025; F28F 1/126; F28D 1/053; F28D 19/005;
(Continued)

(56) References Cited

U.S. PATENT DOCUMENTS

| 4,203,490 A | 5/1980 | Terai et al. |
| 5,125,452 A | 6/1992 | Yamauchi et al. |

(Continued)

FOREIGN PATENT DOCUMENTS

| CN | 106944762 A | 7/2017 |
| DE | 102006057314 A1 | 8/2007 |

(Continued)

*Primary Examiner* — Harry E Arant
(74) *Attorney, Agent, or Firm* — Harness, Dickey & Pierce, P.L.C.

(57) ABSTRACT

Mg and Bi are contained in each of a first fillet in a first braze joining portion in which a tube and a fin join, a second fillet in a second braze joining portion in which the tube and a header plate join, and a third fillet in a third braze joining portion in which the header plate and a tank body join. A concentration of Mg of each of the first to third fillets is from 0.2% or more to 2.0% or less by mass. When the tube includes a brazing material layer, a concentration of Mg of the tube at its plate thickness center is from 0.1% or more to 1.0% or less by mass. When the fin includes a brazing material layer, a concentration of Mg of the fin at its plate thickness center is from 0.2% or more to 1.0% or less by mass.

6 Claims, 38 Drawing Sheets

(51) Int. Cl.
*B23K 1/00* (2006.01)
*B23K 35/28* (2006.01)
*F28D 1/053* (2006.01)
*B23K 101/14* (2006.01)
*B23K 103/10* (2006.01)

(52) U.S. Cl.
CPC ............ *B23K 35/286* (2013.01); *F28D 1/053* (2013.01); *B23K 2101/14* (2018.08); *B23K 2103/10* (2018.08)

(58) Field of Classification Search
CPC ... F28D 1/0333; F28D 1/05366; B21D 53/02; B23K 1/00; B23K 35/28; B23K 35/286; B23K 1/0012; B23K 2103/10; B23K 2101/14
See application file for complete search history.

(56) References Cited

U.S. PATENT DOCUMENTS

| | | |
|---|---|---|
| 2007/0131404 A1 | 6/2007 | Overbury et al. |
| 2017/0045316 A1 | 2/2017 | Terayama et al. |
| 2018/0133845 A1* | 5/2018 | Itoh .......................... F28F 9/16 |
| 2018/0214964 A1 | 8/2018 | Itoh et al. |
| 2020/0116444 A1 | 4/2020 | Shinoda et al. |

FOREIGN PATENT DOCUMENTS

| | | |
|---|---|---|
| DE | 112016005165 T5 | 7/2018 |
| JP | H03-77776 A | 4/1991 |
| JP | 2008-100283 A | 5/2008 |
| JP | 2012-055895 A | 3/2012 |
| JP | 2013-001941 A | 1/2013 |
| JP | 2016003356 A | 1/2016 |
| JP | 2016-215248 A | 12/2016 |
| JP | 2018-158371 A | 10/2018 |
| WO | WO-2015/162911 A1 | 10/2015 |

* cited by examiner

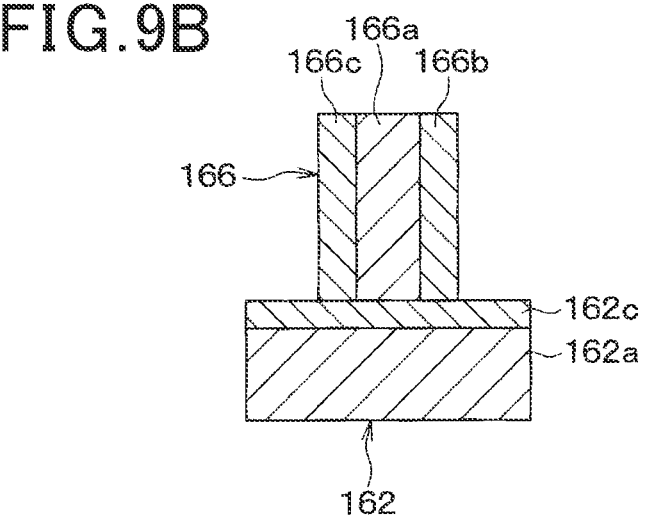
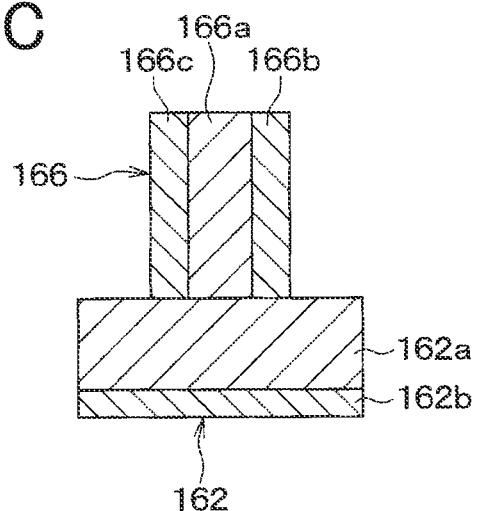
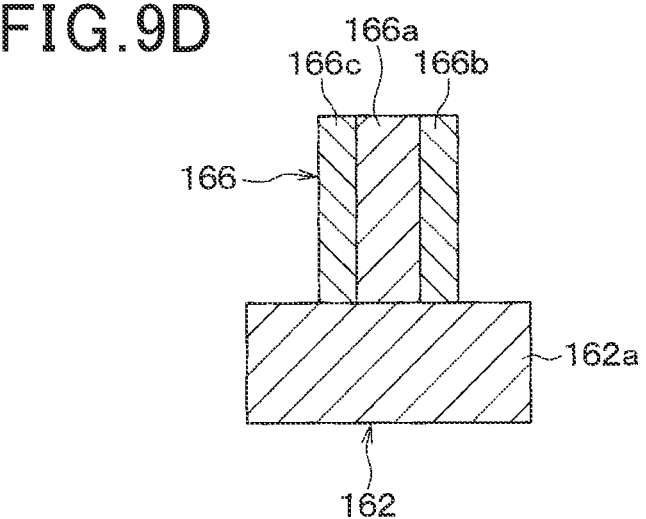

ALUMINUM ALLOY HEAT EXCHANGER

CROSS-REFERENCE TO RELATED APPLICATION

This patent application is a divisional application of U.S. patent application Ser. No. 16/595,565 filed on Oct. 8, 2019 which is based on and claims priority to Japanese Patent Application 2018-192060, filed on Oct. 10, 2018 in the Japan Patent Office, the entire disclosure of which is hereby incorporated by reference herein.

BACKGROUND

Technical Field

Embodiments of this disclosure relate to a heat exchanger and a method of manufacturing the heat exchanger.

Related Art

A technology of brazing an aluminum member in an inert gas atmosphere without using flux is known. With the known technology, the aluminum member is brazed in a lower oxygen concentration environment than the atmosphere at atmospheric pressure without using flux or vacuum. To effectively join a hollow structure and a cylindrical member together, a known technology specifies material of each of components of the hollow structure.

However, since an aluminum alloy heat exchanger is configured by multiple components respectively having different plate thicknesses from the other, the heat exchanger necessarily includes a relatively thinner plate having a given thickness and a thicker plate thicker than the thinner plate. Hence, the heat exchanger includes three types of braze joining portions including a braze joining portion in which thin plates join, a braze joining portion in which the thin and thick plates join and a braze joining portion in which the thick plates join. Accordingly, when performing flux-less brazing to produce the heat exchanger made of aluminum in the inert gas atmosphere, three types of braze joining portions need to be satisfactorily formed.

However, the known technology does not specify conditions of forming the three types of braze joining portions, and simply discusses material of one of the members of the heat exchanger. Hence, even if one of the three types of braze joining portions is preferably formed, remaining braze joining portions cannot preferably be formed. That is, all of the three types of braze joining portions are not preferably formed at the same time. Further, in the flux-less brazing, a braze-joining process can be performed at a higher pressure than atmospheric pressure.

In this point of view, it is an object of the present disclosure to provide a heat exchanger made of aluminum with joining portions properly brazed in a lower oxygen concentration than the atmosphere at either atmospheric pressure or a pressure higher than atmospheric pressure. It is also an object of the present disclosure to provide a method of manufacturing such a heat exchanger.

SUMMARY

Accordingly, one aspect of the present disclosure provides a novel aluminum alloy heat exchanger produced by excluding flux capable resolving a conventional problem as discussed in Japanese unexamined Patent Application Publication No. 2016-215248 (JPA-2016-215248-A). That is, the novel aluminum alloy heat exchanger includes: a flow channel forming member to form a flow channel in which a fluid flows through; and a heat transfer member having a heat transfer surface. The heat transfer member is joined to a flow channel forming surface of the flow channel forming member. The heat transfer surface is wider than the flow channel forming surface. The novel aluminum alloy heat exchanger also includes: a tank member joined to the flow channel forming member to form a tank space communicating with the flow channel of the flow channel forming member; a joining member joined to the tank member; and a first fillet formed in a first braze joining portion, in which the heat transfer member and the flow channel forming member join with each other. The novel aluminum alloy heat exchanger also includes: a second fillet formed in a second braze joining portion in which the flow channel forming member and the tank member join with each other; and a third fillet formed in a third braze joining portion in which the tank member and the joining member join with each other. The flow channel forming member, the heat transfer member, the tank member and the joining member are composed of aluminum alloys, respectively. An average plate thickness of the flow channel forming member is from 0.100 mm or more to 0.400 mm or less, an average plate thickness of the heat transfer member is from 0.025 mm or more to 0.150 mm or less, an average plate thickness of the tank member is from 0.500 mm or more to 2.000 mm or less, and an average plate thickness of the joining member is from 0.500 mm or more to 2.000 mm or less. Each of the first to third fillets is composed of an aluminum alloy contains magnesium, bismuth and silicon. A concentration of the magnesium of each of the fillets ranging from 0.2% or more to 2.0% or less by mass. At least one of the flow channel forming member and the heat transfer member includes a brazing material layer on a surface thereof. When the flow channel forming member includes the brazing material layer, a concentration of the magnesium of the flow channel forming member at its plate thickness center is from 0.1% or more to 1.0% or less by mass. When the heat transfer member includes the brazing material layer, a concentration of the magnesium of the heat transfer member at its plate thickness center is from 0.2% or more to 1.0% or less by mass.

In another aspect of the present disclosure, a novel aluminum alloy heat exchanger produced by excluding flux includes: a flow channel forming member to form a flow channel in which a fluid flows through; and a heat transfer member having a heat transfer surface. The heat transfer member is joined to a flow channel forming surface of the flow channel forming member. The heat transfer surface is wider than the flow channel forming surface. The novel aluminum alloy heat exchanger excluding flux further includes: a reinforcing member joined to the flow channel forming member to reinforce the flow channel forming member; a joining member joined to the reinforcing member; and a first fillet formed in a first braze joining portion in which the heat transfer member and the flow channel forming member join with each other. The novel aluminum alloy heat exchanger excluding flux further includes: a second fillet formed in a second braze joining portion in which the flow channel forming member and the tank member join with each other; and a third fillet formed in a third braze joining portion in which the reinforcing member and the joining member join with each other. The flow channel forming member, the heat transfer member, the reinforcing member and the joining member are composed of aluminum alloys, respectively. An average plate thickness of the flow channel forming member is from 0.200 mm or more to 0.600 mm or less. An average plate thickness of the heat transfer member is from 0.025 mm or more to 0.150 mm or less. An average plate thickness of the reinforcing member is from 0.600 mm or more to 2.000 mm or less. An average plate thickness of the joining member is from 0.600 mm or more to 2.000 mm or less. Each of the first to third fillets is composed of an aluminum alloy containing magnesium, bismuth and silicon. A concentration of the magnesium of each of the first to third fillets is from 0.2% or more to 2.0% or less by mass. At least one of the flow channel forming member and the heat transfer member includes a brazing material layer on a surface thereof. When the flow channel forming member includes the brazing material layer, a concentration of the magnesium of the flow channel forming member at its plate thickness center is from 0.1% or more to 1.0% or less by mass. When the heat transfer member includes the brazing material layer, a concentration of the magnesium of the heat transfer member at its plate thickness center is from 0.2% or more to 1.0% or less by mass.

In yet another aspect of the present disclosure, a method of manufacturing the heat exchanger includes the steps of: assembling components into the heat exchanger; placing an assembly of the heat exchanger in an oxygen concentration ambience lower than the atmosphere at either atmospheric pressure or a pressure higher than atmospheric pressure; and brazing components of the heat exchanger without coating flux thereon. That is, according to one embodiment of the present disclosure, as each of components of the heat exchanger before brazing, each of components configured to meet the above-described conditions after brazing is used. Subsequently, in the environment of lower oxygen concentration than the atmosphere at either atmospheric pressure or a pressure higher than atmospheric pressure, the heat exchanger is brazed without using flux. With this, three types of braze joining portions including the braze joining portion in which two thin plates join, the braze joining portion in which the thin and thick plates join and the braze joining portion in which two thick plates join can be satisfactory formed. Specifically, the heat exchanger can be satisfactorily brazed at the joining portions.

BRIEF DESCRIPTION OF THE DRAWINGS

A more complete appreciation of the present disclosure and many of the attendant advantages of the present disclosure will be more readily obtained as substantially the same becomes better understood by reference to the following detailed description when considered in connection with the accompanying drawings, wherein:

FIGS. 9A to 9F are enlarged views illustrating typical examples of a section IX illustrated in FIG. 8;

DETAILED DESCRIPTION

Figure 1:
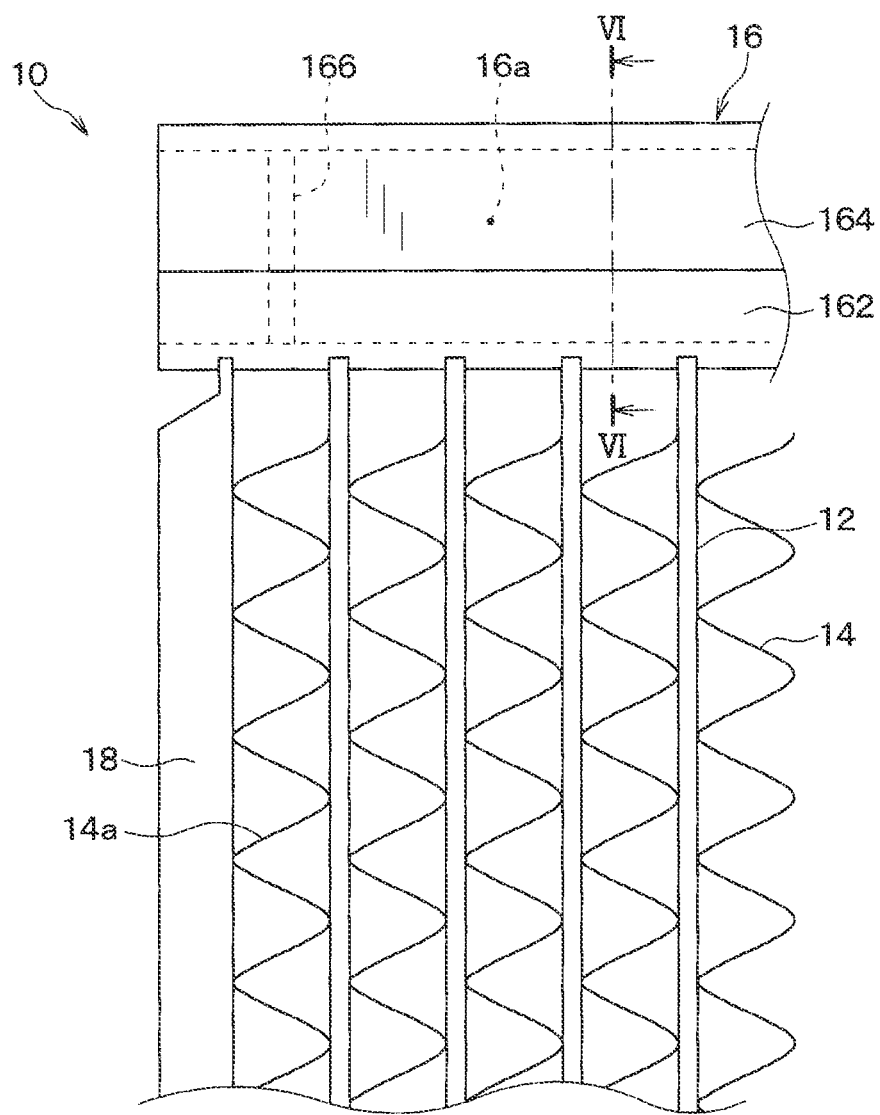
FIG. 1 is a cross-sectional view illustrating a heat exchanger according to a first embodiment of the present disclosure.

Referring now to the drawings, wherein like reference numerals designate identical or corresponding parts throughout the several views thereof, and to FIG. 1, a first embodiment of the present disclosure is described. As shown in FIG. 1, a heat exchanger 10 is a fin-tube type heat exchanger in this embodiment. The heat exchanger 10 includes multiple tubes 12 and multiple fins 14, two header tanks 16 and two side plates 18. In FIG. 1, however, only one of the two header tanks 16 is illustrated. Also, only one of the two side plates 18 is illustrated. The heat exchanger 10 exchanges heats of a first fluid flown in the multiple tubes 12 and a second fluid flown outside of the multiple tubes 12.

The tube 12 is a tubular flow channel forming member to form a flow channel for the first fluid. The tube 12 is prepared by molding an aluminum alloy plate into a hollow structure. The tube 12 is also a seam welded pipe prepared by machining a sheet metal. However, the tube 12 can be an extruded perforated pipe. The multiple tubes 12 are disposed in one direction at a given interval.

In this embodiment, the fin 14 is composed of an outer fin type placed outside of the tube 12. The fin 14 is a heat transfer member having a wider heat transfer surface than an outer surface of the tube 12. The fin 14 promotes heat transfer between the primary fluid in the tube 12 and the second fluid outside the tube 12. The fin 14 is a corrugate fin type prepared by molding an aluminum alloy plate into a corrugated state. However, the fin 14 can be molded into a different shape than the corrugated state.

Each of the multiple fins 14 is positioned between adjacent tubes 12 among the multiple tubes 12. However, a part 14a of the multiple fins 14 is placed between the side plate 18 and the tube 12.

Figure 2:
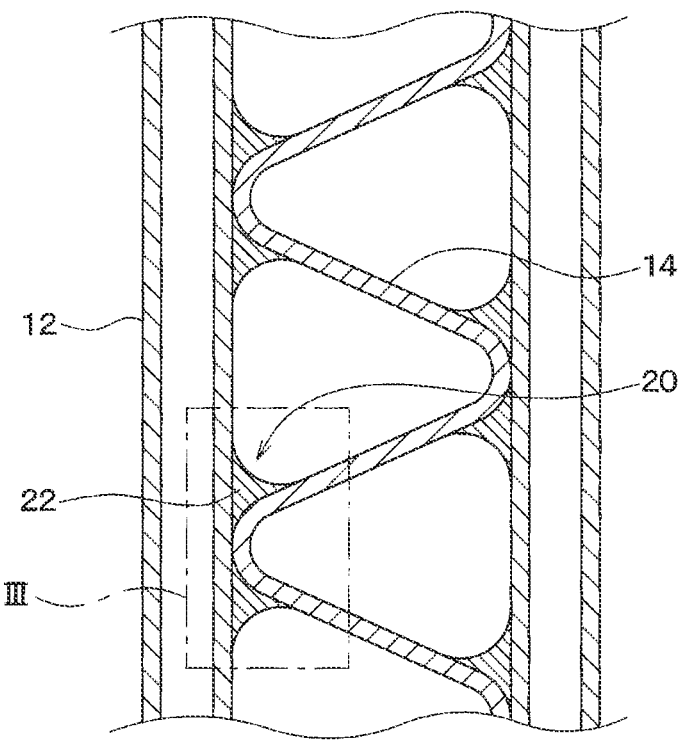
FIG. 2 is a cross-sectional view illustrating a tube and a fin illustrated in FIG. 1.

As shown in FIG. 2, the fin 14 is brazed to an outside of the tube 12. In a braze joining portion 20, in which the tube 12 and the fin 14 join, a fillet 22 is formed. In the claimed invention, the fillet 22 corresponds to a first fillet in the braze joining portion formed the heat transfer member and the flow channel forming member. Specifically, the braze joining portion 20 includes a first brazing material portion sandwiched between these members 12 and 14 joined together and the fillet 22 acting as a second brazing material portion spreading from the first brazing material portion.

As illustrated FIGS. 3A to 3F, each of the tube 12 and the fin 14 can employ various layer structures and can be combined with each other in various manners, wherein a fillet 22 is intentionally omitted for the purpose of simplicity. As shown in FIGS. 3A to 3F, a brazing material layer 122 is provided on at least one of surfaces of the tube 12 and the fin 14.

Figure 3A:
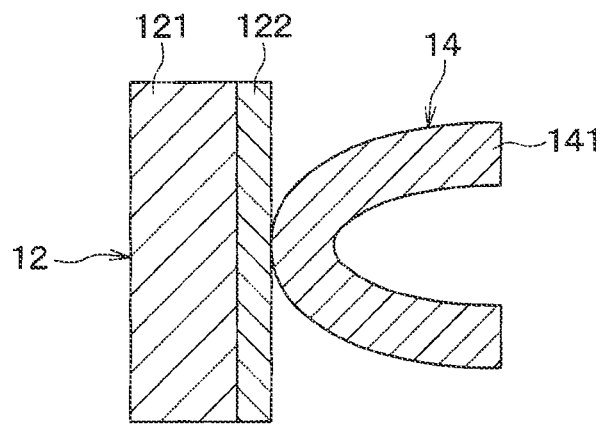
FIGS. 3A to 3F are enlarged views illustrating typical examples of a section III illustrated in FIG. 2, respectively.

In an example of FIG. 3A, the tube 12 includes a core material layer 121 and a brazing material layer 122. The brazing material layer 122 is located on an outside of the tube 12 facing the fin 14. The fin 14 may consist only of a core material layer 141. In an example of FIG. 3B, the tube 12 includes a core material layer 121 and two brazing material layers 122 and 123. More specifically, the brazing material layer 123 is located inside of the tube 12. The fin 14 may consist only of a core material layer 141 as well.

Figure 3B:
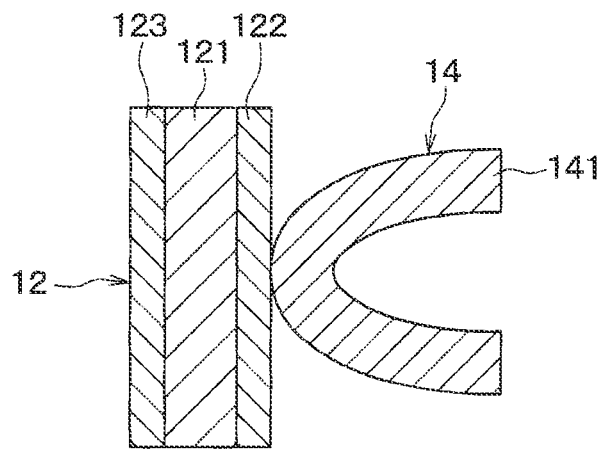
Figure 3C:
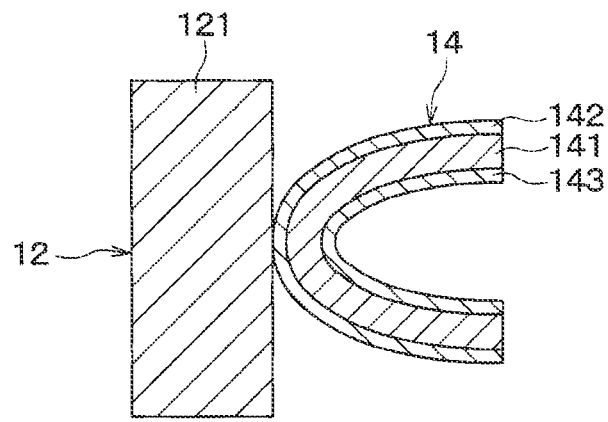

In an example of FIG. 3C a tube 12 may consist only of a core material layer 121. A fin 14 includes a core material layer 141 and two brazing material layers 142 and 143. The two brazing material layers 142 and 143 are located on both sides of the core material layer 141, respectively. In the example of FIG. 3C, the tube 12 is either a seam welded pipe or an extruded perforated pipe. In an example of FIG. 3D, a tube 12 includes a core material layer 121 and a brazing material layer 123. A fin 14 includes a core material layer 141 and two brazing material layers 142 and 143.

Figure 3D:
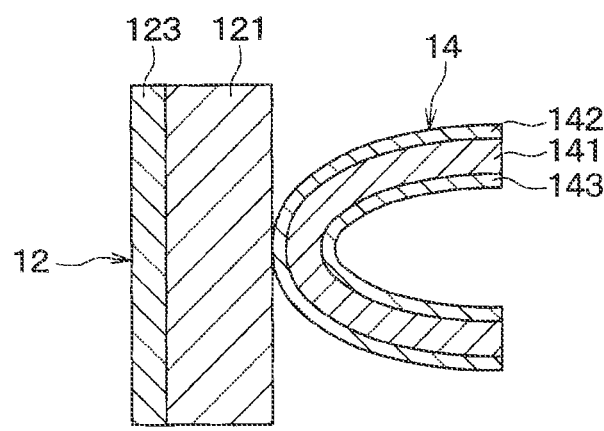
Figure 3E:
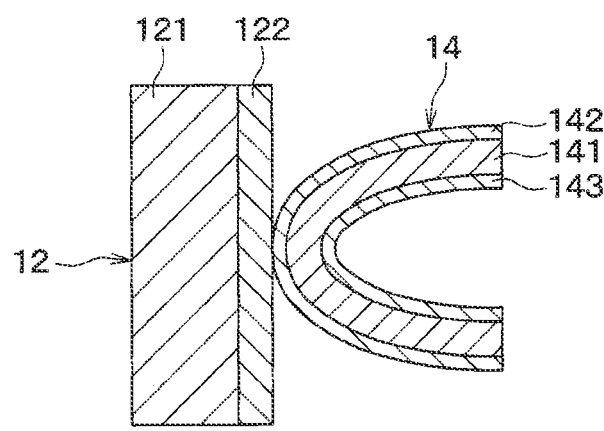

In an example of FIG. 3E, a tube 12 includes a core material layer 121 and a brazing material layer 122. A fin 14 includes a core material layer 141 and two brazing material layers 142 and 143. Further, in an example of FIG. 3F, a tube 12 includes a core material layer 121 and two brazing material layers 122 and 123. A fin 14 also includes a core material layer 141 and two brazing material layers 142 and 143. Hence, in each of the examples of FIGS. 3E and 3F, the brazing material layer 142 of the tube 12 is joined to the brazing material layer 122 of the fin 14. Further, depending on a situation, the brazing material layer 122 of the tube 12 is joined to the brazing material layer 143 of the fin 14.

Here, each of the core material layer 121 of the tube 12 and of the core material layer 141 of the fin 14 is composed of an Al—Mn-based alloy. Each of the brazing material layers 122 and 123 of the tube 12 is composed of an Al—Si-based alloy. Also, each of the brazing material layers 142 and 143 of the fin 14 is composed of an Al—Si-based alloy. Here, an inner fin can be placed inside of the tube 12. The inner fin can serve as a heat transfer member having a heat transfer surface wider than an inner surface of the tube 12. The inner fin is brazed to the inner surface of the tube 12. Like the fin 14, a fillet corresponding to the first fillet is formed in a braze joining portion in which the inner fin and the tube 12 join. The inner fin can employ various layer structures and the tube 12 and the inner fin can be combined with each other in various manners as the tube 12 and the fin 14 are combined. Further, a fin that meets a requirement met by the fin 14 as described below is employed as the inner fin.

The header tank 16 of FIG. 1 includes a tank space 16a communicating with the multiple tubes 12. Hence, the header tank 16 distributes fluid to the multiple tubes 12 and collects fluid from the multiple tubes 12. The header tank 16 includes a header plate 162, a tank body 164 and a separator 166.

Figure 4:
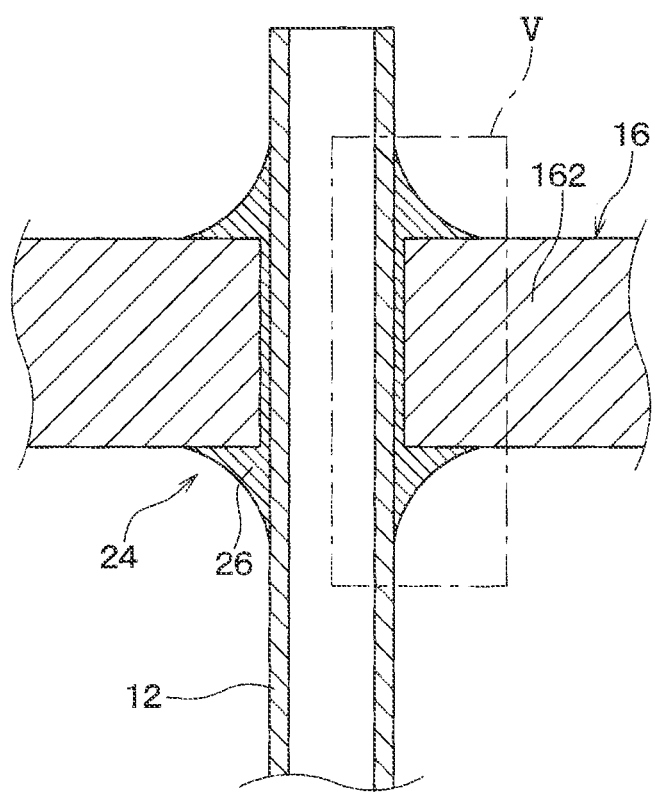
FIG. 4 is a cross-sectional view illustrating a header plate and the tube illustrated in FIG. 1.

Here, as shown in FIG. 4, the header plate 162 is composed of a planar aluminum alloy having multiple through holes. The multiple tubes 12 are inserted into the multiple through holes, respectively, and are brazed to the header plate 162. Hence, in the claimed invention, the header plate 162 corresponds to a tank member that includes a tank space communicating with the multiple flow channel forming members.

As shown, at a braze joining portion 24, in which the tube 12 and the header plate 162 join, a fillet 26 is again formed. In the claimed invention, the fillet 26 corresponds to a second fillet in a braze joining portion formed the flow channel forming member and the tank member.

Each of the tube 12 and the header plate 162 may employ various layer structures, and can be combined with each other in various manners as illustrated in FIGS. 5A to 5K, wherein a fillet 26 is omitted for the purpose of simplicity. As shown in FIGS. 5A to 5K, at least one of the tube 12 and the header plate 162 includes a brazing material layer on a surface thereof.

In each of examples of FIGS. 5A to 5D, the tube 12 includes a core material layer 121 and two brazing material layer 122 and 123. In each of examples of FIGS. 5E to 5H, the tube 12 includes a core material layer 121 and a brazing material layer 122. In each of examples of FIGS. 5I to 5K, the tube 12 is composed only of a core material layer 121.

Figure 5A:
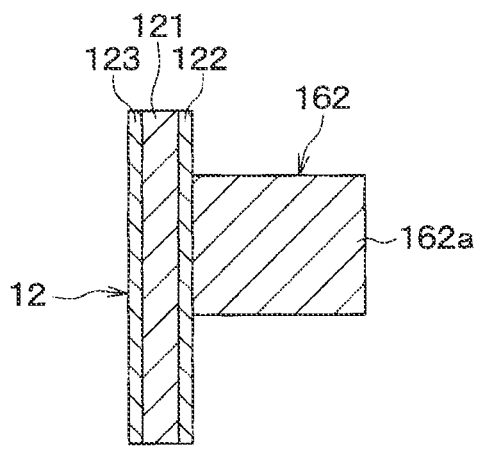
FIGS. 5A to 5K are enlarged views illustrating typical examples of a section V illustrated in FIG. 4, respectively.
Figure 5B:
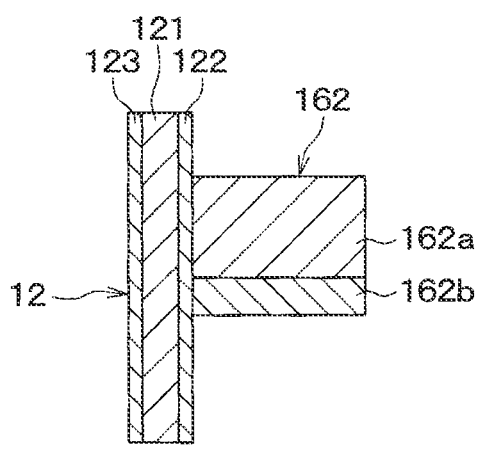
Figure 5C:
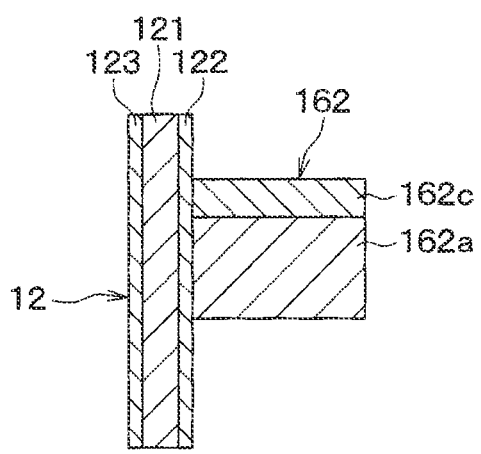
Figure 5D:
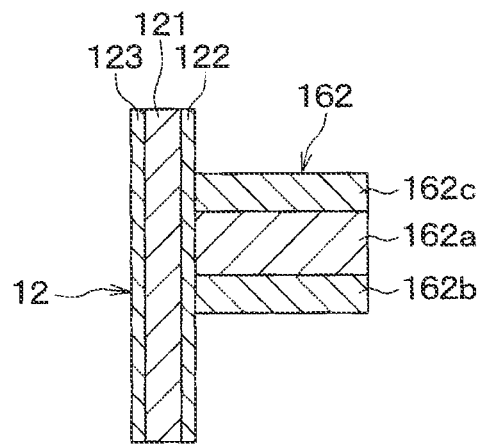
Figure 5E:
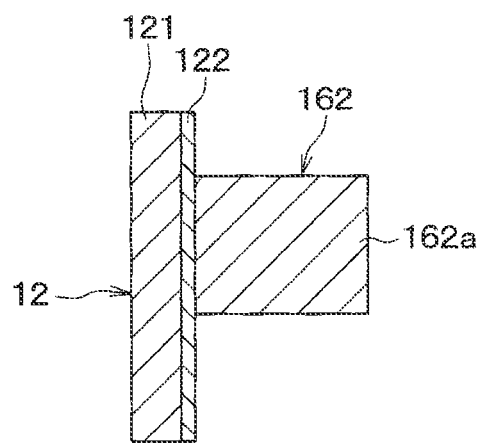
Figure 5F:
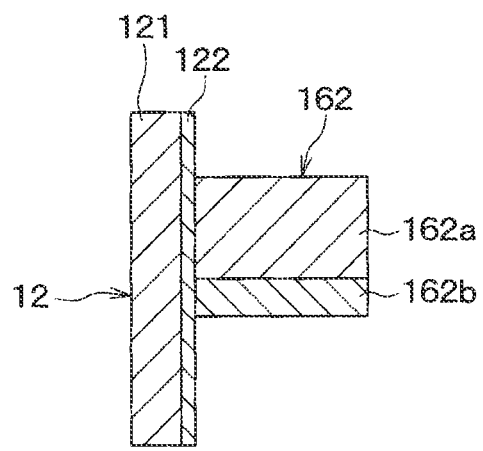
Figure 5G:
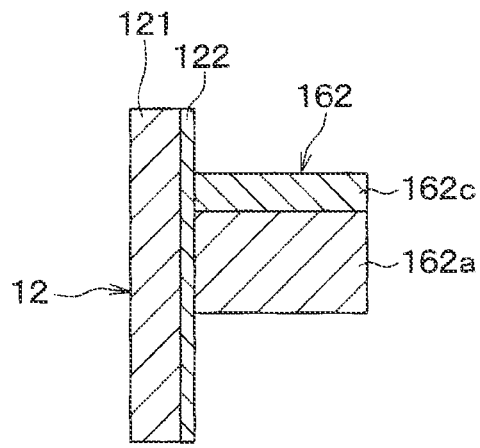
Figure 5H:
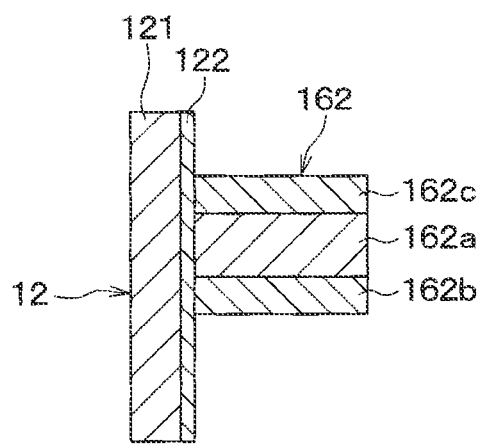
Figure 5I:
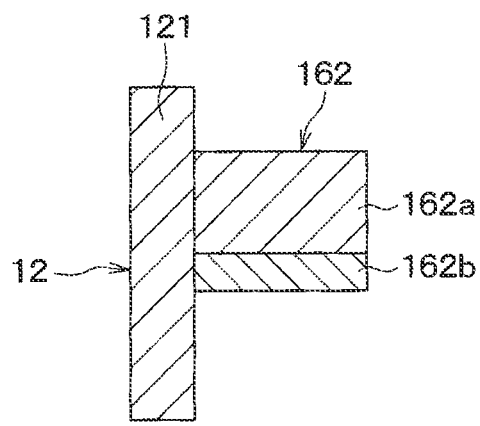
Figure 5J:
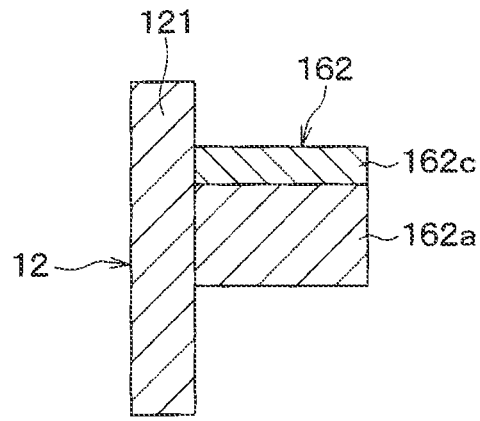
Figure 5K:
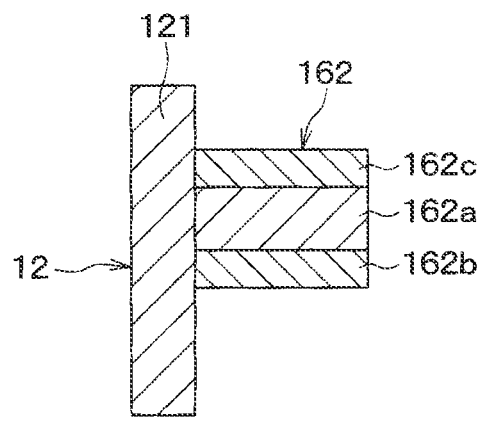

In each of the examples of FIGS. 5A and 5E, the header plate 162 is composed only of a core material layer 162a. In each of examples of FIGS. 5B, 5F and 5I, the header plate 162 includes a core material layer 162a and a brazing material layer 162b. The brazing material layer 162b is located on an outside of the core material layer 162a and the header tank 16. In each of examples of FIGS. 5C, 5G and 5J, the header plate 162 includes a core material layer 162a and a brazing material layer 162c. The brazing material layer 162c is located on the core material layer 162a facing the header tank space 16a. In each of examples of FIGS. 5D, 5H and 5K, the header plate 162 includes a core material layer 162a and two brazing material layers 162b and 162c. The core material layer 162a is composed of an Al—Mn-based alloy. Each of the brazing material layers 162b and 162c is composed of an Al—Si-based alloy.

Figure 6:
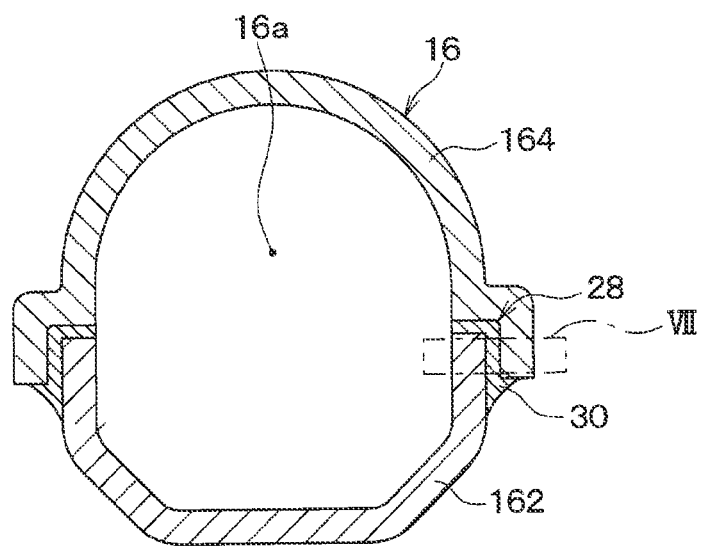
FIG. 6 is a cross-sectional view taken along a line VI-VI illustrated in FIG. 1.

As shown in FIG. 6, the tank body 164 is prepared by molding a planar aluminum alloy into a U-shape having a U-shaped cross-section. The tank body 164 is brazed to the header plate 162 to form the tank space 16a. Hence, in the claimed invention, the tank body 164 corresponds to a joining member joined to the tank member.

Further, in a braze joining portion 28 in which the header plate 162 and the tank body 164 join, a fillet 30 is formed. Hence, (in a claimed invention), the fillet 30 corresponds to a third fillet in the braze joining portion in which the tank member and the joining member join with each other.

The header plate 162 and the tank body 164 may employ various layer structures and may be combined with each other in various manners as illustrated in FIGS. 7A to 7I, wherein a fillet 30 is omitted for the purpose of simplicity. Specifically, as shown in each of examples of FIGS. 7A to 7I, at least one of the header plate 162 and the tank body 164 includes a brazing material layer on a surface thereof.

Figure 7A:
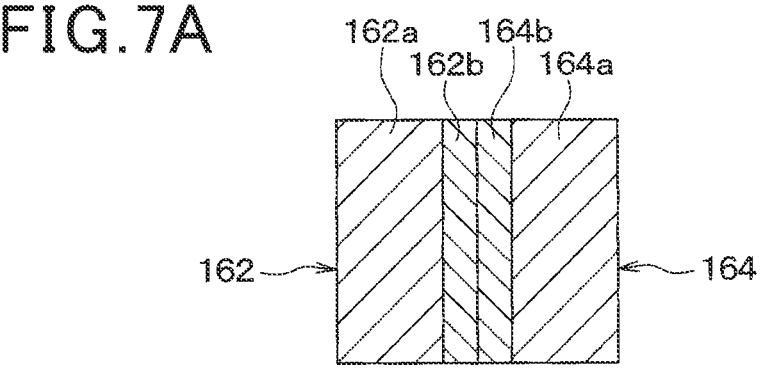
FIGS. 7A to 7L are enlarged views illustrating typical examples of a section VII illustrated in FIG. 6, respectively.
Figure 7B:
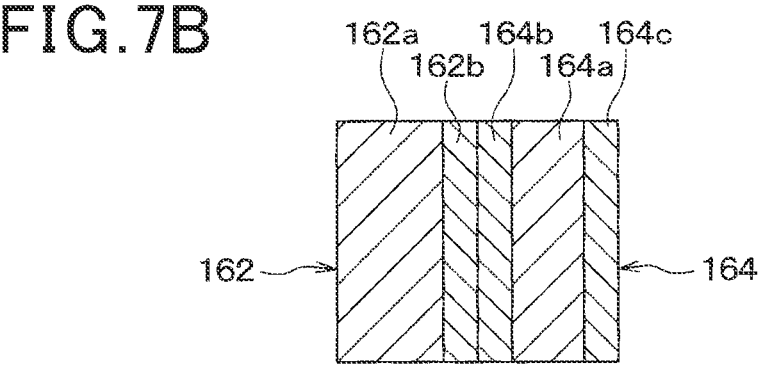
Figure 7C:
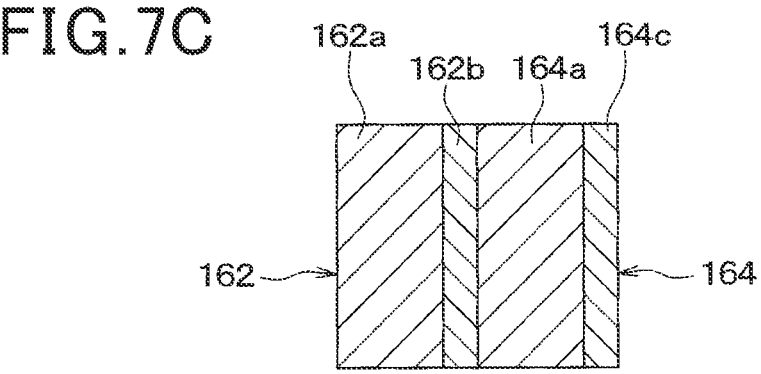
Figure 7D:
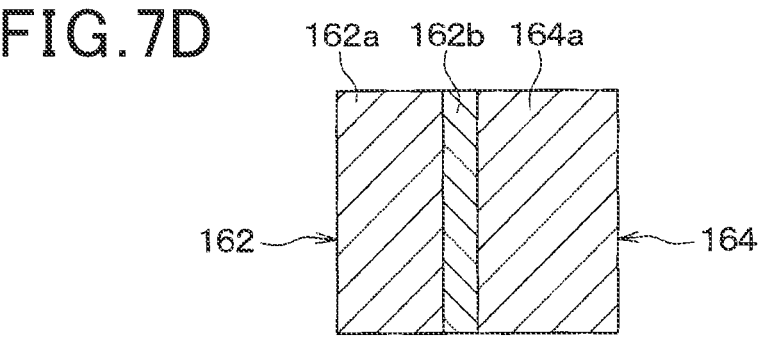
Figure 7E:
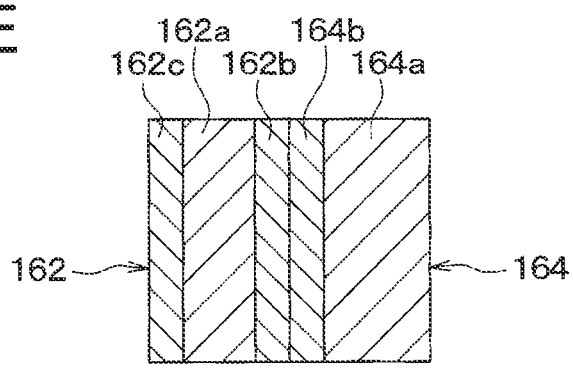
Figure 7F:
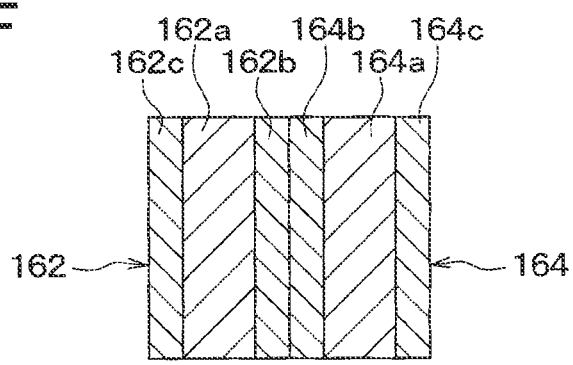
Figure 7G:
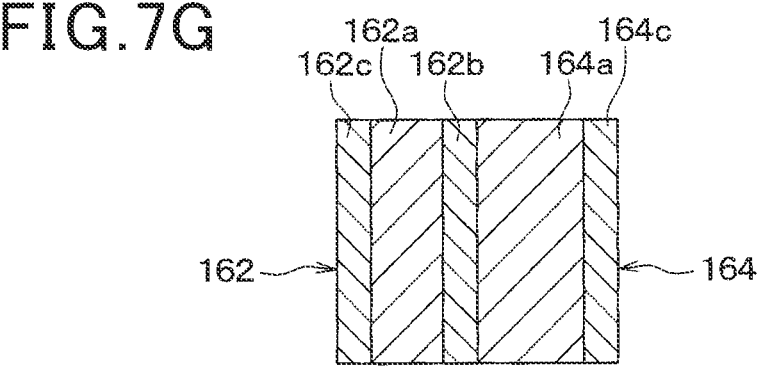
Figure 7H:
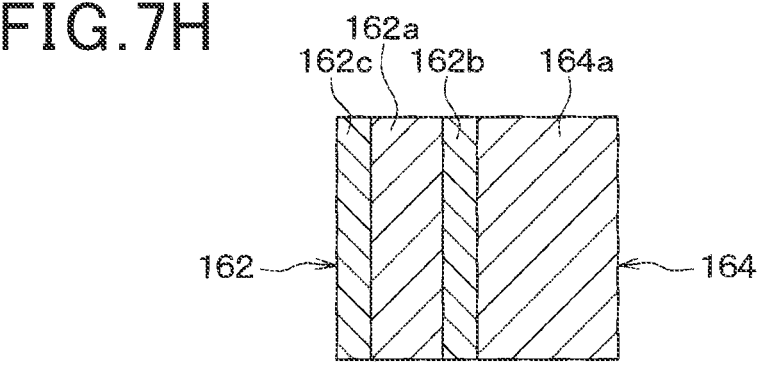
Figure 7I:
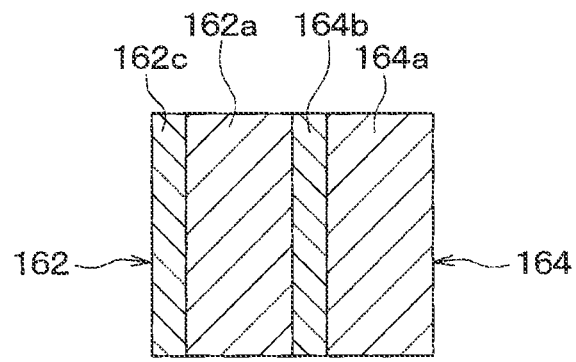
Figure 7J:
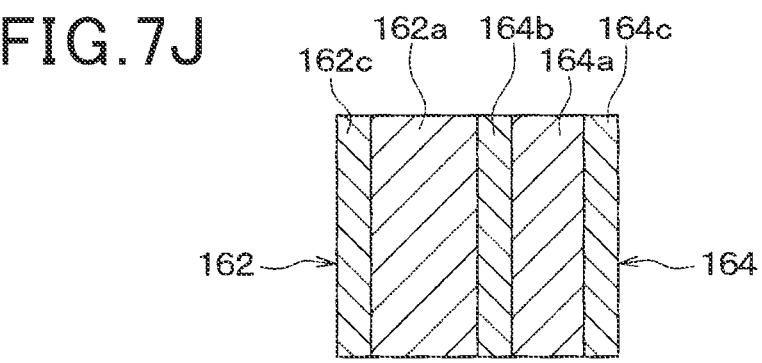
Figure 7K:
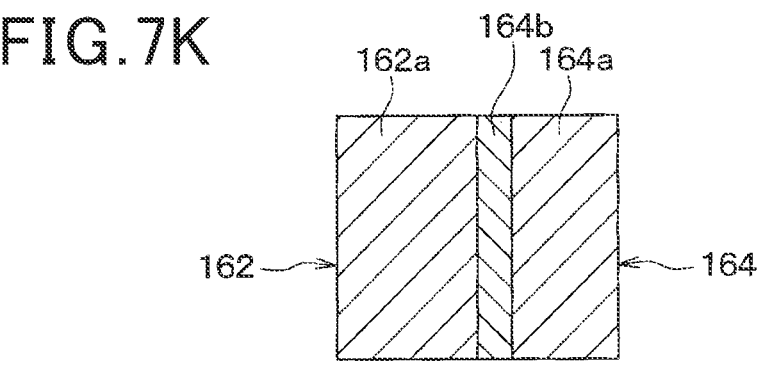
Figure 7L:
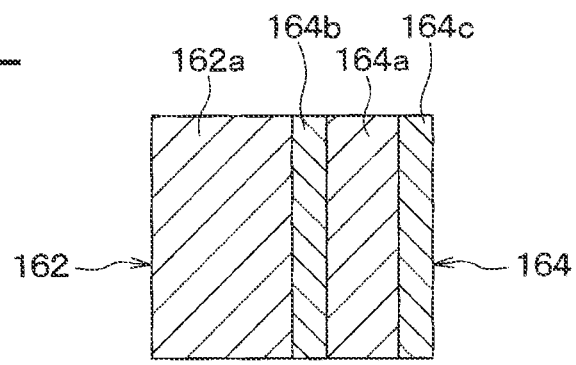

In each of the examples of FIGS. 7A to 7D, the header plate 162 includes a core material layer 162a and a brazing material layer 162b. In each of examples of FIG. 7E to 7H, the header plate 162 includes the core material layer 162a and two brazing material layers 162b and 162c. In each of examples of FIGS. 7I and 7J, the header plate 162 includes a core material layer 162a and a brazing material layer 162c. Further, in each of examples of FIGS. 7K and 7L, the header plate 162 includes only a core material layer 162a.

In each of the examples of FIGS. 7A, 7E, 7I and 7K, the tank body 164 includes a core material layer 164a and a brazing material layer 164b. The brazing material layer 164b is located on a surface of the core material layer 164a facing the tank space 16a. In each of the examples of FIGS. 7B, 7F, 7I and 7L, the tank body 164 includes the core material layer 164a and two brazing material layers 164b and 164c. The brazing material layer 164c is located on outer surfaces of the core material layer 164a and the header tank 16, respectively. In each of examples of FIGS. 7C and 7G, the tank body 164 includes a core material layer 164a and a brazing material layer 164c. However, in each of examples of FIGS. 7D and 7H, the tank body 164 includes only a core material layer 164a. The core material layer 164a is composed of an Al—Mn-based alloy. Each of the brazing material layers 164b and 164c is composed of an Al—Si-based alloy.

Figure 8:
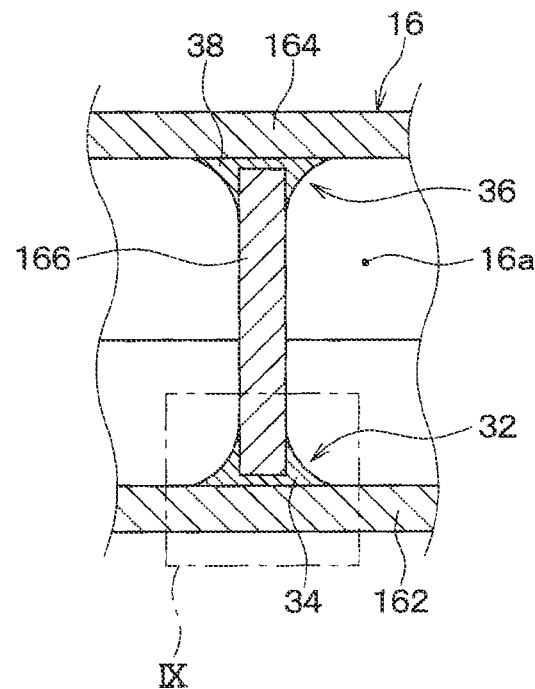
FIG. 8 is a cross-sectional view illustrating a separator illustrated in FIG. 1.

Further, as shown in FIG. 8, a separator 166 is provided to separate an internal space formed by the header plate 162 and the tank body 164 into a tank space 16a and the other space. The separator 166 is prepared by machining a planar aluminum alloy. As shown, the separator 166 is brazed to the header plate 162 and the tank body 164. Hence, in the claimed invention, since it is joined to the header plate 162, the separator 166 corresponds to a joining member joined to the tank member.

Further, a fillet 34 is formed in a braze joining portion 32, in which the header plate 162 and the separator 166 join. Hence, in the claimed invention, the fillet 34 corresponds to a third fillet in the braze joining portion in which the tank member and the joining member. Further, a fillet 38 is also formed in a braze joining portion 36, in which the tank body 164 and the separator 166.

Each of the header plate 162 and the separator 166 may employ various layer structures and are combined with each other in various manners as illustrated in FIGS. 9A to 9F, wherein a fillet 34 is omitted for the purpose of simplicity. Specifically, as shown in FIGS. 9A to 9F, at least one of the header plate 162 and the separator 166 includes a brazing material layer on a surface thereof.

In each of examples of FIGS. 9A to 9D, the separator 166 includes a core material layer 166a and two brazing material layers 166b and 166c. In each of examples of FIGS. 9E to 9F, the separator 166 includes only a core material layer 166a. The core material layer 166a is composed of an Al—Mn-based alloy. Each of the brazing material layers 164b and 164c is composed of an Al—Si-based alloy.

Figure 9A:
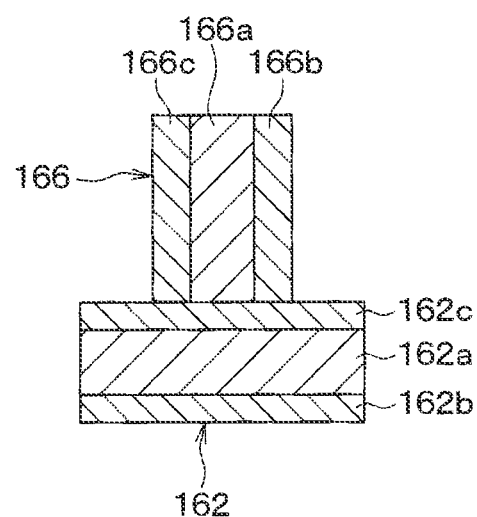
Figure 9E:
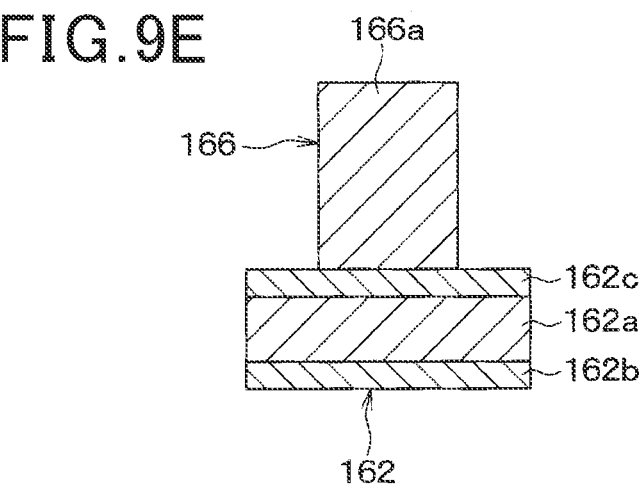
Figure 9F:
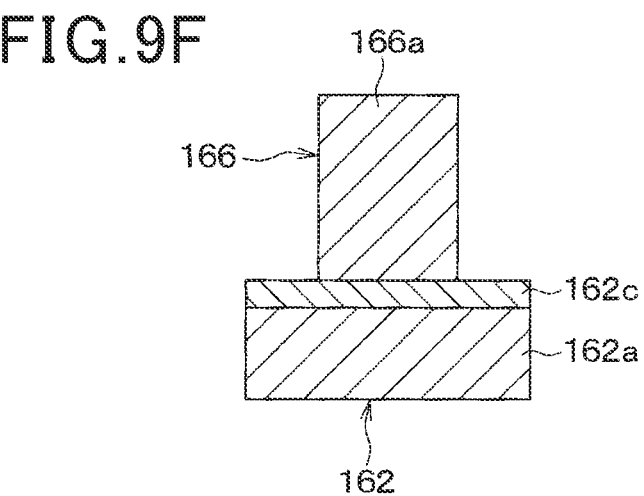

In each of the examples of FIGS. 9A and 9E, the header plate 162 includes a core material layer 162a and two brazing material layers 162b and 162c. In each of examples of FIGS. 9B and 9F, the header plate 162 includes a core material layer 162a and a brazing material layer 162c. Further, in an example of FIG. 9C, the header plate 162 includes a core material layer 162a and a brazing material layer 162b. In an example of FIG. 9D, the header plate 162 includes only a core material layer 162a.

Further, as shown in FIG. 1, a laminated body is formed by alternately stacking the tube 12 and the fin 14 multiple times in a given direction, and a pair of side plates 18 is disposed at both ends of the laminated body in the given direction to reinforce the laminated body. Each of the side plates 18 is prepared by machining a planar aluminum alloy.

Figure 10:
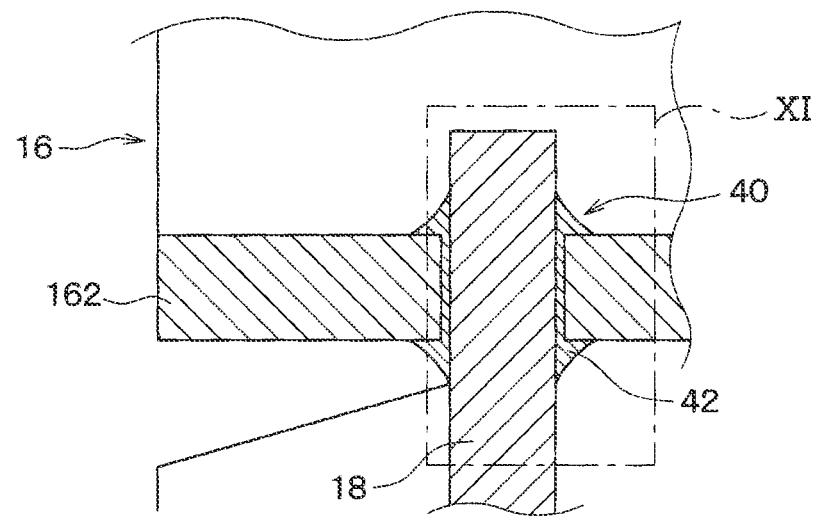
FIG. 10 is a cross-sectional view illustrating a side plate and the header plate illustrated in FIG. 1.

As shown in FIG. 10, the pair of side plate 18 is inserted into the through hole formed in the header plate 162 and is brazed to the header plate 162. Hence, in the claimed invention, the side plate 18 corresponds to a joining member joined to a tank member. Further, a fillet 42 is formed in a braze joining portion 40, in which the header plate 162 and the side plate 18 join. Hence, in the claimed invention, the fillet 42 corresponds to a third fillet in the braze joining portion in which the tank member and the joining member join with each other.

Each of the header plate 162 and the side plate 18 may employ various layer structures and is combined with each other in various manners as illustrated in FIGS. 9A to 9F, wherein a fillet 42 is omitted for the purpose of simplicity. Specifically, as shown in FIGS. 11A to 11G, at least one of the header plate 162 and the side plate 18 includes a brazing material layer on a surface thereof.

In each of examples of FIGS. 11A to 11D, the side plate 18 includes a core material layer 181 and a brazing material layer 182. In each of examples of FIGS. 11E to 11G, the side plate 18 includes only a core material layer 181. The core material layer 181 is composed of an Al—Mn-based alloy. The brazing material layer 182 is composed of an Al—Si-based alloy.

Figure 11A:
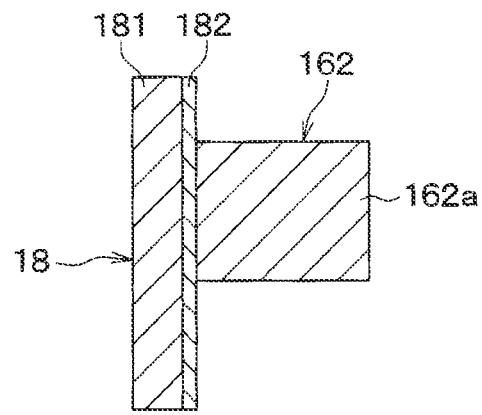
FIGS. 11A to 11G are enlarged views illustrating typical examples of a section XI illustrated in FIG. 10, respectively.
Figure 11B:
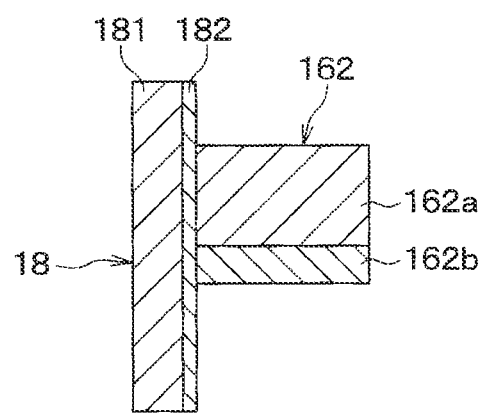
Figure 11C:
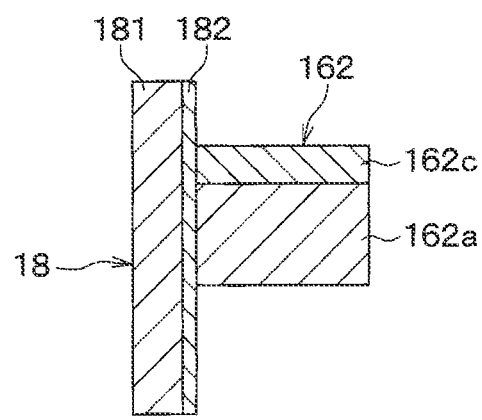
Figure 11D:
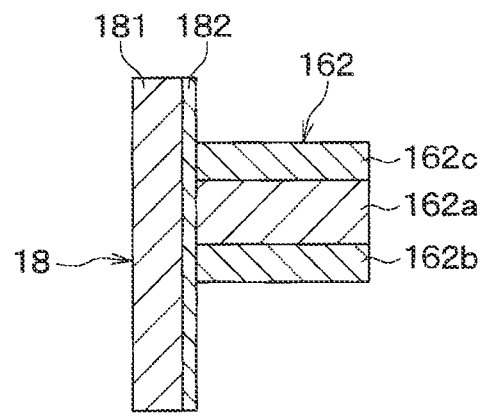
Figure 11E:
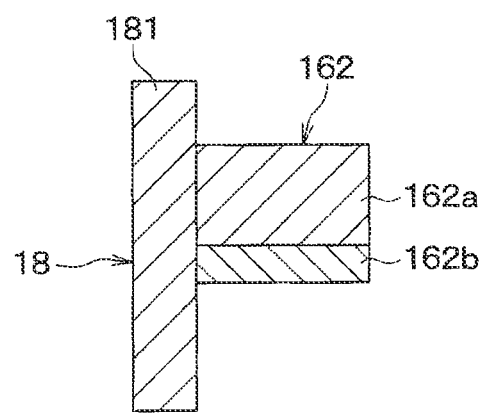
Figure 11F:
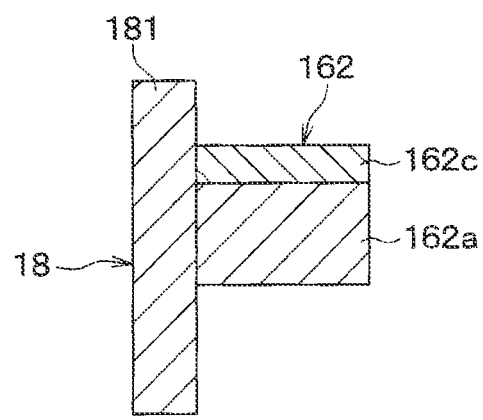
Figure 11G:
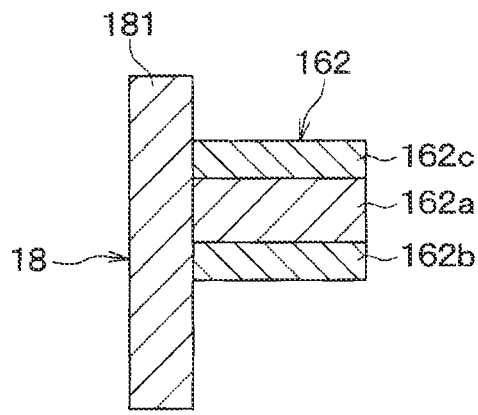

In the example of FIG. 11A, the header plate 162 includes only a core material layer 162a. In each of examples of FIGS. 11B and 11E, the header plate 162 includes a core material layer 162a and a brazing material layer 162b. In examples of FIGS. 11C and 11F, the header plate 162 includes a core material layer 162a and a brazing material layer 162c. In examples of FIGS. 11D and 11G, the header plate 162 includes a core material layer 162a and two brazing material layers 162b and 162c.

Further, the heat exchanger 10 of this embodiment of the present disclosure is produced by applying a brazing process without using flux in an ambience of a lower oxygen concentration than the atmosphere at either atmospheric pressure or a higher pressure than atmospheric pressure. Hence, the flux is excluded from the heat exchanger 10 of this embodiment. As the ambience of the lower oxygen concentration than the atmosphere, an inert gas atmosphere can be exemplified.

Further, the heat exchanger 10 of this embodiment is produced to meet the below described first to third conditions.

The first one is a plate thickness of each of components of the heat exchanger 10 as described below. First, an average plate thickness of the tube 12 is from 0.100 mm or more to 0.400 mm or less. An average thickness of the fin 14 is from 0.025 mm or more to 0.150 mm or less. An average thickness of the header plate 162 is from 0.500 mm or more to 2.000 mm or less. An average thickness of each of the tank body 164, the separator 166 and the side plate 18 is from 0.500 mm or more to 2.000 mm or less.

Here, the average thickness of each of the header plate 162, the tank body 164, the separator 166 and the side plate 18 is greater than the average thickness of each of the tube 12 and the fins 14, respectively. Accordingly, in this embodiment, the header plate 162, the tank body 164, the separator 166 and the side plate 18 act as thicker members among all structural elements of the heat exchanger 10. The tube 12 and the fin 14 act as thinner members among all structural elements of the heat exchanger 10, respectively.

A second condition is a contained chemical element and a concentration of a fillet as described below. That is, each of the fillets 22, 26, 30, 34 and 42 is composed of an aluminum alloy containing magnesium (i.e., Mg) and bismuth (i.e., Bi) and Silicon (i.e., Si). A concentration of the magnesium (hereinafter referred to as the Mg concentration) of each of the fillets 22, 26, 30, 34 and 42 is from 0.2% or more to 2.0% or less by mass, and is preferably 0.3% or more by mass.

Here, the fillet 22 formed in the braze joining portion 20, in which the tube 12 and the fin 14 respectively acting as the thin members join acts as the first fillet. The fillet 26 formed in the braze joining portion 24, in which the tube 12 and the header plate 162 respectively acting as the thin and thick members join acts as the second fillet. The fillet 30 formed in the braze joining portion 28, in which the header plate 162 and the tank body 164 respectively acting as the thick members join acts as the third fillet. The fillet 34 formed in the braze joining portion 32, in which the header plate 162 and the separator 166 respectively acting as the thick members join also acts as the third fillet. The fillet 42 formed in the braze joining portion 40, in which the header plate 162 and the side plate 18 respectively acting as the thick members join also acts as the third fillet.

Figure 3F:
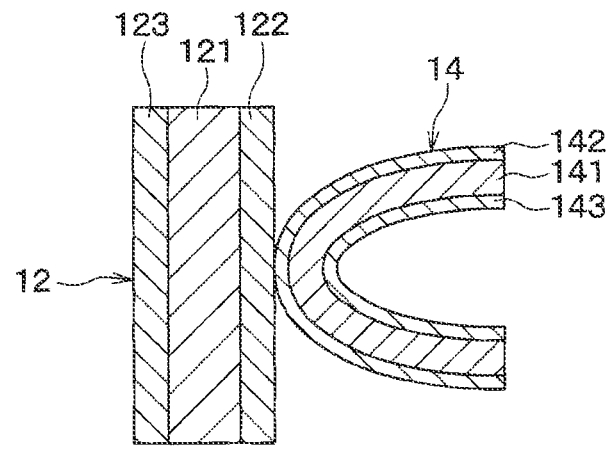

The third condition is a Mg concentration at a thickness center of a structural member having a brazing material layer as described below. At least one of the tube 12 and the fin 14 includes a brazing material layer 122 or 142 on a front surface thereof. As shown in FIGS. 3A and 3B, when the tube 12 includes the brazing material layer 122 while the fin 14 does not, a Mg concentration of the tube 12 at its plate thickness center is from 0.1% or more to 1.0% or less by mass. By contrast, as shown in FIGS. 3C and 3D, when the fin 14 includes the brazing material layer 142 while the tube 12 does not, an Mg concentration of the fin 14 at its plate thickness center is from 0.2% or more to 1.0% or less by mass. Further, as shown in FIGS. 3E and 3F, when both of the tube 12 and the fin 14 have brazing material layers 122 and 142, respectively, a Mg concentration of the tube 12 at its plate thickness center is from 0.1% or more to 1.0% or less by mass. At the same time, an Mg concentration of the fin 14 at its plate thickness center is from 0.2% or more to 1.0% or less by mass.

Figure 12:
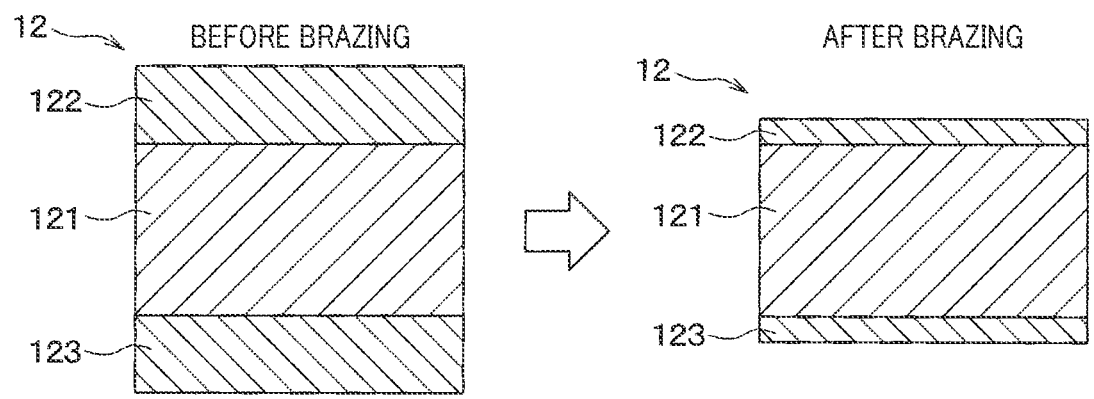
FIG. 12 is a cross-sectional view illustrating typical tubes before and after brazing according to one embodiment of the present disclosure.
Figure 13:
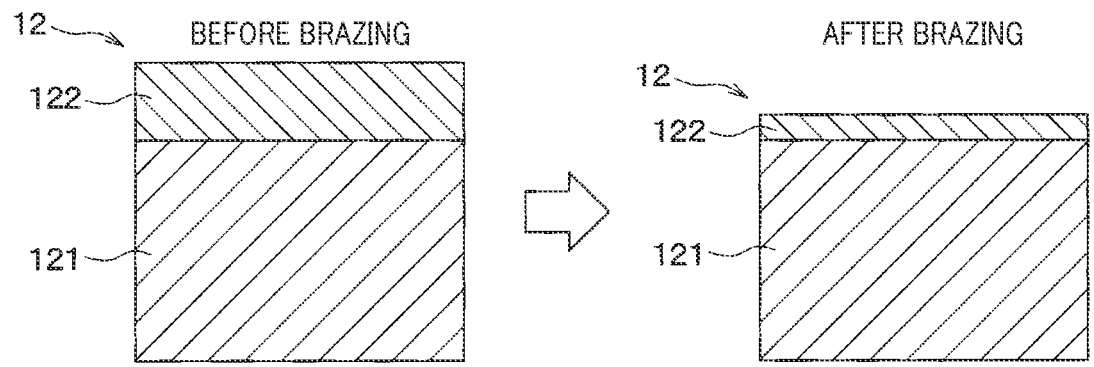
FIG. 13 is a cross-sectional view illustrating other typical tubes before and after brazing according to one embodiment of the present disclosure.

Further, as shown in FIGS. 12 and 13, when the tube 12 includes two brazing material layers 122 and 123 before brazing, the brazing material layer 122 and 123 remain on the tube 12 even after brazing. The same event occurs in the remaining components (i.e., structures other than the tube 12) of the heat exchanger 10 as well. Accordingly, the average plate thickness of each of the components includes a thickness of the brazing layer remaining after brazing. By contrast, when each of the components before brazing does not contain a brazing layer, the thickness of each of the components before and after brazing does not change.

Figure 14:
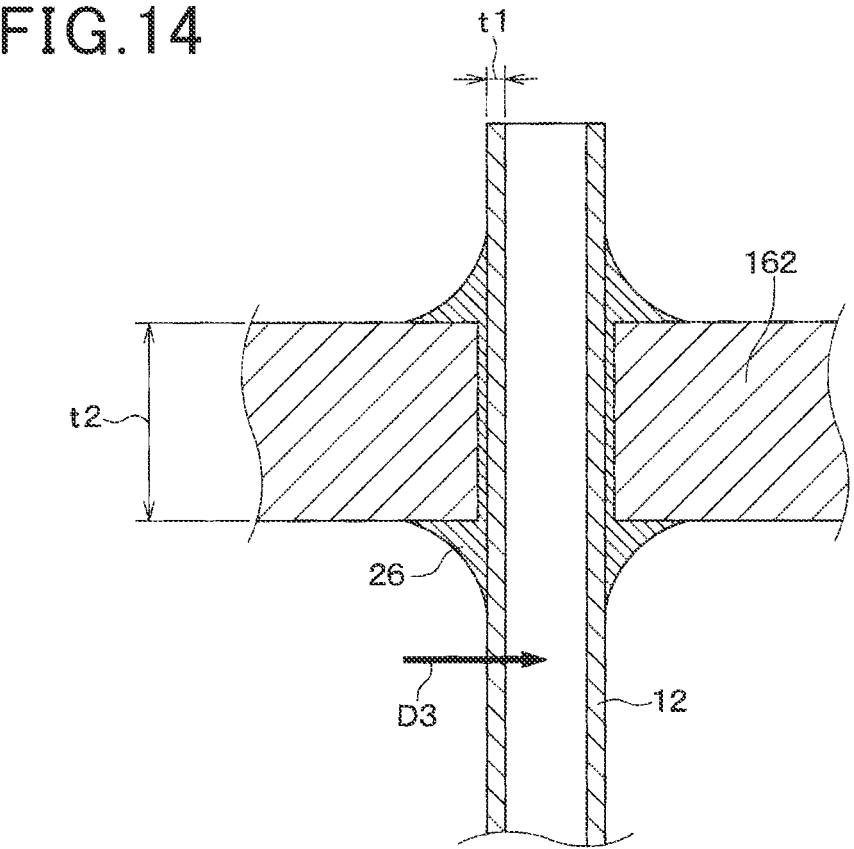
FIG. 14 is a cross-sectional view illustrating a tube and a header plate to explain a method of measuring an average plate thickness and a Mg concentration at a plate thickness center according to one embodiment of the present disclosure.

Here, an average thickness is measured based on a captured image of each of sections of the components. That is, as shown in FIG. 14, on an image of a section of each of the tube 12 and the header plate 162, two parallel lines are respectively drawn along opposite sides of each of the tube 12 and the header plate 162 by using a common image analysis method. An interval between these two parallel lines of each of the tube 12 and the header plate 162 is measured as respective plate thicknesses t1 and t2. Measurement of the thickness of each of the remaining structural members is substantially the same.

Figure 15:
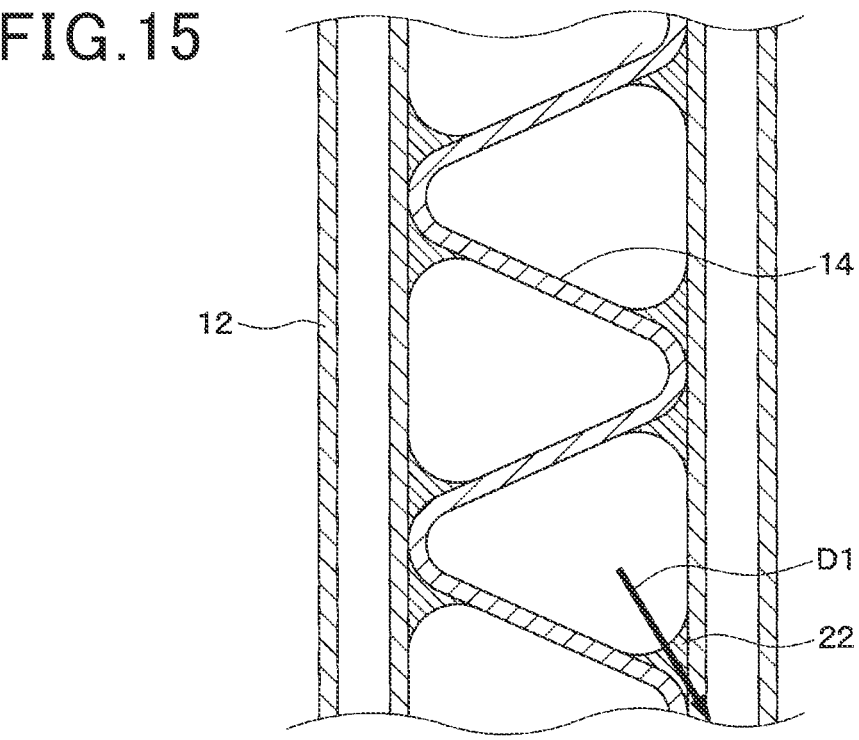
FIG. 15 is a cross-sectional view illustrating a tube and a fin to explain a method of measuring an Mg concentration of a fillet according to one embodiment of the present disclosure.
Figure 16:
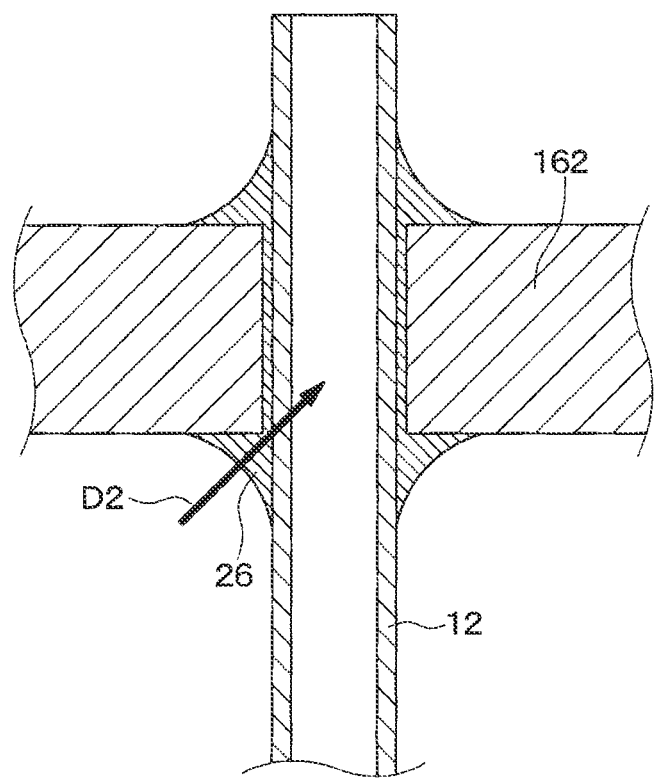
FIG. 16 is a cross-sectional view illustrating a tube and a header plate to explain a method of measuring an Mg concentration of the fillet according to one embodiment of the present disclosure.
Figure 17:
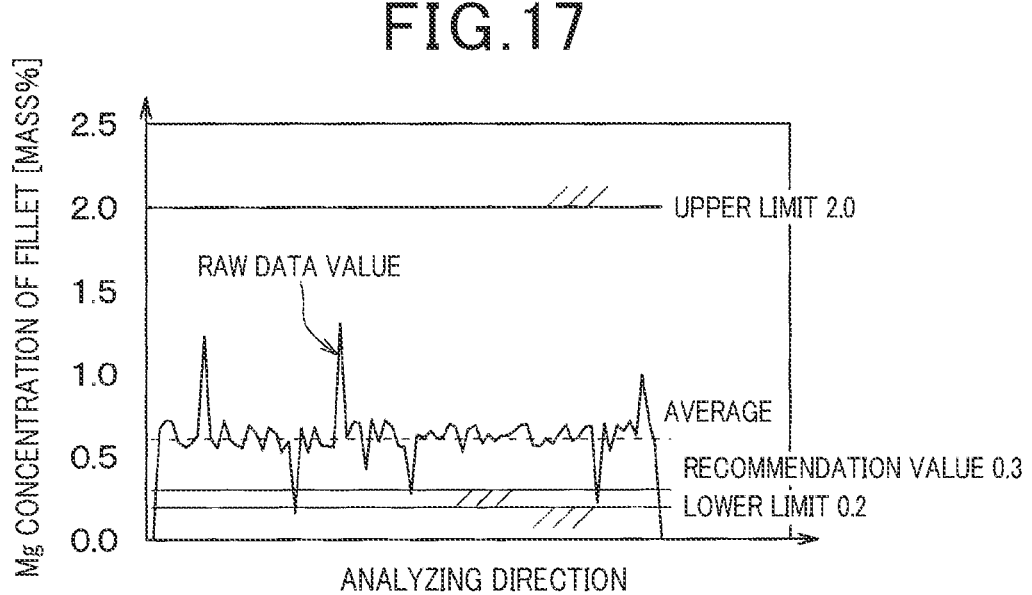
FIG. 17 is a graph illustrating a result of a line analysis of an Mg concentration of a fillet executed by using an EPMA according to one embodiment of the present disclosure.

As shown in FIGS. 15 and 16, the Mg concentration of the fillet is measured based on a line analysis of a section of each of the fillets 22 and 26 by using an EPMA (Electron Probe Micro Analyzer). In the drawing, respective arrows D1 and D2 indicate typical directions along which the line analyses are applied. The analysis covers from one end to the other end of the fillet in a given direction. As shown in FIG. 17, an average of degrees of the Mg concentration measured based on the line analysis corresponds to the Mg concentration of the fillet.

Figure 18:
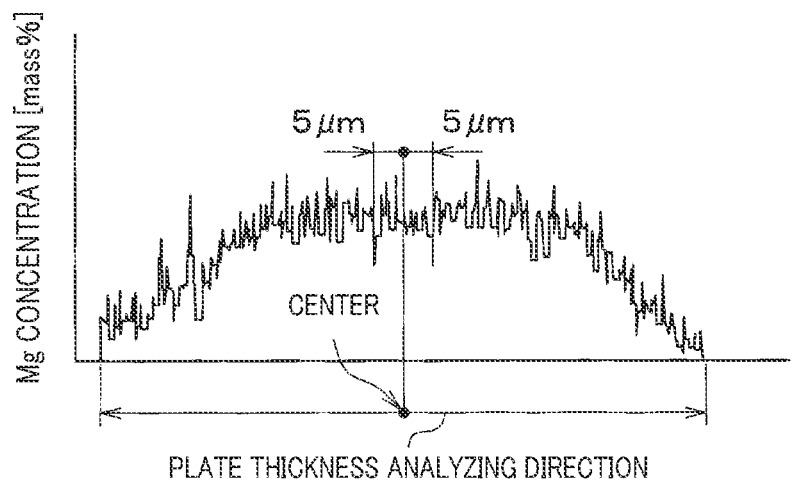
FIG. 18 is a graph illustrating a result of a line analysis of an Mg concentration of a tube executed by using the EPMA according to one embodiment of the present disclosure.

Further, a Mg concentration at a plate thickness center in each of the components is measured by the EPMA based on the line analysis. As shown by arrow D3 in FIG. 14, a line analysis in applied in a plate thickness direction from one side to the other side of the tube 12. As shown in FIG. 18, an average of degrees of Mg concentration plotted in a range of ±5 μm from a plate thickness center of the tube 12 corresponds to the Mg concentration of the plate thickness center. In the remaining components, the Mg concentration of the plate thickness center is similarly obtained.

Here, the above-described second and third conditions are obtained as a result of the below described testing executed in practical examples.

Further, when Mg is oxidized during brazing thereby forming an oxide film of the Mg on a surface of each of components, it is difficult to obtain a satisfactory braze. To solve such a problem, bismuth may suppress formation of the Mg oxide film during brazing and is thus desirably employed. Specifically, the bismuth is only needed in a brazing material layer and is not needed in a core material layer before soldering. As a result, however, the bismuth remains on the fillet after brazing.

Further, Mg destroys an oxide film of aluminum existing in a joined section during brazing. This enables satisfactory soldering. Hence, the Mg is only needed in at least one of the brazing material layer and the core material layer before brazing. Further, as a diffusion of a chemical element during brazing, Mg spreads to the brazing material layer. As a result, the Mg remains in the fillet after brazing.

Further, to enable satisfactory soldering, the below described post brazing conditions are to be met. That is, an Mg concentration of each of the fillets 22, 26, 30, 34 and 42 is 0.2% or more by mass. When the tube 12 includes the brazing material layer 122, an Mg concentration of the tube 12 at its plate thickness center is 0.1% or more by mass. When the fin 14 includes the brazing material layer 142, an Mg concentration of the fin 14 at its plate thickness center is 0.2% or more by mass. That is, when respective Mg concentrations are lower than the above-described values, preferable brazing cannot be obtained. Specifically, by including Mg in each of the component members 12, 14, 162, 164, 166 and 18 before brazing to be able to meet the above-described values, a heat exchanger 10 can be satisfactorily brazed. Further, it is more preferable that each of the component members 12, 14, 162, 164, 166 and 18 includes a given amount of Mg before brazing to enable each of the fillets 22, 26, 30, 34 and 42 to have an Mg concentration of 0.3% or more by mass. With this, a heat exchanger 10 can be particularly satisfactorily brazed.

In the above, since erosion occurs when the Mg concentration of the fillet is 2.0% or more by mass, the Mg concentration of the fillet is 2.0% or less. Here. the erosion is a phenomenon in that aluminum alloy-based material melts due to diffusion of a composition of brazing material to the aluminum alloy material. Further, to similarly avoid the erosion, the Mg concentration of the tube 12 at its plate thickness center is 1.0% or less by mass. Also, to similarly avoid the erosion, the Mg concentration of the fin 14 at its plate thickness center is 1.0% or less by mass.

Hence, as component members 12, 14, 162, 164, 166 and 18 of the heat exchanger 10 before brazing, components capable of meeting the above described first to third conditions after brazing are employed. In addition, in the environment of lower oxygen concentration than the atmosphere at either atmospheric pressure or a pressure higher than atmospheric pressure, the heat exchanger 10 is brazed without using flux. With this, three types of braze joining portions including the braze joining portion in which two thin plates join, the braze joining portion in which the thin and thick plates join and the braze joining portion in which two thick plates join can be satisfactory formed. Specifically, the heat exchanger 10 can be satisfactorily brazed at the joining portions.

Figure 19A:
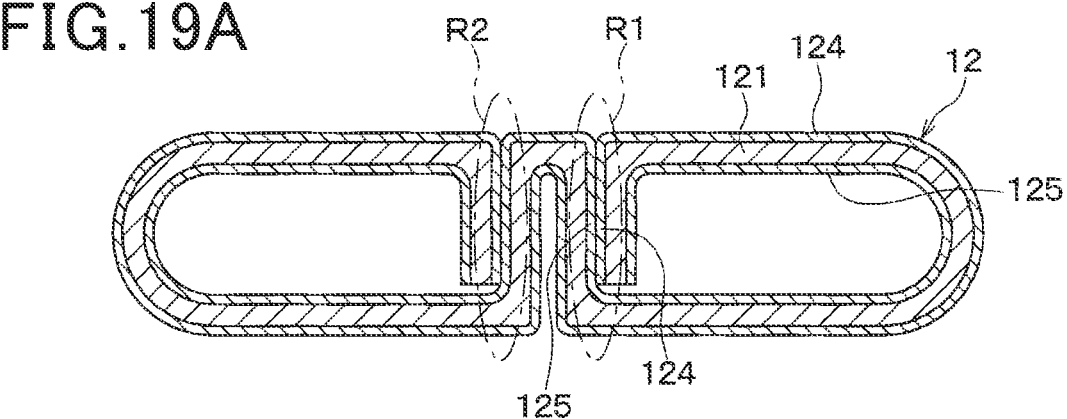
FIG. 19A is a cross-sectional view illustrating a tube according to a second embodiment of the present disclosure.

Now, a second embodiment of the present disclosure is described with reference to FIG. 19A. As shown there, a tube 12 is formed by brazing a plate member subjected to a bending process.

That is, the tube 12 includes a core material layer 121, a brazing material layer 124 and a cladding layer 125. The brazing material layer 124 is located on one side of the core material layer 121. The brazing material layer 124 is located on an outer surface of the tube 12. The brazing material layer 124 may composed of an Al—Si-based alloy. The cladding layer 125 is located on the other side of the core material layer 121 opposite the brazing material layer 124. The cladding layer 125 is thus located inside of the tube 12. The cladding layer 125 is composed of an aluminum alloy (i.e., not a brazing material), such as Al—Zn-based alloy, etc., for example. Further, as shown in FIG. 19A, in each of regions R1 and R2 of the tube 12, the brazing material layer 124 and the cladding layer 125 are joined together.

Figure 19B:
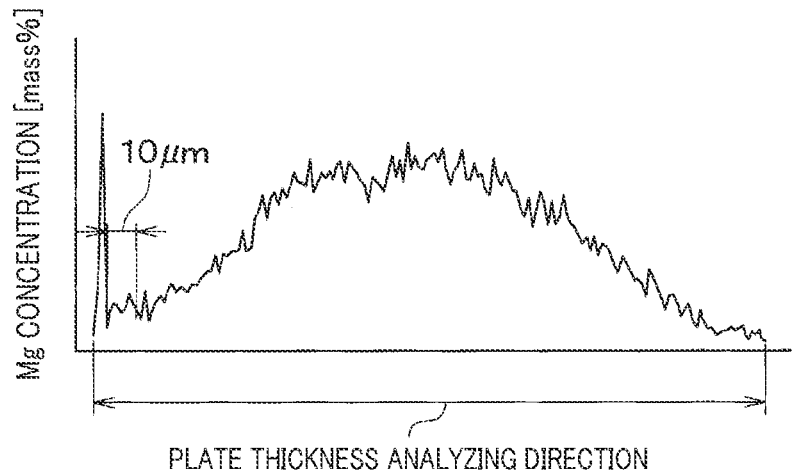
FIG. 19B is a graph illustrating a result of a line analysis of a Mg concentration of the tube executed by using the EPMA according to the second embodiment of the present disclosure.

An Mg concentration in a surface layer of the cladding layer 125 is lower than the Mg concentration of the tube 12 at a plate thickness center of the tube 12. The surface layer of the cladding layer 125 is a region having a depth of 10 micrometer from a surface of the cladding layer 125. An Mg concentration in the surface layer of the cladding layer 125 is measured based on a line analysis of a cross section of the tube 12 by using an EPMA. Here, as shown in FIG. 19B, if an oxide film of Mg is formed on a surface of the cladding layer 125, a Mg thickened layer may be identified sometimes in the surface layer of the cladding layer 125 during the EPMA line analysis. As shown in FIG. 19B, in which a left edge of a horizontal axis corresponds to the surface of the tube 12, the Mg thickened layer is a part of the tube 12 in the vicinity of the surface thereof, in which an Mg concentration rapidly increases due to influence of an oxidation film of Mg. Hence, when the Mg thickened layer is present, the Mg concentration in the surface of the cladding layer 125 is an average of degrees of Mg concentration of an inner region distanced from a surface of the tube 12 by 10 μm by excluding the Mg thickened layer.

Remaining configurations of the heat exchanger 10 of this embodiment of the present disclosure are substantially the same as the first embodiment of the present disclosure. Because of this, various advantages obtained in the first embodiment can be similarly obtained in this embodiment of the present disclosure. According to this embodiment of the present disclosure, formation of the oxide film on the surface of the cladding layer 125 can be effectively suppressed during brazing. With this, preferable brazing quality can be obtained at joining portions of the tube 12.

Figure 20:
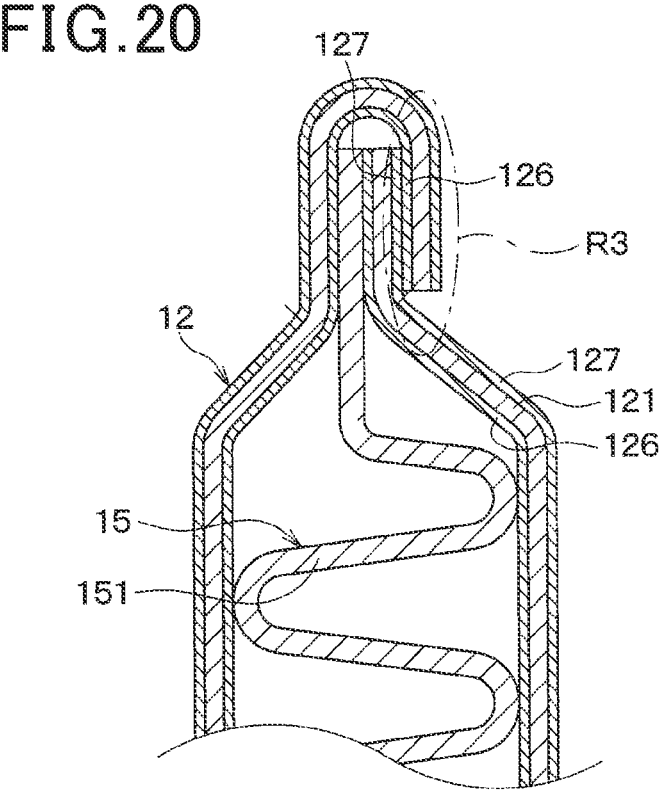
FIG. 20 is a cross-sectional view illustrating a tube according to a third embodiment of the present disclosure.

Now, a third embodiment of the present disclosure is described with reference to FIG. 20. As shown in FIG. 20, a fin 15 is disposed inside of the tube 12. The tube 12 is brazed partially sandwiching the fin 15.

The tube 12 includes a core material layer 121, a brazing material layer 126 and a cladding layer 127. The brazing material layer 126 is located on one side of the core material layer 121. The brazing material layer 126 is located on an inner side of the tube 12. The brazing material layer 126 is composed of an Al—Si-based alloy. The cladding layer 127 is located on a side of the core material layer 121 opposite the brazing material layer 126. The cladding layer 127 is composed of an aluminum alloy excluding brazing material, for example, an Al—Zn-based alloy. The fin 15 may consist of the core material layer 151 composed of an Al—Mn-based alloy.

As shown in FIG. 20, in a region R3 of the tube 12, the brazing material layer 126 and the cladding layer 127 are joined together. As in the second embodiment, an Mg concentration in a surface layer of the cladding layer 127 is lower than the Mg concentration of the tube 12 at a plate thickness center of the tube 12.

Remaining configurations of the heat exchanger 10 of this embodiment of the present disclosure is substantially the same as the first embodiment of the present disclosure. Because of this, various advantages obtained in the first and second embodiment can be similarly obtained in this embodiment of the present disclosure.

Figure 21:
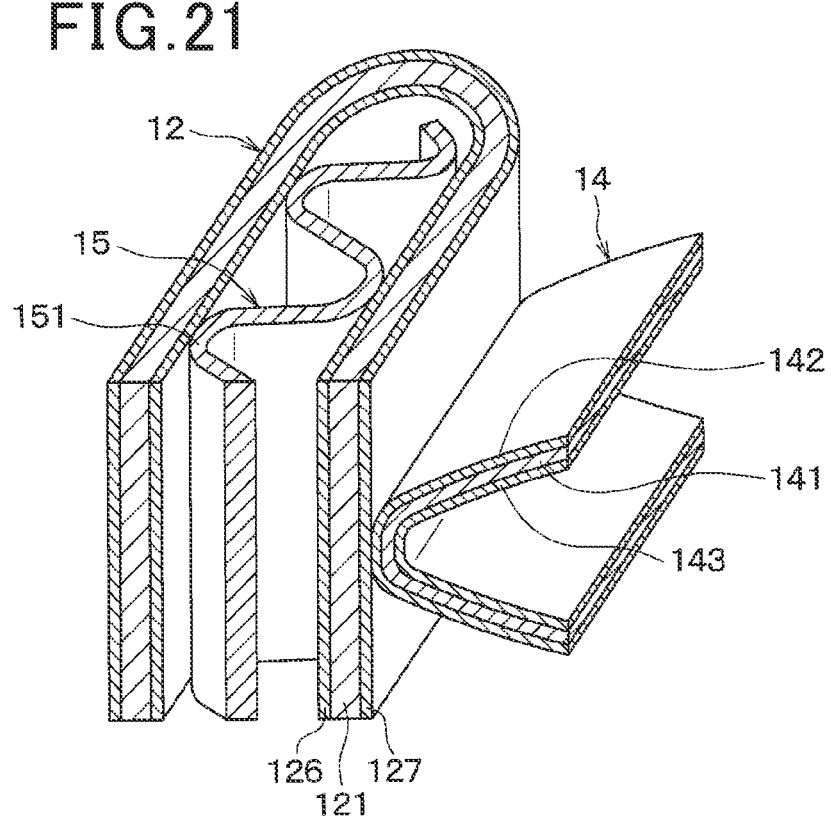
FIG. 21 is a cross-sectional view illustrating a tube and a fin according to fourth and tenth embodiments of the present disclosure.

Now, a fourth embodiment of the present disclosure is described with reference to FIG. 21. As shown in FIG. 21, a tube 12 includes a core material layer 121, a brazing material layer 126 and a cladding layer 127. The cladding layer 127 is located on a core material layer 121 to face an outer fin 14. An inner fin 15 is placed inside of the tube 12. The fin 15 consists of a core material layer 151. The fin 15 and the brazing material layer 126 of the tube 12 are joined together. The fin 14 includes a core material layer 141 and two brazing material layers 142 and 143. The brazing layers 142 and 143 of the fin 14 and the cladding layer 127 of the tube 12 are joined to each other. In FIG. 21, the brazing material layer 142 and the cladding layer 127 are joined 142 together.

In this embodiment of the present disclosure, as a pre-brazing tube 12, a tube that employs a core material layer 121 with an Mg concentration of 0.1% or more by mass and the cladding layer 127 with an Mg concentration of 0.1% or less by mass is utilized. Before brazing, the Mg concentration of the cladding layer 127 is lower than that of the core material layer 121. Whereas in a post brazing tube 12, an Mg concentration in a surface layer of the cladding layer 127 is lower than that of the tube 12 at its plate thickness center.

Remaining configurations of the heat exchanger 10 of this embodiment of the present disclosure are substantially the same as those of the first embodiment of the present disclosure. Because of this, various advantages obtained in the first embodiment of the present disclosure can be similarly obtained in this embodiment of the present disclosure. In addition, in this embodiment, the Mg concentration in the surface layer of the cladding layer 127 is lower than the Mg concentration of the tube 12 at its plate thickness center. That is, as a pre-brazing tube 12, a tube 12 enabled to lower the Mg concentration in the surface of the cladding layer 127 than that of the tube 12 at its plate thickness center after brazing is used. With this, formation of an oxide film on the surface of the cladding layer 127 can be reduced during brazing. Hence, the tube 12 and the fin 14 are satisfactorily brazed at joining portions.

Now, a fifth embodiment of the present disclosure is described herein below with reference to FIG. 3A or 3B. In this embodiment of the present disclosure, as shown in FIG. 3A or 3B, a tube 12 includes a core material layer 121 and a brazing material layer 122. A fin 14 is composed of a bare member 141 with its a core material exposed outside. That is, the fin 14 includes neither a brazing material layer nor a cladding layer. Further, the brazing material layer 122 of the tube 12 and the fin 14 as the bare member 141 are joined together. Further, an Mg concentration of the fin 14 at its plate thickness center is 0.1% or less by mass. In this embodiment, the tube 12 corresponds to one of a flow channel forming member and a heat transfer member. The fin 14 corresponds to the other one of the flow channel forming member and the heat transfer member.

Remaining configurations of the heat exchanger 10 of this embodiment of the present disclosure are substantially the same as those of the first embodiment of the present disclosure. Since the heat exchanger 10 of this embodiment meets the above-described first to third conditions met by that of the first embodiment, similar advantages can be also obtained in this embodiment as obtained in the first embodiment of the present disclosure.

In addition, in this embodiment, an Mg concentration of the fin 14 at its plate thickness center is 0.1% or less by mass, formation of the oxide film of Mg on the surface of the fins 14 can be suppressed during brazing. Hence, the tube 12 and the fin 14 are satisfactorily brazed in their joining portions.

Now, a sixth embodiment of the present disclosure is described with reference to FIG. 3C. In this embodiment, as shown in FIG. 3C, a tube 12 is configured only by a core material layer 121. That is, the tube 12 includes neither a brazing material layer nor a cladding layer. In other words, the tube 12 is configured by a bare member 121 with its core material exposed. The tube 12 illustrated in FIG. 3C is either a seam welded pipe or an extruded perforated pipe. A fin 14 includes a core material layer 141 and two brazing material layers 142 and 143. The brazing layer 142 (143) of the fin 14 and the bare member of the tube 12 are joined together. Further, an Mg concentration of the tube 12 at its plate thickness center is 0.1% or less by mass. In this embodiment, the fin 14 corresponds to one of a flow channel forming member and a heat transfer member. The tube 12 corresponds to the other one of the flow channel forming member and the heat transfer member.

Remaining configurations of the heat exchanger 10 of this embodiment of the present disclosure are substantially the same as those of the first embodiment of the present disclosure. Hence, since the heat exchanger 10 of this embodiment meets the above-described first to third conditions met by that of the first embodiment, similar advantages can also be obtained in this embodiment as obtained in the first embodiment of the present disclosure.

In addition, in this embodiment, an Mg concentration of the tube 12 at its plate thickness center is 0.1% or less by mass, formation of the oxide film of Mg on the surface of the tube 12 can be suppressed during brazing. Hence, the tube 12 and the fin 14 are satisfactorily brazed in their joining portions.

Now, a seventh embodiment of the present disclosure is described with reference to FIGS. 22A to 22D. Different from the heat exchanger 10 of the first embodiment, a heat exchanger 10 of this embodiment is prepared by adding zinc (i.e., Zn) to a surface of the tube 12 in various manners as illustrated FIGS. 22A to 22D, wherein a fillet is mitted.

Figure 22A:
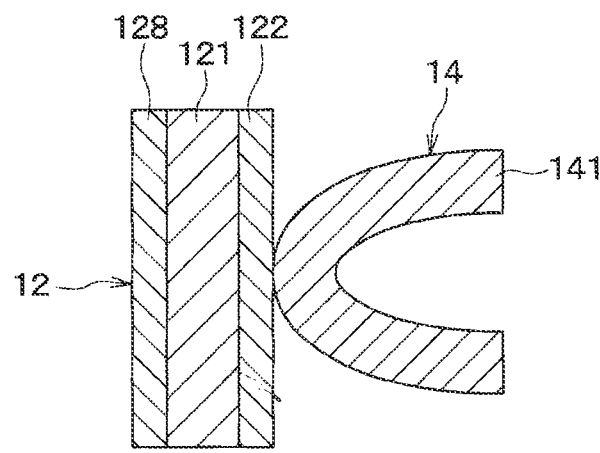
FIGS. 22A to 22D are cross-sectional views illustrating typical examples of a tube and a fin according to a seventh embodiment of the present disclosure, respectively.

Specifically, in an example of FIG. 22A, a tube 12 includes a core material layer 121, a brazing material layer 122 and a cladding layer 128. The cladding layer 128 lies on an opposite side of a core material layer 121 to a side thereof on which a brazing material layer 122 lies (i.e., a side facing a fin 14). The cladding layer 128 is composed of an aluminum alloy, such as Al—Zn-based alloy, etc., excluding brazing material, for example. The fin 14 may consist of a core material layer 141. The brazing material layer 122 of the tube 12 and the core material layer 141 of the fin 14 are joined together.

Figure 22B:
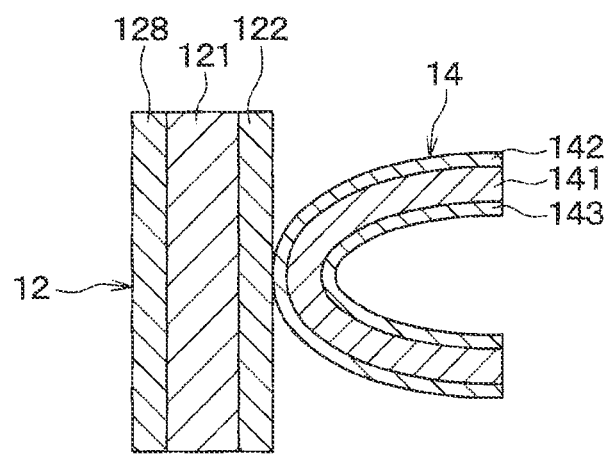

Further, in an example of FIG. 22B, a tube 12 includes a core material layer 121, a brazing material layer 122 and a cladding layer 128 as in the example of FIG. 22A. However, unlike the example of FIG. 22A, the fin 14 includes a core material layer 141 and two brazing material layers 142 and 143. Hence, the brazing material layer 122 of the tube 12 and one of the brazing material layers 142 and 143 of the fin 14 may be joined together.

Figure 22C:
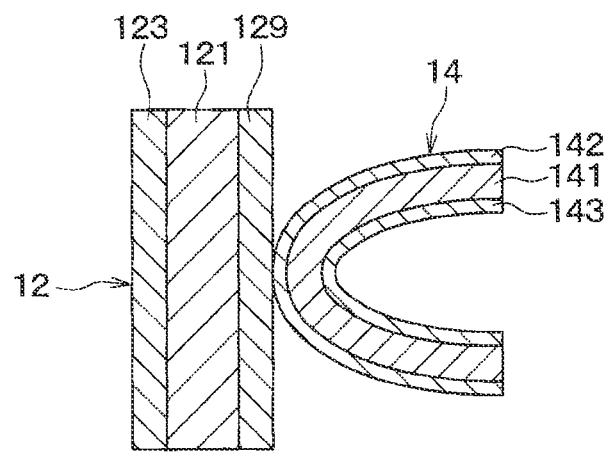

Further, in an example of FIG. 22C, a tube 12 includes a core material layer 121, a brazing material layer 123 and a cladding layer 129 again. The cladding layer 129 lies on an opposite side of the core material layer 121 (i.e., a side thereof facing the fin 14) to a side thereof on which the brazing material layer 123 lies. The cladding layer 129 is composed of an aluminum alloy, such as Al—Zn-based alloy, etc., excluding brazing material, for example. The fin 14 includes a core material layer 141 and two brazing material layers 142 and 143. Hence, the cladding layer 129 of the tube 12 and one of the brazing material layers 142 and 143 of the fin 14 may be joined together.

Figure 22D:
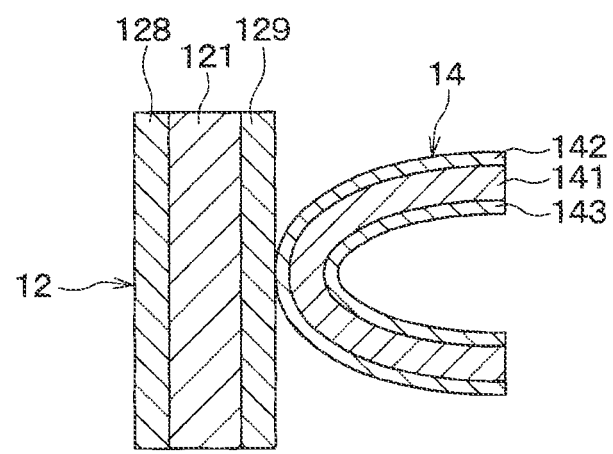

Further, in an example of FIG. 22D, the tube 12 includes a core material layer 121 and two cladding layers 128 and 129. The fin 14 includes a core material layer 141 and two brazing material layers 142 and 143. Hence, the cladding layer 129 of the tube 12 and one of the brazing material layers 142 and 143 of the fin 14 may be joined together.

Figure 23:
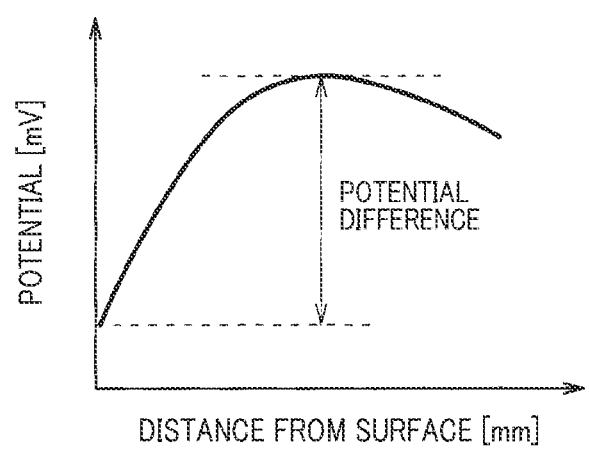
FIG. 23 is a graph illustrating a relation between a distance from a surface of the tube and a potential according to the seventh embodiment of the present disclosure.

In addition, in each of the examples of FIG. 22A to 22D, a potential difference of 50 mV or more is created in the tube 12 in a plate thickness direction of the tube 12. This potential difference is a difference between highest and lowest voltages generated in the tube 12 in the plate thickness direction thereof as shown in FIG. 23. As shown in FIG. 23, a potential is lowest on a surface of the tube 12. In some cases, however, the potential becomes lowest at a portion other than the surface of the tube 12.

Since remaining configurations of the heat exchanger 10 of this embodiment of the present disclosure are substantially the same as those of the first embodiment of the present disclosure, similar advantages can be obtained in this embodiment as obtained in the first embodiment of the present disclosure. In addition, according to this embodiment, since the potential difference of 50 mV or more is created in the tube 12 in the thickness direction thereof, the heat exchanger 10 can provide a high corrosion resistance as described later with reference to various practical examples.

Further, unlike this embodiment of the present disclosure, when a heat exchanger is brazed by using a vacuum brazing method, Zn contained in a cladding layer generally evaporates. Hence, a potential created after brazing of the tube 12 is lower than 50 mV.

By contrast, the heat exchanger 10 of this embodiment is brazed in an environment of a lower oxygen concentration than the atmosphere at either atmospheric pressure or a higher pressure than atmospheric pressure. Accordingly, an amount of evaporation of Zn from the cladding layer can be decreased, while enabling to make a potential difference of 50 mV or more.

Further, although Zn is added to the cladding layer 128 (129) according to this embodiment, Zn can be contained in the brazing material layer 122 when the tube 12 includes the brazing material layer 122. Further, when the tube 12 includes a brazing material layer 123, the brazing material layer 123 can contain Zn as well.

Figure 24:
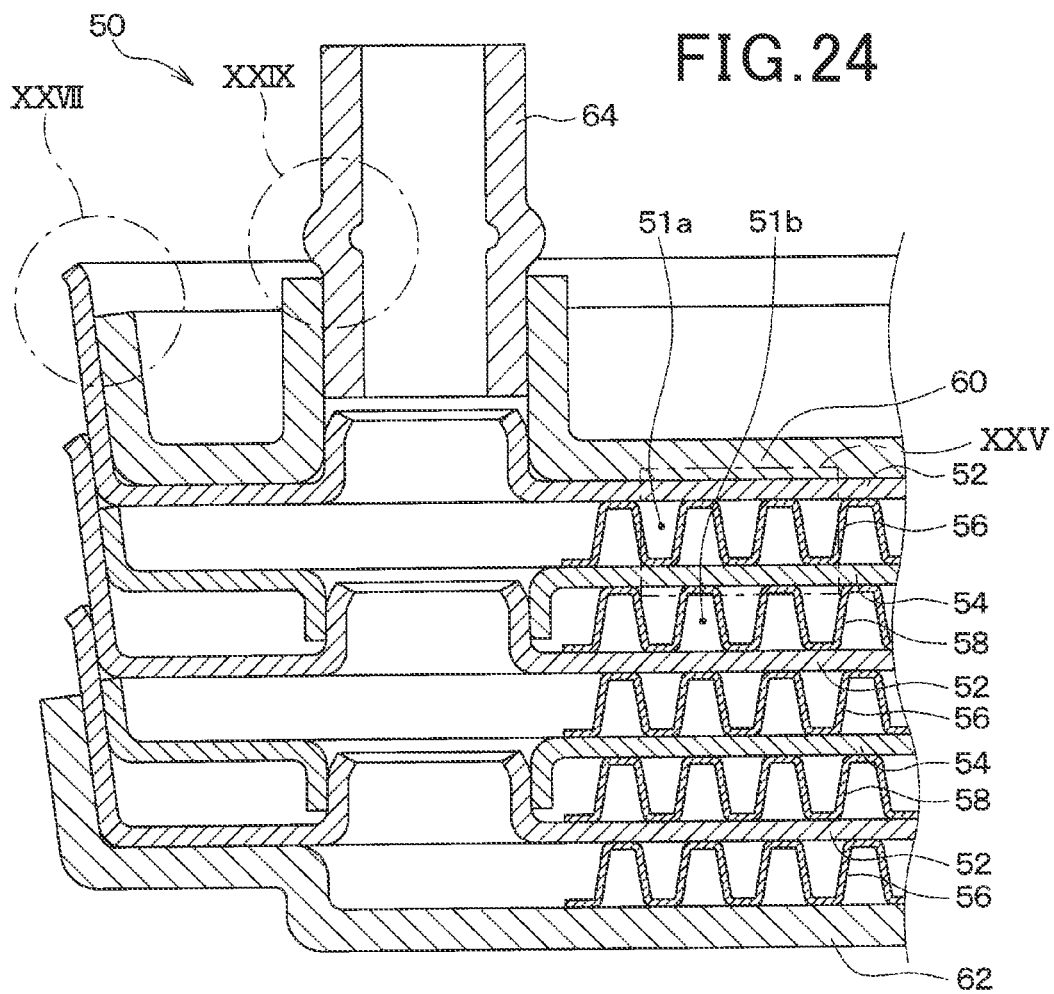
FIG. 24 is a cross-sectional view illustrating a heat exchanger according to an eighth embodiment of the present disclosure.

Now, an eighth embodiment of the present disclosure is described with reference to FIG. 24. As shown in FIG. 24, a heat exchanger 50 of this embodiment is a laminate type heat exchanger prepared by laminating multiple plates. The heat exchanger 50 includes first and second multiple plates 52 and 54, first and second multiple fins 56 and 58, two reinforcement plates 60 and 62 and a pipe 64. Each of these multiple plates 52 and 54, multiple fins 56 and 58, two reinforcement plates 60 and 62 and the pipe 64 are composed of an aluminum alloy.

These first and second multiple plates 52 and 54 act as flow channel forming members to form first flow channels 51a in which first fluids flow and second flow channels 51b in which second fluids flow, respectively. These multiple plates 52 and 54 are alternately laminated in a given direction to alternately form the first and second flow channels. Hence, the heat exchanger 50 exchanges heats of the first fluids flown through the first flow channels 51a and the second fluids flown through the second flow channels 51b.

Hence, the first flow channel 51a is formed between the first plate 52 and the second plate 54. The second flow channel 51b is formed between the second plate 54 and another first plate 52. Also, another first flow channel 51a is also formed between yet another first plate 52 located at one end of a stack of multiple plates 52 and 54 in a stacking direction and the reinforcement plate 62. The first flow channel 51a communicates with an inner space of the pipe 64.

The first and second multiple fins 56 and 58 act as heat transfer members with heat transfer surfaces wider than respective surfaces of the multiple plates 52 and 54. These first and second multiple fins 56 and 58 enhance performance of heat transfer between the first fluids and the second fluids. Each of the first and second multiple fins 56 and 58 is a corrugated fin prepared by molding a plate into a waved shape. Each of the multiple fins 56 and 58 can be molded into another shape than the waved shape.

Here, the multiple first fins 56 are located in the multiple first flow channels 51a, respectively. The multiple second fins 58 are located in the multiple second flow channels 51b, respectively.

Figure 25:
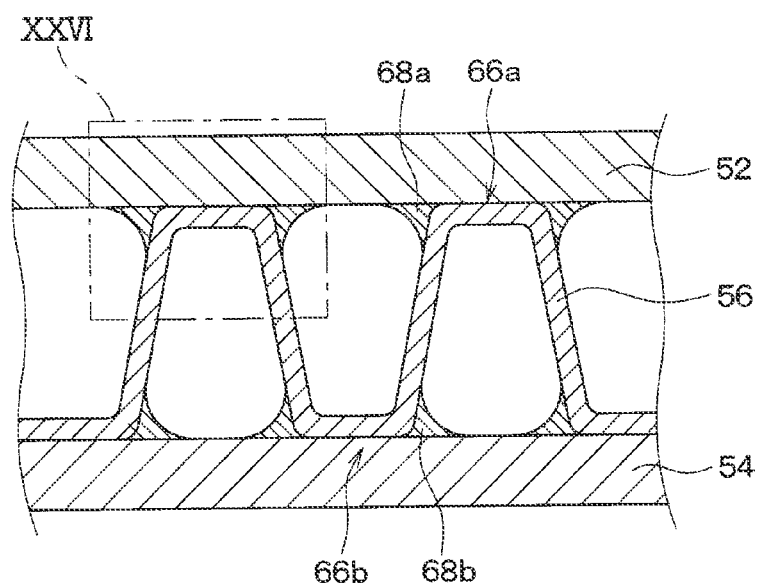
FIG. 25 is a cross-sectional view illustrating typical first and second plates and a first fin according to an eighth embodiment of the present disclosure.

As shown in FIG. 25, the first fin 56 is brazed to the first plate 52 and the second plate 54. Multiple fillets 68a and 68b are formed in a joining portion 66a, in which the first fin 56 and the first plate 52 join and a joining portion 66b, in which the first fin 56 and the second plate 54 join, respectively. Hence, in the claimed invention, each of these fillets 68a and 68b corresponds to the first fillet formed in a braze joining portion in which the heat transfer member and the flow channel forming member join with each other.

Although not illustrated, the second fin 58 is also brazed to the first plate 52 and the second plate 54. Multiple fillets are similarly formed in a joining portion in which the second fin 58 and the first plate 52 join and another joining portion in which the second fin 58 and the second plate 54 join, respectively. Hence, in the claimed invention, the fillet corresponds to the first fillet formed in a braze joining portion in which the heat transfer member and the flow channel forming member join with each other.

Further, each of the first and second plates 52 and 54 and the first and second fins 56 and 58 may employ various layer structures, and combined with each other in various manners as illustrated in FIGS. 26A to 26E, wherein only the first plate 52 and the first fin 56 are illustrated and the fillet 68a is not illustrated. Specifically, as shown in FIGS. 26A to 26E, at least one of the plate 52 (54) and the fin 56 (58) includes a brazing material layer on a surface thereof.

Figure 26A:
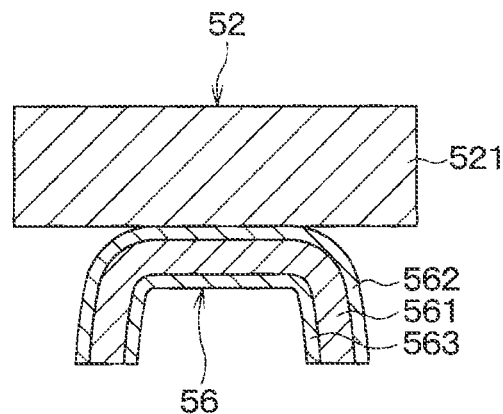
FIGS. 26A to 26E are enlarged views illustrating typical examples of a section XXVI illustrated FIG. 25, respectively.

In an example of FIG. 26A, the first plate 52 is composed only of a core material layer 521. A first fin 56 includes a core material layer 561 and two brazing material layers 562 and 563. These two brazing material layers 562 and 563 are located on both sides of the core material layer 561. Hence, the core material layer 521 of the first plate 52 and the brazing material layer 562 of the first fin 56 are brazed thereby joined together.

Figure 26B:
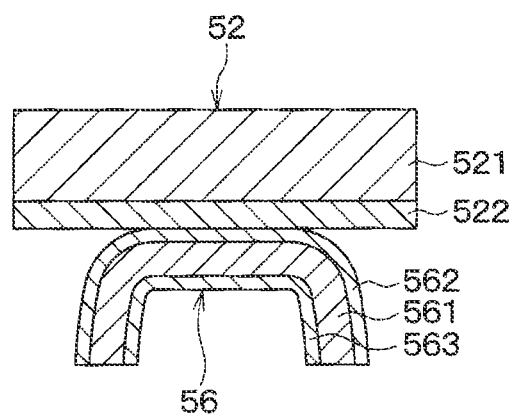

In an example of FIG. 26B, the first plate 52 includes a core material layer 521 and a brazing material layer 522. The brazing material layer 522 is located on one side of the core material layer 521. A first fin 56 is substantially the same as the example of FIG. 26A. The brazing material layer 562 of the first plate 52 and the brazing material layer 522 of the first fin 56 are joined together.

Figure 26C:
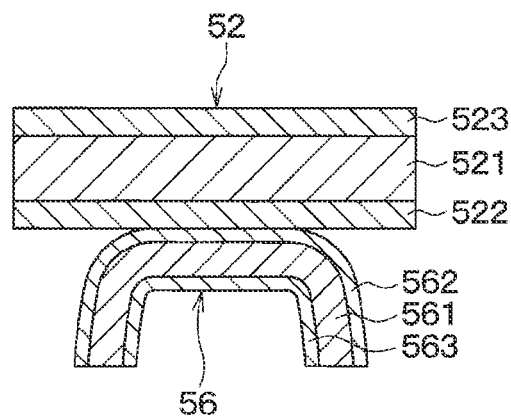

In an example of FIG. 26C, a first plate 52 includes a core material layer 521 and two brazing material layers 522 and 523. The brazing material layer 523 is located on an opposite side of the core material layer 521 to a side thereof on which the brazing material layer 522 is laminated. A first fin 56 is substantially the same as that in the example of FIG. 26A. Hence, the brazing material layer 522 of the first plate 52 and the brazing material layer 562 of the first fin 56 are joined together.

Figure 26D:
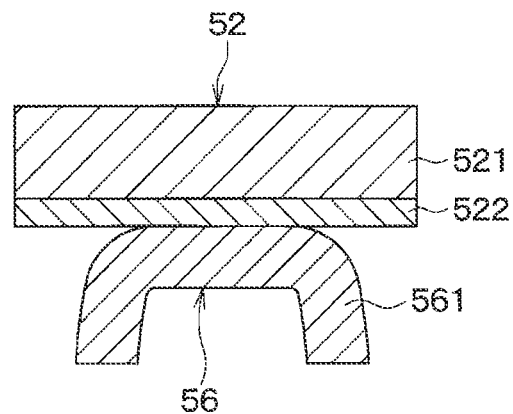

In an example of FIG. 26D, a first plate 52 is substantially the same as that in the example of FIG. 26B. A first fin 56 is composed only of a core material layer 561. Hence, the brazing material layer 522 of the first plate 52 and the core material layer 561 of the first fin 56 are joined together.

In an example of FIG. 26D, a first plate 52 is substantially the same as that in the example of FIG. 26B. A first fin 56 is composed only of a core material layer 561. Hence, the brazing material layer 522 of the first plate 52 and the core material layer 561 of the first fin 56 are joined to together.

Figure 26E:
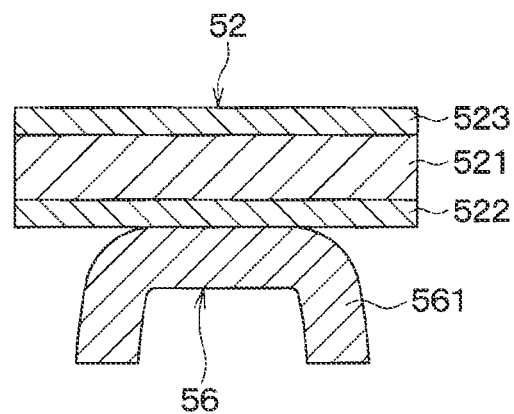

In an example of FIG. 26E, a first plate 52 is substantially the same as that in FIG. 26C. A first fin 56 is substantially the same as that in FIG. 26D. Hence, the brazing material layer 522 of the first plate 52 and the core material layer 561 of the first fin 56 are joined to together.

Here, these core material layers 561 of the first plate 52 and the first fin 56 are composed of Al—Mn-based alloys, respectively. The brazing material layers 522 and 523 of the first plate 52 and the brazing material layers 562 and 563 of the first fin 56 are composed of Al—Si-based alloys, respectively. Further, each the first plate 52 and the second fin 58, the second plate 54 and the first fin 56 and the second plate and the second fin 58 may have various layer structures, and may be combined in substantially the same manner as combined in FIGS. 26A to 26E.

Further, yet another example is described with reference to FIG. 24. That is, two reinforcement plates 60 and 62 are provided as shown in FIG. 24 to act as reinforcing members to collectively reinforce a stack of laminated multiple plates 52 and 54. The reinforcement plate 60 located on one side of the stack of the multiple laminated plates 52 and 54 in a given direction is brazed to the first plate 52 located on the one side thereof. The other reinforcement plate 62 located on the other end of the stack of laminated plates 52 and 54 in the given direction is brazed to the first plate 52 located on the other end of the stack of laminated plates 52 and 54 in the given direction. Between the other reinforcement plate 62 and the first plate 52, a first flow channel 51a is formed.

Figure 27:
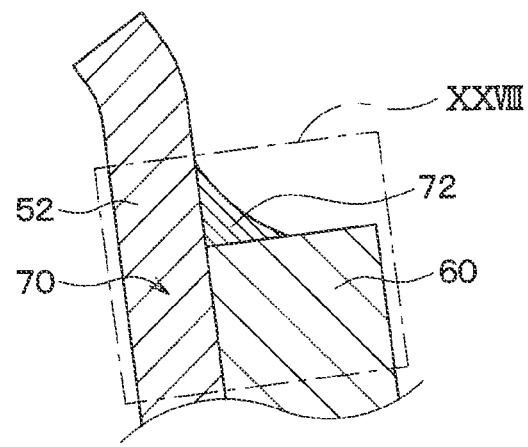
FIG. 27 is an enlarged view illustrating an example of a section XXVII illustrated FIG. 24.

Further, as shown in FIG. 27, in a braze joining portion 70 formed by the first plate 52 and the reinforcement plate 60, a fillet 72 is formed. In the claimed invention, the fillet 72 corresponds to a second fillet formed in a braze joining portion formed by a flow channel forming member and a reinforcing member. Further, although not shown, in as braze joining portion formed by the first plate 52 and the second reinforcement plate 62, a fillet corresponding to a second fillet in the claimed invention is formed.

Here, each of the first plate 52 and the reinforcement plate 60 may employ various layer structures and may be combined with each other in various manners as shown in FIGS. 28A to 28J, wherein the fillet 72 is not shown. Specifically, as shown in FIGS. 28A to 28J, at least one of the first plate 52 and the reinforcement plate 60 includes a brazing material layer on a surface thereof.

Figure 28A:
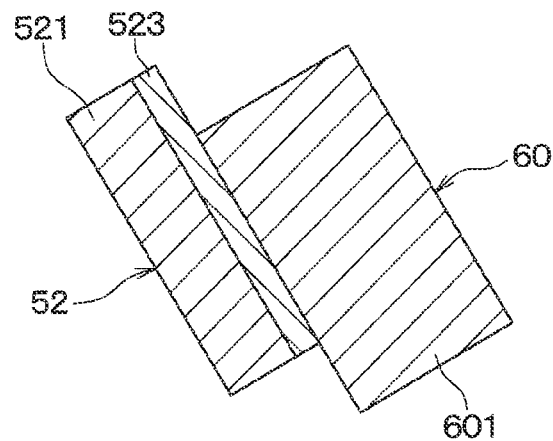
FIGS. 28A to 28J are enlarged views illustrating typical examples of a section XXVIII illustrated in FIG. 27, respectively.
Figure 28B:
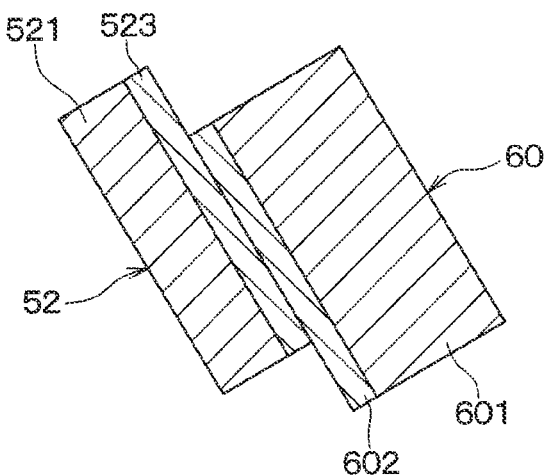
Figure 28C:
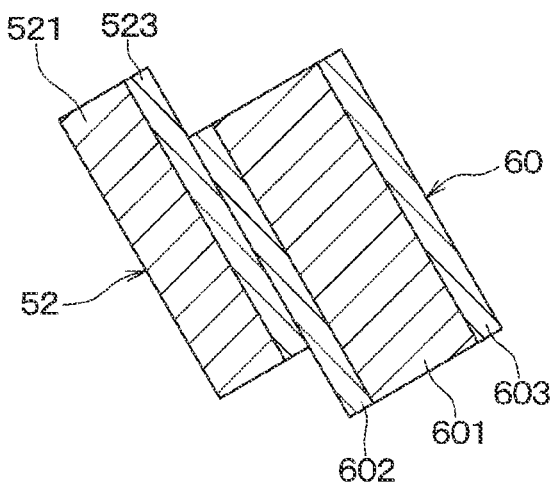
Figure 28D:
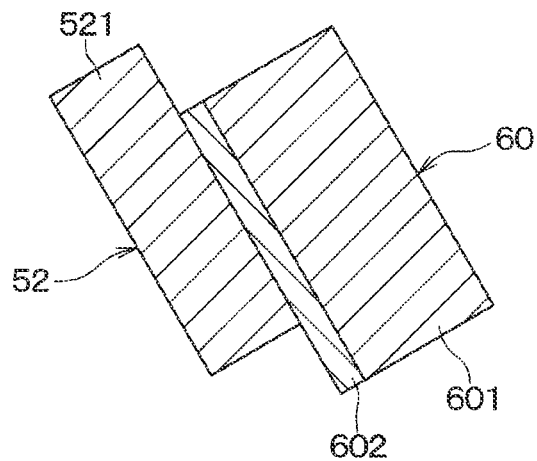
Figure 28E:
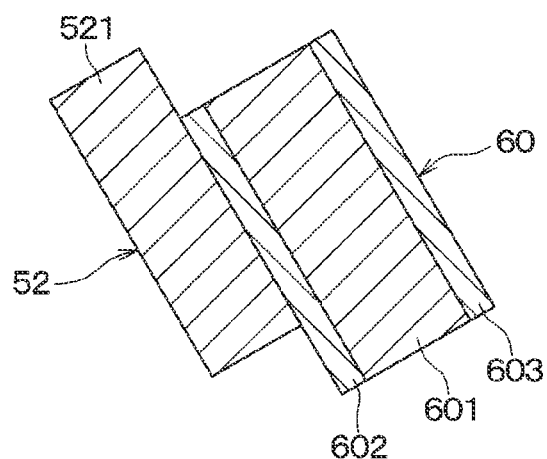
Figure 28F:
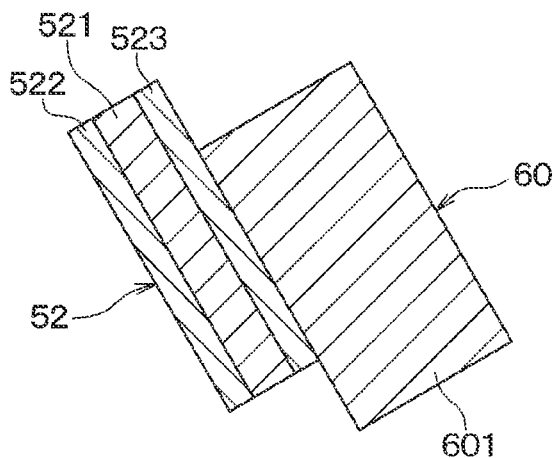
Figure 28G:
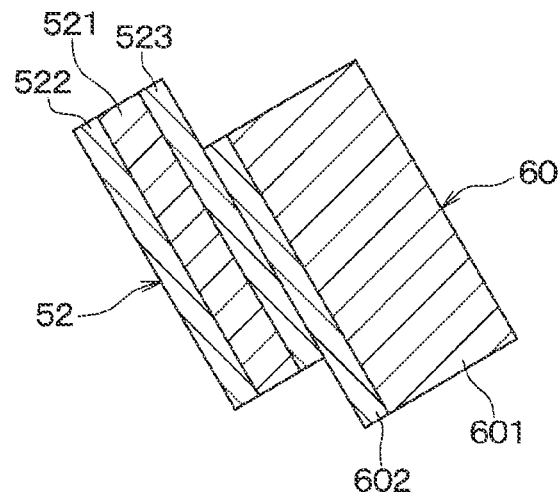
Figure 28H:
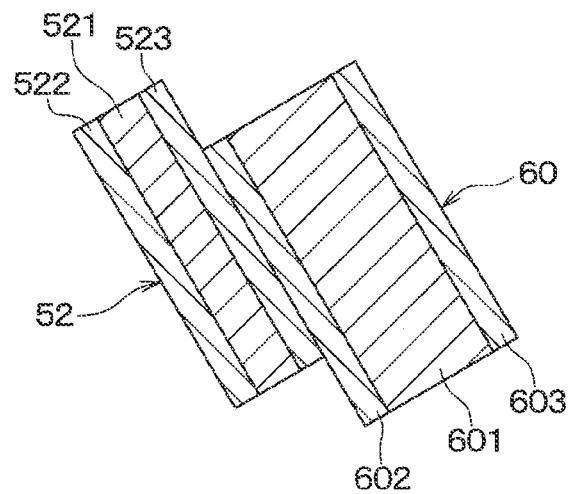
Figure 28I:
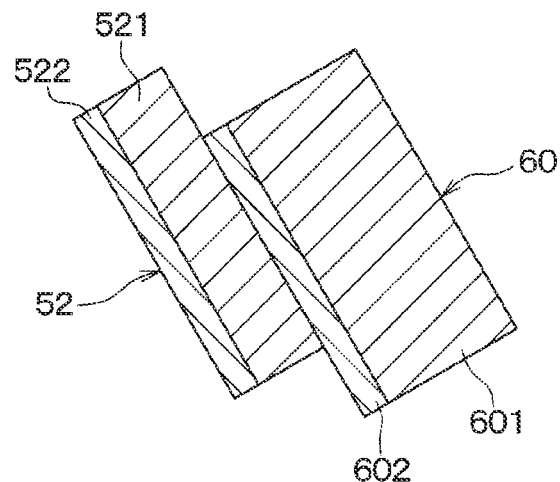
Figure 28J:
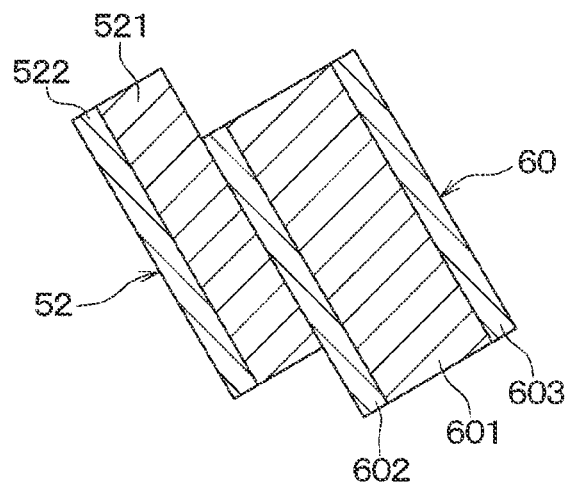

In examples of FIG. 28A to 28C, the first plate 52 includes a core material layer 521 and a brazing material layer 523. The brazing material layer 523 is located on a surface of the core material layer 521 facing the reinforcement plate 60. In each of examples of FIGS. 28D and 28E, a first plate 52 is composed only of a core material layer 521. In each of examples of FIGS. 28F to 28H, a first plate 52 includes a core material layer 521 and two brazing material layers 522 and 523. The brazing material layer 522 is located on an opposite side of the core material layer 521 to a side thereof facing the reinforcement plate 60. In each of examples of FIGS. 28I to 28J, a first plate 52 includes a core material layer 521 and a brazing material layer 522.

In each of examples of FIGS. 28A to 28F, one of reinforcing members 60 is composed only of a core material layer 601. Where as in examples of FIGS. 28B, 28D, 28G and 28I, the reinforcing member 60 includes a core material layer 601 and a brazing material layer 602. The brazing material layer 602 is located on a side of the core material layer 601 facing the first plate 52. In examples of FIGS. 28C, 28E, 28H and 28J, a reinforcing member 60 includes a core material layer 601 and two brazing material layers 602 and 603. The brazing material layer 603 is located on an opposite side of the core material layer 601 to a side thereof facing the first plate 52. The core material layer 601 is composed of an Al—Mn-based alloy. The brazing material layers 602 and 603 are composed of Al—Si-based alloys, respectively.

Figure 29:
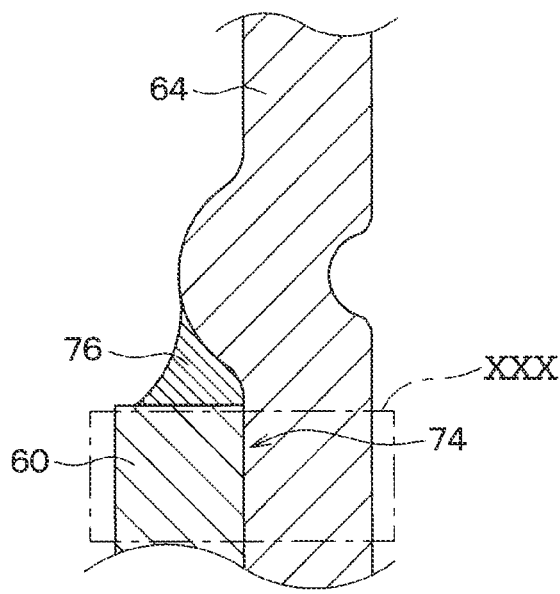
FIG. 29 is an enlarged view illustrating an example of a section XXIX illustrated FIG. 24.
Figure 30A:
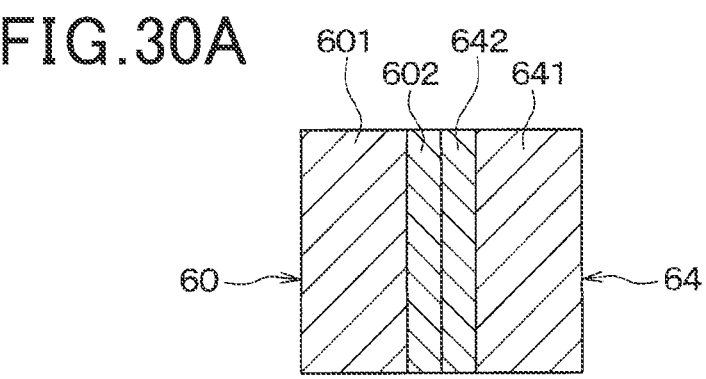
FIGS. 30A to 30L are enlarged views illustrating typical examples of a section XXX illustrated in FIG. 27, respectively.
Figure 30B:
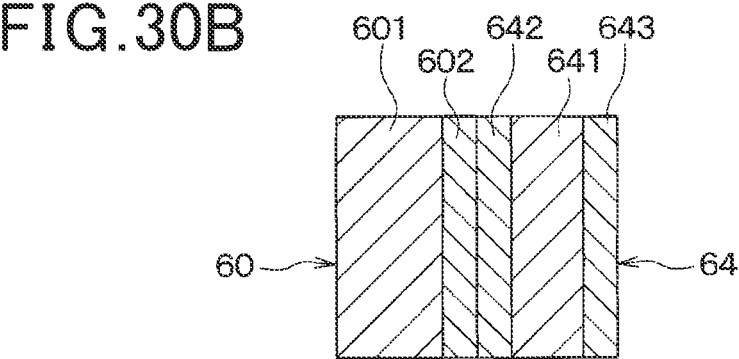
Figure 30C:
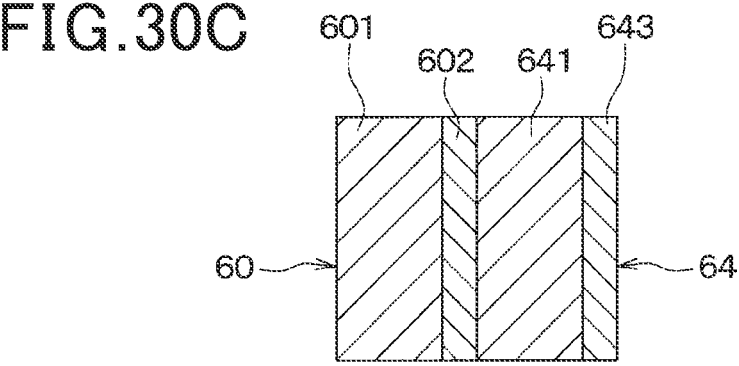
Figure 30D:
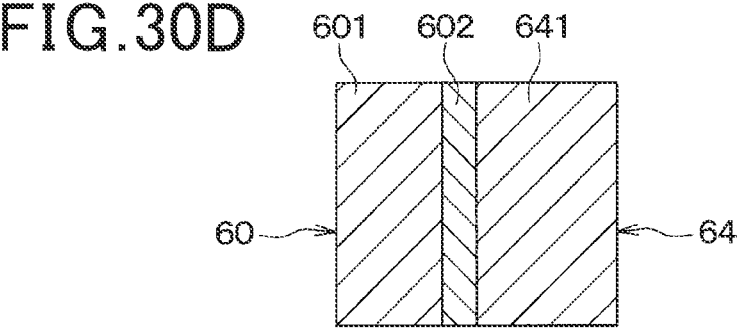
Figure 30E:
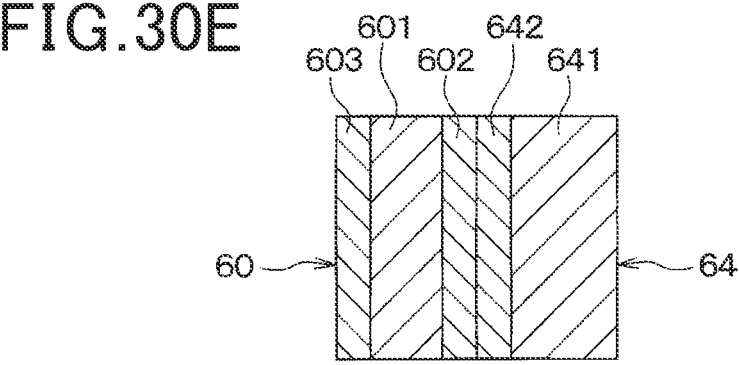
Figure 30F:
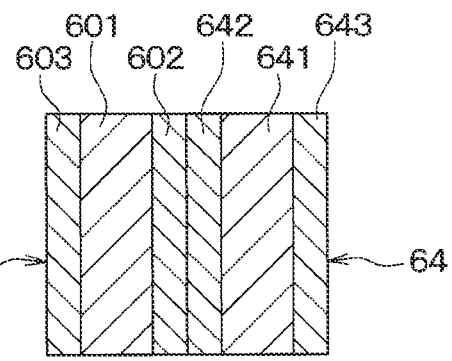
Figure 30G:
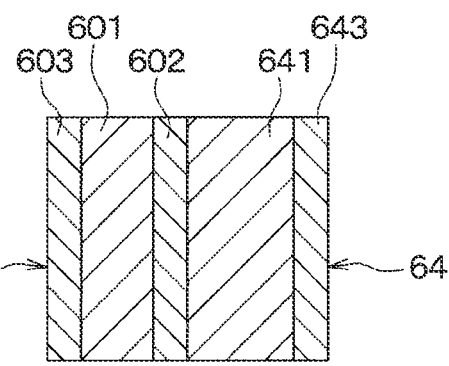
Figure 30H:
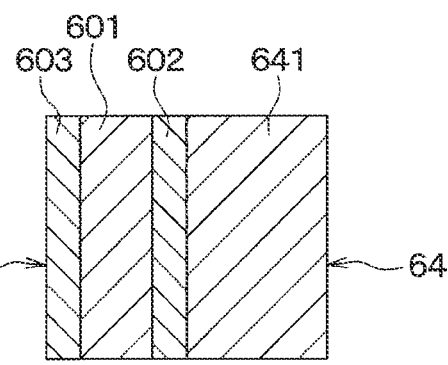
Figure 30I:
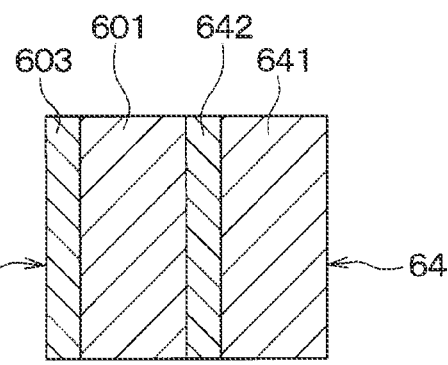
Figure 30J:
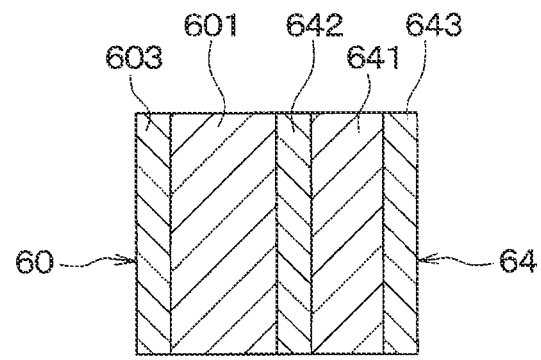
Figure 30K:
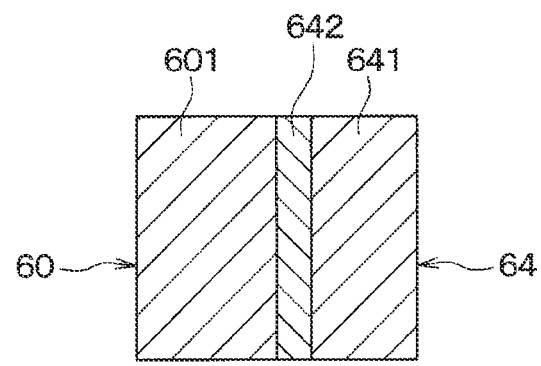
Figure 30L:
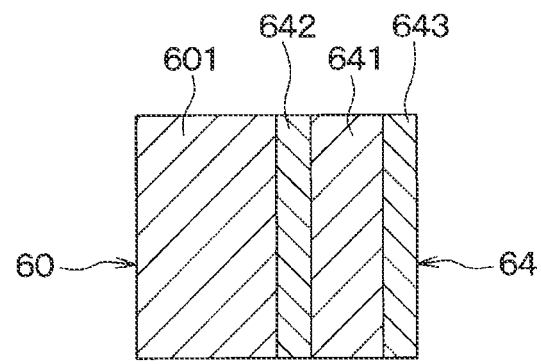

Further, a pipe 64 shown in FIG. 24 accommodates a flow channel communicating with the first flow channel 51a. The pipe 64 is brazed to the reinforcement plate 60 located on the one end of the stack. Accordingly, in the claimed invention, the pipe 64 corresponds to a joining member joined to the reinforcing member. Further, as shown in FIG. 29, a fillet 76 is formed in a braze joining portion 74 formed by the reinforcement plate 60 of the one end of the stack and the pipe 64. Hence, in the claimed invention, the fillet 76 corresponds to a third fillet formed in a braze joining portion formed by a reinforcing member and a joining member.

Here, each of the reinforcement plate 60 and the pipe 64 may employ various layer structures and may be combined with each other in various manners as illustrated in FIGS. 30A to 30L, wherein the fillet 76 is not shown. As shown in FIGS. 30A to 30L, at least one of the reinforcement plate 60 and the pipe 64 includes a brazing material layer on a surface thereof.

In each of examples of FIG. 30A to 30D, a reinforcement plate 60 located on the one end of the stack includes a core material layer 601 and a brazing material layer 602. The brazing material layer 602 is located on a side of the core material layer 601 facing the pipe 64. In each of examples of FIG. 30E to 30H, a reinforcement plate 60 located on one side of the stack includes a core material layer 601 and two brazing material layers 602 and 603. The brazing material layer 603 is located on an opposite side of the core material layer 601 to a side thereof facing the pipe 64. In examples of FIGS. 30I and 30J, a reinforcement plate 60 located on one end of the stack includes a core material layer 601 and a brazing material layer 603. Further, in each of examples of FIGS. 30K and 30L, a reinforcement plate 60 located on one end of the stack is composed only of a core material layer 601.

Further, in each of the examples of FIGS. 30A, 30E, 30I and 30K, the pipe 64 includes the core material layer 641 and the brazing material layer 642. The brazing material layer 642 is located on a side of the core material layer 641 facing the reinforcement plate 60. In each of the examples of FIGS. 30B, 30F, 30J and 30L, the pipe 64 includes the core material layer 641 and two brazing material layers 642 and 643. The brazing material layer 643 is located on an opposite side of the core material layer 641 to a side thereof facing the reinforcement plate 60. In each of examples of FIGS. 30C and 30G, the pipe 64 includes the core material layer 641 and the brazing material layer 643. In each of the examples of FIGS. 30D and 30H, the pipe 64 is composed only of the core material layer 641. The core material layer 641 is composed of an Al—Mn-based alloy. The brazing material layers 642 and 643 are composed of Al—Si-based alloys, respectively.

Further, like the heat exchanger 10 of the first embodiment of the present disclosure, the heat exchanger 10 of this embodiment is produced by using a brazing process without applying flux in an ambience of a lower oxygen concentration than the atmosphere at either atmospheric pressure or a higher pressure than atmospheric pressure. Accordingly, the flux is absent in the heat exchanger 50 of this embodiment of the present disclosure.

Further, the heat exchanger 50 of this embodiment of the present disclosure may satisfy the below described fourth to sixth conditions.

First, a plate thickness of each of components of the heat exchanger 50 meets the fourth condition as described below. That is, an average thickness of each of the first and second plates 52 and 54 is from 0.200 mm or more to 0.600 mm or less. An average thickness of each of the first and second fins 56 and 58 is from 0.025 mm or more to 0.150 mm or less. An average thickness of each of the reinforcement plates 60 and 62 is greater than 0.600 mm and is 2.000 mm or less. Further, an average thickness of the pipe 64 is greater than 0.600 mm and is 2.000 mm or less.

Thus, the average plate thickness of each of the reinforcement plates 60 and 62 and the pipe 64 is greater than that of the first and second plates 52 and 54 and the first and second fins 56 and 58. Accordingly, the reinforcement plates 60 and 62 and the pipe 64 are relatively thicker members among the components of the heat exchanger 50. By contrast, the first and second plates 52 and 54 and the first and second fins 56 and 58 are relatively thinner members among the components of the heat exchanger 50.

The fifth condition relates to contained chemical elements in a fillet and these concentrations as described below. That is, each of the fillets 68a, 68b, 72 and 76 is composed of an aluminum alloy containing Mg, Bi and Si. An Mg concentration of each of the fillets 68a, 68b, 72 and 76 is from 0.2% or more to 2.0% or less, and is preferably 0.3% or more by mass.

Hence, in the claimed invention, each of the fillets 68a and 68b formed in the braze joining portions 66a and 66b formed by the first and the second plates 52 and 54 and the first and second fins 56 and 58, respectively, corresponds to a first fillet formed in a braze joining portion formed by thin members. Further, in the claimed invention, the fillet 72 formed in the braze joining portion 70 formed by the first plate 52 and the reinforcement plate 60 located at one end of the stack corresponds to a second fillet formed in a braze joining portion formed by a thin member and a thick member. Further, in the claimed invention, the fillet 76 formed in the braze joining portion 74 formed by the reinforcement plate 60 located at one end of the stack and the pipe 64 corresponds to a third fillet formed in a braze joining portion formed by thick members.

Now, the sixth condition relating to a Mg concentration at a plate thickness center of each of components having a brazing material layer is herein described. That is, at least one of the plates 52 (or 54) and the fin 56 (or 58) has a brazing material layer 522 or 562 (or 563) on a surface thereof. As shown in FIGS. 26D and 26E, when the plate 52 (54) has the brazing material layer 522 while the fin 56 (58) does not have the brazing material layer, the Mg concentration of the plate 52 (54) at its plate thickness center thereof is from 0.1% or more to 1.0% or less by mass. Further, as shown in FIG. 26A, when the fin 56 (58) has the brazing material layer 562 (563) while the plate 52 (54) does not have the brazing material layer, the Mg concentration of the fin 56 (58) at the plate thickness center is from 0.2% or more to 1.0% or less by mass. Further, as shown in FIGS. 26B and 26C, when both of the plate 52 (54) and the fin 56 (58) have brazing material layers 522 and 562 (or 563), a Mg concentration of the plate 52 (54) at the plate thickness center is from 0.1% or more to 1.0% or less by mass. Further, a Mg concentration of the fin 56 (58) at the plate thickness center thereof is from 0.2% or more to 1.0% or less by mass.

Here, a method of measuring the average thickness, that of measuring the Mg concentration of the fillet, and that of measuring the Mg concentration at the plate thickness center are substantially the same as those employed in the first embodiment of the present disclosure.

Hence, due to meeting the 4th condition in the heat exchanger 50, according to this embodiment, the thin members, the thin member and the thick member and the thick members are joined together, respectively. Further, since the fifth and sixth concentrations are substantially the same as the second and third concentrations met by the first embodiment, the same advantage can be obtained in this embodiment as obtain by the first embodiment.

Figure 31:
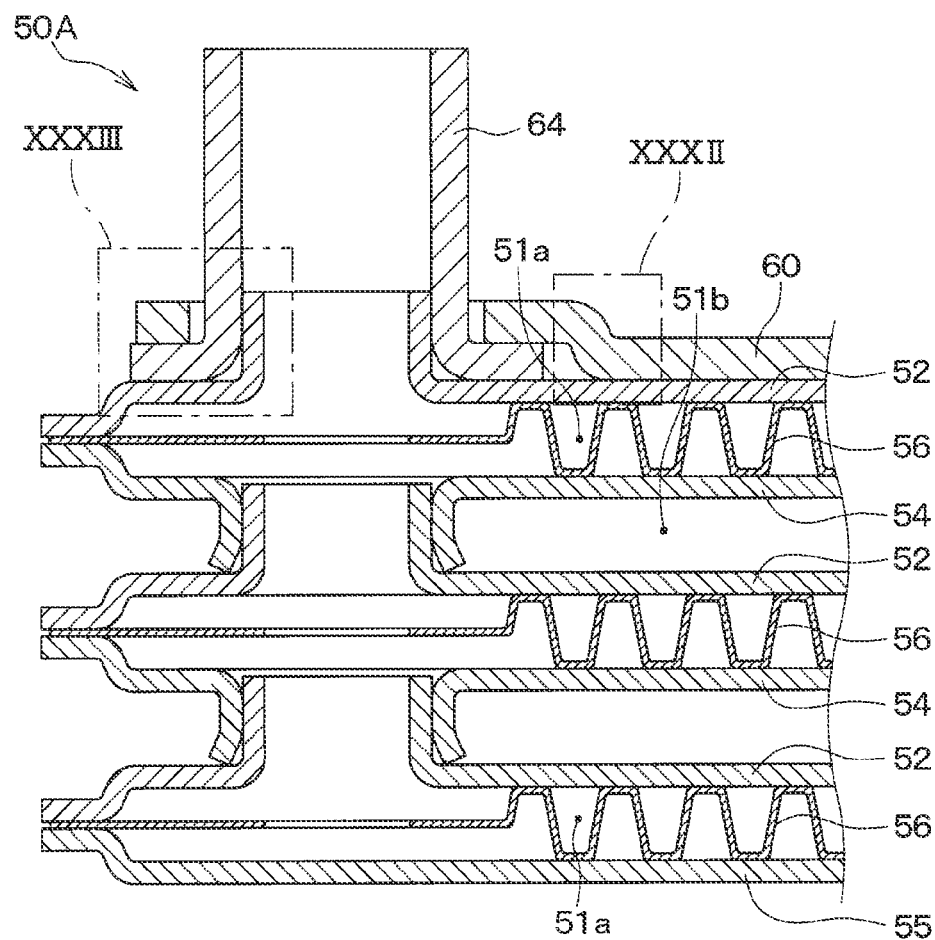
FIG. 31 is a cross-sectional view illustrating a heat exchanger according to a ninth embodiment of the present disclosure.

Now, a ninth embodiment of the present disclosure is described herein below with reference to FIG. 31. As shown in FIG. 31, a heat exchanger 50A of this embodiment is different from the heat exchanger 50 of the eighth embodiment in that a second flow channel 51b is not sealed and a second fin 58 is excluded. Further, in the heat exchanger 50A of this embodiment, one end of a first fin 56 is sandwiched by a first plate 52 and a second plate 54. In this state, the first plate 52, the second plate 54 and the first fin 56 are brazed together. Further, in the heat exchanger 50A of this embodiment, instead of the reinforcement plate 62 of the eighth embodiment, a third plate 55 is used as one of multiple plates. Hence, the third plate 55 collectively forms a first flow channel 51a together with the first plate 52 there between. Accordingly, in the claimed invention, the third plate 55 corresponds to a flow channel forming member to form a flow channel.

As shown in FIG. 25, fillets 68a and 68b are formed in braze joining portions formed by the plate 52 and 54 (55) and the fin 56 as first fillets, respectively. Further, each of the plates 52 and 54 (55) and each of the fins 56 and 58 may employ various layer structures and may be combined with each other in various manners as shown in FIGS. 26A to 26E like the eighth embodiment.

Figure 32:
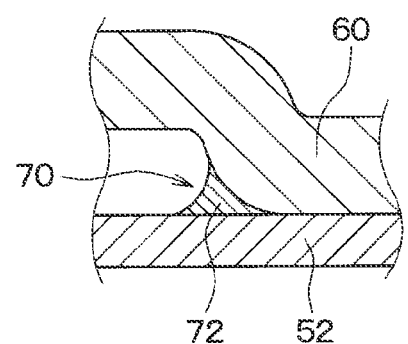
FIG. 32 is an enlarged view illustrating a section XXXII illustrated FIG. 31.

Further, as shown in FIG. 32, the first plate 52 and a reinforcement plate 60 are brazed together. In a braze joining portion 70 formed by the first plate 52 and the reinforcement plate 60, a fillet 72 is formed as a second filet. Further, the first plate 52 and the reinforcement plate 60 may employ various layer structures and are combined with each other in substantially the same manner as in the eighth embodiment.

Figure 33:
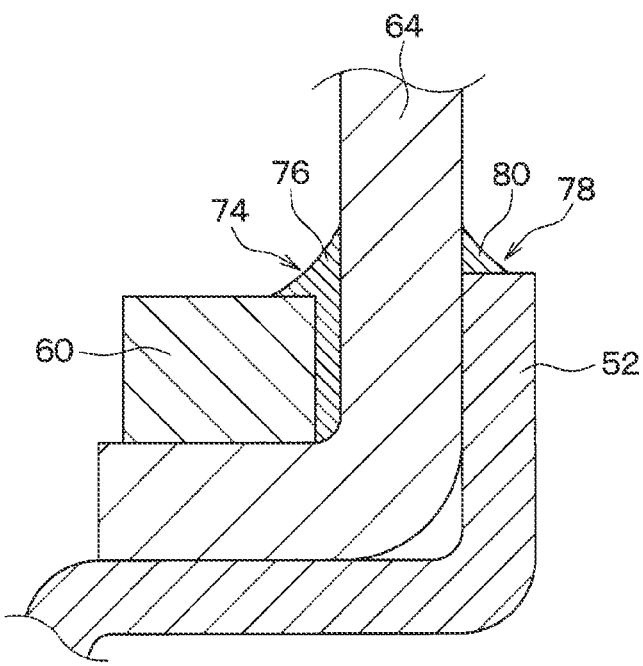
FIG. 33 is an enlarged view illustrating a section XXXIII illustrated FIG. 31.

Further, as shown in FIG. 33, a pipe 64 is brazed to the reinforcement plate 60. In a joining portion 74 formed by the reinforcement plate 60 and the pipe 64, a fillet 76 is formed as a third fillet. Further, the reinforcement plate 60 and the pipe 64 may employ various layer structures and are combined with each other in the same manner as in the eighth embodiment.

Further, the first plate 52 and the pipe 64 are brazed together. In a braze joining portion 78 formed by the first plate 52 and the pipe 64, a fillet 80 is formed.

Remaining configurations of the heat exchanger 50A of this embodiment are substantially the same as the heat exchanger 50 of the eighth embodiment. Accordingly, in this embodiment of the present disclosure, substantially the same advantage obtained in the eighth embodiment can be obtained.

Figure 34:
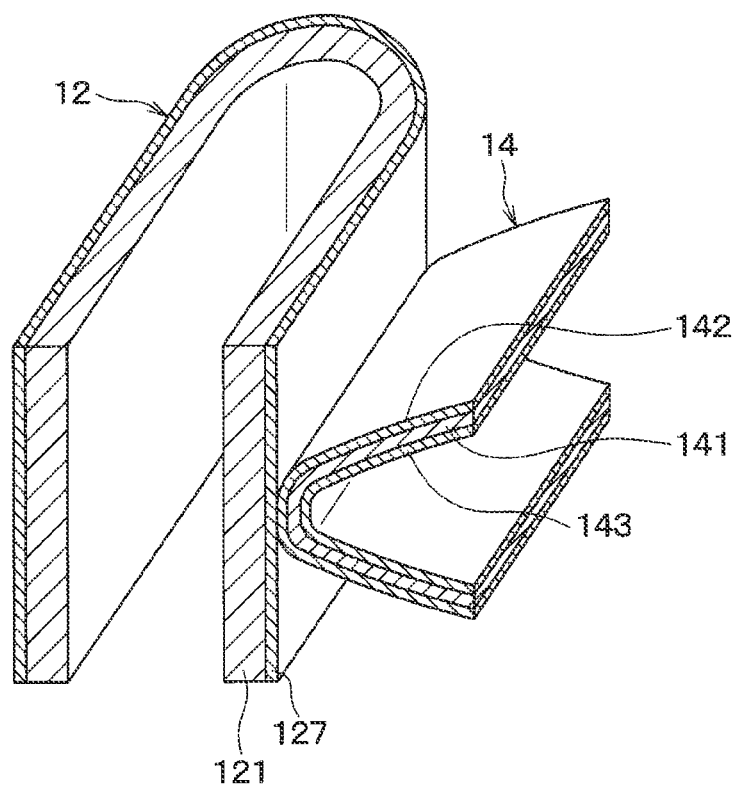
FIG. 34 is cross-sectional view illustrating a tube and a fin according to a tenth embodiment of the present disclosure.

Now, a tenth embodiment of the present disclosure is described herein below with reference to FIG. 34. In this embodiment, a relation between an Mg concentration in a surface of a cladding layer 127 and an Mg concentration of a tube 12 at its plate thickness center is different from that in the fourth embodiment. That is, as shown in FIG. 34, according to this embodiment, a fin 14 includes a core material layer 141 and brazing material layers 142 and 143 as that in the fourth embodiment. The tube 12 includes a core material layer 121 and a cladding layer 127. The cladding layer 127 of the tube 12 and the brazing material layer 142 (143) of the fin 14 are joined together. However, different from the fourth embodiment, the tube 12 does not have the brazing material layer in this embodiment. Further, in this embodiment, unlike the fourth embodiment, as a tube 12 before brazing, a tube composed of a core material layer 121 having an Mg concentration ranging from 0% or more to 0.1% or less by mass, and a cladding layer 127 having an Mg concentration ranging from 0% or more to 0.1% or less by mass is used. As a result of brazing, the Mg concentration in the surface layer of the cladding layer 127 is either the same or different (i.e., lower or higher) than the Mg concentration of the tube 12 at its plate thickness center. In any situation, however, the Mg concentration in the surface layer of the cladding layer 127 is from 0% or more to 0.1% or less.

Remaining configurations of the heat exchanger 10 of this embodiment of the present disclosure are substantially the same as those of the first embodiment of the present disclosure. Because of this, various advantages obtained in the first embodiment of the present disclosure can be similarly obtained in this embodiment of the present disclosure. Further, according to this embodiment, since the tube that enables the Mg concentration in the surface layer of the cladding layer 127 to range from 0% or more to 0.1% or less by mass after brazing is used as the tube 12 before brazing. Hence, formation of an oxide film of Mg on the surface of the cladding layer 127 can be suppressed during brazing. Hence, the tube 12 and the fin 14 are satisfactorily brazed in a joining portion in which the tube 12 and the fin 14 join.

Further, this embodiment can be applied to each of the heat exchangers 50 and 50A of the eighth and ninth embodiments, respectively. In such a situation, the tube 12 of this embodiment is replaced with each of the multiple plates 52 and 54. Also, each of the multiple fins 56 and 58 is replaced with the fin 14 as well. In such a situation, advantages obtained in this embodiment can be similarly obtained.

Herein below, various modifications of the above-described embodiments of the present disclosure are described.

First, the fourth embodiment of the present disclosure may be applied to the heat exchangers 50 and 50A of the respective eighth and ninth embodiments of the present disclosure. In such a situation, each of the multiple plates 52 and 54 in each of the eighth and ninth embodiments of the present disclosure is replaced with the tube 12 of the fourth embodiment. Also, each of the multiple fins 56 and 58 is replaced with the fin 14. Further, like the fourth embodiment, each of the multiple plate 52 and 54 also has the cladding layer 127 in this modification. Since an Mg concentration in the surface layer of the cladding layer 127 is lower than the Mg concentration of each of the multiple plates 52 and 54 at its plate thickness center, substantially the same advantage can be obtained as in the fourth embodiment.

Secondly, the fifth embodiment of the present disclosure may be applied to the heat exchangers 50 and 50A of the respective eighth and ninth embodiments of the present disclosure. In such a situation, each of the multiple plates 52 and 54 in each of the eighth and ninth embodiments of the present disclosure is replaced with the tube 12 of the fifth embodiment. Also, each of the multiple fins 56 and 58 is replaced with the fin 14. Like the fifth embodiment, the multiple fins 56 and 58 are composed of bare members, respectively. An Mg concentration of each of the multiple fins 56 and 58 at its plate thickness center is 0.1% by mass. Because of this, substantially the same advantage can be obtained in this modification as in the fifth embodiment.

Thirdly, the sixth embodiment of the present disclosure may be applied to the heat exchangers 50 and 50A of the respective eighth and ninth embodiments of the present disclosure. In such a situation, each of the multiple plates 52 and 54 in each of the eighth and ninth embodiments of the present disclosure is replaced with the tube 12 of the sixth embodiment. Also, each of the multiple fins 56 and 58 is replaced with the fin 14. Like the sixth embodiment, the multiple fins 52 and 54 are composed of bare members, respectively. An Mg concentration of each of the multiple fins 52 and 54 at its plate thickness center is 0.1% by mass. Because of this, substantially the same advantage can be obtained in this modification as in the sixth embodiment.

Fourthly, the seventh embodiment of the present disclosure may be applied to the heat exchangers 50 and 50A of the eighth and ninth embodiments of the present disclosure, respectively. In such a situation, each of the multiple plates 52 and 54 in each of the eighth and ninth embodiments of the present disclosure is replaced with the tube 12 of the seventh embodiment. Also, each of the multiple fins 56 and 58 is replaced with the fin 14. Like that in the seventh embodiment, Zinc is added to a surface of the multiple plates 52 and 54 in this modification as well. Also, in each of the multiple plates 52 and 54, a potential difference of 50 mV is created in each of the multiple plate 52 and 54 in a plate thickness direction thereof. Because of this, substantially the same advantage can be obtained in this modification as in the seventh embodiment.

Figure 35:
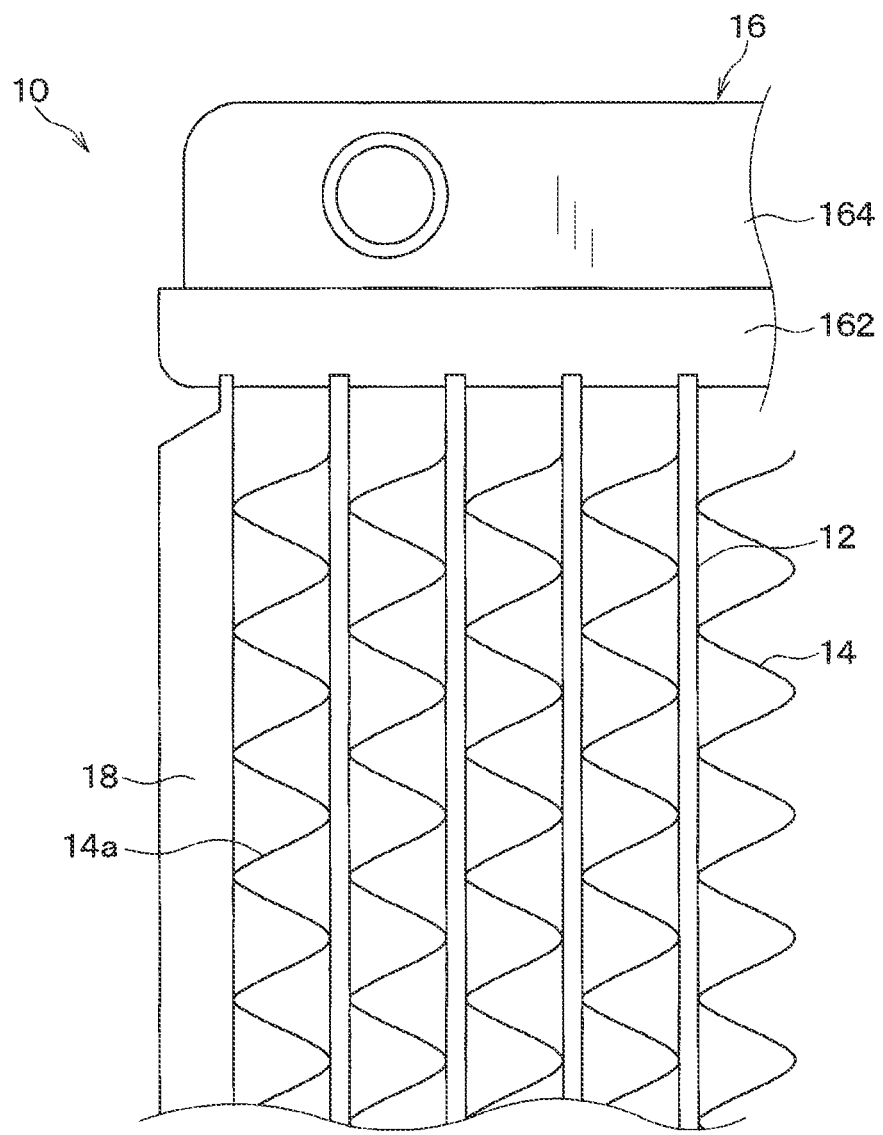
FIG. 35 is a cross-sectional view illustrating a heat exchanger according to another embodiment of the present disclosure.

Fifthly, although the tank body 164 of the heat exchanger 10 is composed of the aluminum alloy in each of the first to seventh embodiments, the tank body 164 can be made of synthetic resin as shown in FIG. 35.

Figure 36:
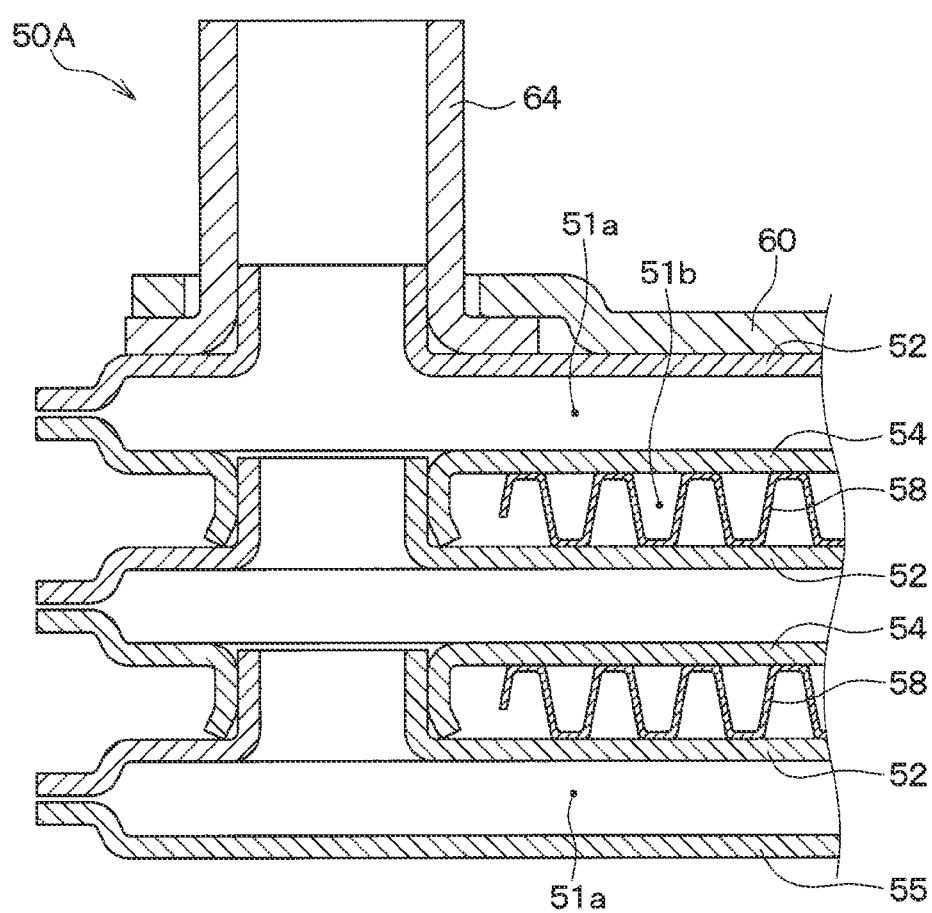
FIG. 36 is a cross-sectional view illustrating a heat exchanger according to yet another embodiment of the present disclosure.
Figure 37:
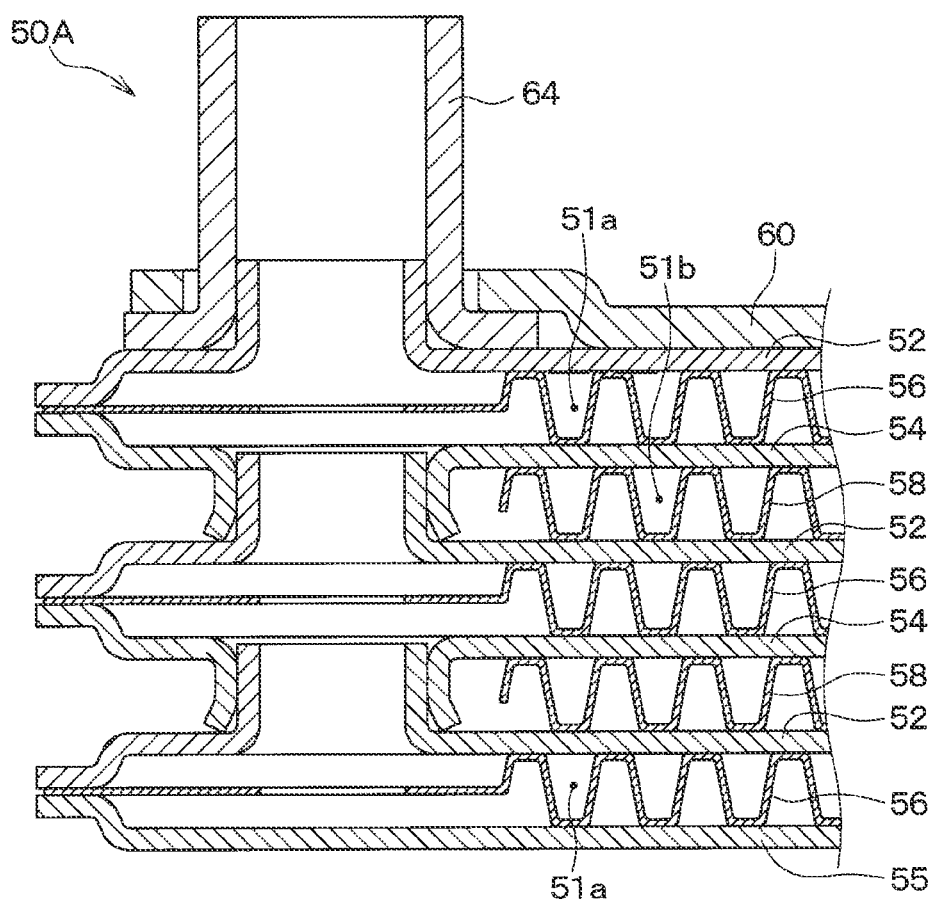
FIG. 37 is a cross-sectional view illustrating a heat exchanger according to yet another embodiment of the present disclosure.

Sixthly, in the heat exchanger 50A of the ninth embodiment, the first fin 56 is placed in the first flow channel 51a, while any fin is not placed in the second flow channel 51b. However, the second fin 58 may be placed in the second flow channel 51b, while any fin may not be placed in the first flow channel 51a by contrast as shown in FIG. 36. Also, as shown in FIG. 37, the first fin 56 can be placed in the first flow channel 51, while the second fin 58 can be placed in the second flow channel 51b.

Seventhly, in the above-described various embodiments of the present disclosure, the core material layer is composed of the Al—Mn-based alloy. However, the core material layer can be composed of another aluminum alloy. Further, in the above-described various embodiments of the present disclosure, the cladding layer is composed of the Al—Zn-alloy. However, the cladding layer can be composed of another aluminum alloy as well. In such a situation, the cladding layer of the seventh embodiment of the present disclosure is made of aluminum alloy containing zinc.

Now, various practical examples of the present invention are described herein below.

Initially, measurement and evaluation of first to 46th practical examples and first to 33rd comparative examples are described with reference to applicable tables. That is, the applicant has evaluated brazing quality of each of testing samples of first to 46th practical examples and first to 33rd comparative examples as shown in first to tenth tables. Here, the first to 30th practical examples correspond to the first and eighth embodiments of the present disclosure. Herein below, a configuration of each of the testing samples, brazing processing and a method of evaluation executed after brazing are initially described.

First, a configuration of each of the testing samples is described. As the testing samples, multiple plate members respectively having various thicknesses are prepared. Each of the testing samples includes a core material layer and a brazing material layer stacked on the core material layer. The core material layer is composed of an Al—Mn-based alloy. The brazing material layer is composed of an Al—Si—Bi-based alloy. In each of the testing samples, Mg is added to at least one of the brazing material layer and the core material layer. A thickness of each of the testing samples, an amount of addition of Mg to each of the core material layer and the brazing material layer are shown in the first to seventh tables.

Further, a brazing process is performed as described below. Specifically, multiple assembly structures are prepared by assembling testing samples as plate members and respective counterpart members acting as joining partners. The counterpart member is a plate member excluding the brazing material layer and is composed of an aluminum alloy. Then, the assembly structure is heated in a nitrogen ambience at atmospheric pressure. In this way, the testing samples and the counterpart members are brazed without using flux.

Further, in this brazing process, as a heat input amount, one of large, medium and small levels is selected. Regardless of a size of the heat input amount, temperature is raised at a first temperature rising speed from 60 degree Celsius to 560 degree Celsius. The temperature is further raised at a second temperature rising speed from 560 degree Celsius to the maximum degree of temperature. The maximum degree of temperature is maintained for a given period after temperature has been raised. Subsequently, from the maximum degree of temperature is lowered down to 560 degree Celsius at a first heat temperature descending speed. The temperature is further lowered from 560 degree Celsius to 60 degree Celsius at a second temperature lowering speed. Each of the first heat raising speed, the maximum degree of temperature, the maximum degree of temperature maintaining period, and the second temperature lowering speed is equally used in each of situations in which the heat input amount is small, medium and large. Further, when the input amount of heat is large, a relatively slow speed is set for each of the second heat raising speed and the first heat raising speed (i.e., a temperature rising speed is low). By contrast, when the heat input amount is small, a relatively high speed is set for each of the second heat raising speed and the first heat raising speed (i.e., a temperature rising speed is high). When the heat input amount is medium, a medium speed is set for each of the second heat raising speed and the first heat raising speed as well.

Now, various results of evaluation of brazing are herein below described with reference applicable tables. Specifically, brazing quality is evaluated based on a determination if a fillet is formed in an assembling structure after brazing as well as quality of the fillet. Further, a remaining plate thickness, an Mg concentration at a plate thickness center, and an Mg concentration of a fillet of each of the testing samples after heating are also measured. Various results of evaluation of the brazing quality and measurement are obtained as shown in first to seventh tables.

In the tables, a sign x indicates that a fillet is intermittently formed around a joining portion. Thus, the sign x in the table indicates that brazing quality is defective. By contrast, a sign AA in the table indicates that a fillet is continuously formed around the joining portion. Thus, the sign AA in the table indicates that brazing quality is satisfactory. Further, a sign AAA in the table also indicates that a fillet is continuously formed around the joining portion. Besides, the sign AAA in the table indicates that a size of a fillet is substantially the same as a fillet obtained when brazed by using a conventional method of so-called Nokolok with flux. Hence, the sign AAA indicates that brazing quality is almost excellent.

The first table is herein below described.

FIRST TABLE

| | Before brazing | | | | After brazing | | |
| --- | --- | --- | --- | --- | --- | --- | --- |
| | Brazing heat input amount | Plate thickness (mm) | Amount of Mg added to brazing material layer (mass %) | Amount of Mg added to core material layer (mass %) | Remaining Plate thickness (mm) | Mg Concentration at plate thickness center (mass %) | Mg Concentration of fillet (mass %) | Brazing quality |
| Comparative example 1 | Small | 0.030 | 1.0 | — | 0.028 | 0.1 | 0.2 | X |
| Comparative example 2 | Medium | 0.030 | 1.0 | — | 0.028 | 0.1 | 0.1 | X |
| Comparative example 3 | Large | 0.030 | 1.0 | — | 0.028 | 0.1 | 0.1 | X |
| Comparative example 4 | Small | 0.030 | — | 0.1 | 0.028 | 0.1 | 0.1 | X |
| Comparative example 5 | Medium | 0.030 | — | 0.1 | 0.028 | 0.1 | 0.1 | X |
| Comparative example 6 | Large | 0.030 | — | 0.1 | 0.028 | 0.1 | 0.1 | X |
| Comparative example 7 | Small | 0.030 | — | 0.2 | 0.028 | 0.1 | 0.2 | X |
| Comparative example 8 | Medium | 0.030 | — | 0.2 | 0.028 | 0.1 | 0.1 | X |

FIRST TABLE-continued

|  | Brazing heat input amount | Before brazing | | | After brazing | | | |
|---|---|---|---|---|---|---|---|---|
|  |  | Plate thickness (mm) | Amount of Mg added to brazing material layer (mass %) | Amount of Mg added to core material layer (mass %) | Remaining Plate thickness (mm) | Mg Concentration at plate thickness center (mass %) | Mg Concentration of fillet (mass %) | Brazing quality |
| Comparative example 9 | Large | 0.030 | — | 0.2 | 0.028 | 0.1 | 0.1 | X |
| Practical example 1 | Small | 0.030 | — | 0.3 | 0.028 | 0.2 | 0.3 | AAA |
| Practical example 2 | Medium | 0.030 | — | 0.3 | 0.028 | 0.2 | 0.2 | AA |
| Practical example 3 | Large | 0.030 | — | 0.3 | 0.028 | 0.2 | 0.2 | AA |

As shown, the first table indicates a result of measurement and evaluation of a testing sample having a plate thickness of 0.030 mm before brazing. As shown in the first table, brazing quality of each of first to ninth comparative examples is defective. By contrast, brazing quality of each of first to third practical examples is satisfactory. In this situation, a remaining plate thickness is 0.028 mm. An Mg concentration at a plate thickness center after heating is 0.2% by mass. An Mg concentration of a fillet is from 0.2% or more to 0.3% or less by mass. Brazing quality of the third practical example is particularly excellent. In this situation, an Mg concentration of a fillet is 0.3% by mass.

The second table is herein below described.

SECOND TABLE

|  | Brazing heat input amount | Before brazing | | | After brazing | | | |
|---|---|---|---|---|---|---|---|---|
|  |  | Plate thickness (mm) | Amount of Mg added to brazing material layer (mass %) | Amount of Mg added to core material layer (mass %) | Remaining Plate thickness (mm) | Mg Concentration at plate thickness center (mass %) | Mg Concentration of fillet (mass %) | Brazing quality |
| Comparative example 10 | Large | 0.050 | — | 0.1 | 0.046 | 0.1 | 0.1 | X |
| Comparative example 11 | Large | 0.050 | — | 0.2 | 0.046 | 0.1 | 0.1 | X |
| Practical example 4 | Large | 0.050 | — | 0.4 | 0.046 | 0.3 | 0.2 | AA |
| Practical example 5 | Large | 0.050 | — | 0.6 | 0.046 | 0.4 | 0.3 | AAA |
| Practical example 6 | Large | 0.050 | — | 0.8 | 0.046 | 0.5 | 0.5 | AAA |
| Practical example 7 | Small | 0.050 | 1.0 | 1.0 | 0.046 | 0.8 | 1.1 | AAA |
| Practical example 8 | Medium | 0.050 | 1.0 | 1.0 | 0.046 | 0.7 | 0.5 | AAA |
| Practical example 9 | Large | 0.050 | 1.0 | 1.0 | 0.046 | 0.6 | 0.6 | AAA |

As shown, the second table indicates a result of evaluation and measurement of a testing sample having a thickness of 0.050 mm before brazing. As shown in the second table, brazing quality of each of tenth to eleventh comparative examples is defective. By contrast, brazing quality of each of fourth to ninth practical examples is satisfactory. In this situation, a remaining plate thickness is 0.046 mm. An Mg concentration at a plate thickness center after heating is from 0.3% or more to 0.8% or less by mass. An Mg concentration of a fillet is from 0.2% or more to 1.1% or less by mass. As shown, brazing quality of each of fifth to ninth practical examples is particularly excellent. In this situation, an Mg concentration of a fillet is from 0.3% or more to 1.1% or less by mass.

The third table is herein below described.

THIRD TABLE

| | | Before brazing | | | After brazing | | |
|---|---|---|---|---|---|---|---|
| | | | | | Mg | | |
| | Brazing heat input amount | Plate thickness (mm) | Amount of Mg added to brazing material layer (mass %) | Amount of Mg added to core material layer (mass %) | Remaining Plate thickness (mm) | Concentration at plate thickness center (mass %) | Mg Concentration of fillet (mass %) | Brazing quality |
| Comparative example 12 | Small | 0.100 | 1.0 | — | 0.092 | 0.0 | 0.3 | X |
| Comparative example 13 | Medium | 0.100 | 1.0 | — | 0.092 | 0.0 | 0.1 | X |
| Comparative example 14 | Large | 0.100 | 1.0 | — | 0.092 | 0.0 | 0.1 | X |
| Comparative example 15 | Medium | 0.100 | — | 0.1 | 0.092 | 0.1 | 0.1 | X |
| Comparative example 16 | Medium | 0.100 | — | 0.2 | 0.092 | 0.2 | 0.1 | X |
| Practical example 10 | Medium | 0.100 | — | 0.4 | 0.092 | 0.4 | 0.2 | AA |
| Practical example 11 | Medium | 0.100 | — | 1.0 | 0.092 | 0.9 | 0.6 | AAA |
| Practical example 12 | Small | 0.100 | 0.3 | 0.3 | 0.092 | 0.3 | 0.4 | AAA |
| Practical example 13 | Medium | 0.100 | 0.3 | 0.3 | 0.092 | 0.3 | 0.2 | AA |
| Practical example 14 | Large | 0.100 | 0.3 | 0.3 | 0.092 | 0.2 | 0.2 | AA |

As shown, the third table indicates a result of evaluation and measurement of a testing sample having a thickness of 0.100 mm before brazing. As shown in the third table, brazing quality of each of twelfth to 16th comparative examples is defective. By contrast, brazing quality of each of tenth to 14th practical examples is satisfactory. In this situation, a remaining plate thickness is 0.092 mm. An Mg concentration at a plate thickness center after heating is from 0.2% or more to 0.9% or less by mass. An Mg concentration of a fillet is from 0.2% or more to 0.6% or less. As shown, brazing quality of each of eleventh to twelfth practical examples is particularly excellent. In this situation, an Mg concentration of a fillet is from 0.4% or more to 0.6% or less.

The fourth table is herein below described.

FOURTH TABLE

| | | Before brazing | | | After brazing | | |
|---|---|---|---|---|---|---|---|
| | | | | | Mg | | |
| | Brazing heat input amount | Plate thickness (mm) | Amount of Mg added to brazing material layer (mass %) | Amount of Mg added to core material layer (mass %) | Remaining Plate thickness (mm) | Concentration at plate thickness center (mass %) | Mg Concentration of fillet (mass %) | Brazing quality |
| Comparative example 17 | Medium | 0.150 | — | 0.1 | 0.138 | 0.1 | 0.1 | X |
| Comparative example 18 | Medium | 0.150 | — | 0.2 | 0.138 | 0.2 | 0.1 | X |
| Practical example 15 | Medium | 0.150 | — | 0.4 | 0.138 | 0.4 | 0.2 | AA |
| Practical example 16 | Medium | 0.150 | — | 1.0 | 0.138 | 1.0 | 0.6 | AAA |
| Comparative example 19 | Small | 0.150 | 0.1 | 0.1 | 0.138 | 0.1 | 0.1 | X |
| Practical example 17 | Small | 0.150 | 0.2 | 0.2 | 0.138 | 0.2 | 0.3 | AAA |
| Practical example 18 | Small | 0.150 | 0.3 | 0.3 | 0.138 | 0.3 | 0.4 | AAA |

As shown, the fourth table indicates a result of evaluation and measurement of a testing sample having a thickness of 0.150 mm before brazing. As shown in the fourth table, brazing quality of each of 17th to 19th comparative examples is defective. By contrast, brazing quality of each of 15th to 18th practical examples is satisfactory. In this situation, a remaining plate thickness is 0.138 mm. An Mg concentration at a plate thickness center after heating is from 0.2% or more to 1.0% or less by mass. An Mg concentration of a fillet is from 0.2% or more to 0.6% or less by mass. As shown, brazing quality of each of 16th to 18th practical examples is particularly excellent. In this situation, an Mg concentration of a fillet is from 0.3% or more to 0.6% or less by mass.

The fifth table is herein below described.

FIFTH TABLE

| | Before brazing | | | | After brazing | | |
| | | | | | Mg | | |
| | Brazing heat input amount | Plate thickness (mtn) | Amount of Mg added to brazing material layer (mass %) | Amount of Mg added to core material layer (mass %) | Remaining Plate thickness (mm) | Concentration at plate thickness center (mass %) | Mg Concentration of fillet (mass %) | Brazing quality |
|---|---|---|---|---|---|---|---|---|
| Comparative example 20 | Large | 0.200 | 1.0 | — | 0.184 | 0.0 | 0.1 | X |
| Comparative example 21 | Large | 0.200 | — | 0.1 | 0.184 | 0.1 | 0.1 | X |
| Comparative example 22 | Large | 0.200 | — | 0.2 | 0.184 | 0.2 | 0.1 | X |
| Practical example 19 | Large | 0.200 | — | 0.4 | 0.184 | 0.4 | 0.2 | AA |
| Practical example 20 | Large | 0.200 | — | 0.6 | 0.184 | 0.6 | 0.3 | AAA |
| Practical example 21 | Large | 0.200 | — | 1.0 | 0.184 | 1.0 | 0.6 | AAA |
| Practical example 22 | Small | 0.200 | 1.0 | 1.0 | 0.184 | 1.0 | 1.4 | AAA |

As shown, the fifth table indicates a result of evaluation and measurement of a testing sample having a thickness of 0.200 mm before brazing. As shown in the fifth table, brazing quality of each of 20th to 22nd comparative examples is defective. By contrast, brazing quality of each of 19th to 22nd practical examples is satisfactory. In this situation, a remaining plate thickness is 0.184 mm. An Mg concentration at a plate thickness center after heating is from 0.4% or more to 1.0% or less by mass. An Mg concentration of a fillet is from 0.2% or more to 1.4% or less by mass. As shown, brazing quality of each of 20th to 22nd practical examples is particularly excellent. In this situation, an Mg concentration of a fillet is from 0.3% or more to 1.4% or less by mass.

The sixth table is herein below described.

SIXTH TABLE

| | Before brazing | | | | After brazing | | |
| | | | | | Mg | | |
| | Brazing heat input amount | Plate thickness (mm) | Amount of Mg added to brazing material layer (mass %) | Amount of Mg added to core material layer (mass %) | Remaining Plate thickness (mm) | Concentration at plate thickness center (mass %) | Mg Concentration of fillet (mass %) | Brazing quality |
|---|---|---|---|---|---|---|---|---|
| Comparative example 23 | Large | 0.400 | 1.0 | — | 0.368 | 0.0 | 0.3 | X |
| Comparative example 24 | Medium | 0.400 | — | 0.1 | 0.368 | 0.1 | 0.1 | X |
| Comparative example 25 | Medium | 0.400 | — | 0.2 | 0.368 | 0.2 | 0.1 | X |
| Practical example 23 | Medium | 0.400 | — | 1.0 | 0.368 | 1.0 | 0.7 | AAA |
| Comparative example 26 | Small | 0.400 | — | 0.1 | 0.368 | 0.1 | 0.1 | X |
| Practical example 24 | Small | 0.400 | 0.1 | 1.0 | 0.368 | 0.1 | 0.2 | AA |
| Practical example 25 | Small | 0.400 | 0.5 | 1.0 | 0.368 | 0.1 | 0.5 | AAA |

As shown, the sixth table indicates a result of evaluation and measurement of a testing sample having a thickness of 0.400 mm before brazing. As shown in the sixth table, brazing quality of each of 23th to 26th comparative examples is defective. By contrast, brazing quality of each of 23th to 25th practical examples is satisfactory. In this situation, a remaining plate thickness is 0.368 mm. An Mg concentration at a plate thickness center after heating is from 0.1% or more to 1.0% or less by mass. An Mg concentration of a fillet is from 0.2% or more to 0.7% or less by mass. As shown, brazing quality of each of 23th and 25th practical examples is particularly excellent. In this situation, an Mg concentration of a fillet is from 0.5% or more to 0.7% or less by mass.

A seventh table is herein below described.

SEVENTH TABLE

| | Before brazing | | | | After brazing | | |
| | | | | | Mg | | |
| | Brazing heat input amount | Plate thickness (mm) | Amount of Mg added to brazing material layer (mass %) | Amount of Mg added to core material layer (mass %) | Remaining Plate thickness (mm) | Concentration at plate thickness center (mass %) | Mg Concentration of fillet (mass %) | Brazing quality |
|---|---|---|---|---|---|---|---|---|
| Comparative example 27 | Large | 0.600 | 1.0 | — | 0.552 | 0.0 | 0.5 | X |
| Comparative example 28 | Large | 0.600 | — | 0.1 | 0.552 | 0.1 | 0.1 | X |
| Comparative example 29 | Large | 0.600 | — | 0.2 | 0.552 | 0.2 | 0.1 | X |
| Practical example 26 | Large | 0.600 | — | 0.4 | 0.552 | 0.4 | 0.3 | AAA |
| Practical example 27 | Large | 0.600 | — | 0.6 | 0.552 | 0.6 | 0.4 | AAA |
| Practical example 28 | Large | 0.600 | — | 0.8 | 0.552 | 0.8 | 0.5 | AAA |
| Practical example 29 | Large | 0.600 | — | 1.0 | 0.552 | 1.0 | 0.6 | AAA |
| Practical example 30 | Small | 0.600 | 0.1 | 0.1 | 0.552 | 0.1 | 0.2 | AA |

As shown, the seventh table indicates a result of evaluation and measurement of a testing sample having a thickness of 0.600 mm before brazing. As shown in the seventh table, brazing quality of each of 27th to 29th comparative examples is defective. By contrast, brazing quality of each of 26th to 30th practical examples is satisfactory. In this situation, a remaining plate thickness is 0.552 mm. An Mg concentration at a plate thickness center after heating is from 0.1% or more to 1.0% or less by mass. An Mg concentration of a fillet is from 0.2% or more to 0.6% or less by mass. As shown, brazing quality of each of 26th to 29th practical examples is particularly excellent. In this situation, an Mg concentration of a fillet is from 0.3% or more to 0.6% or less by mass.

An eighth table is herein below described.

EIGHT TABLE

| | Before brazing | | | | After brazing | | |
| | | | | | Mg | | |
| | Brazing heat input amount | Plate thickness (mm) | Amount of Mg added to brazing material layer (mass %) | Amount of Mg added to core material layer (mass %) | Remaining Plate thickness (mm) | Concentration at plate thickness center (mass %) | Mg Concentration of fillet (mass %) | Brazing quality |
|---|---|---|---|---|---|---|---|---|
| Comparative example 30 | Large | 0.700 | — | 0.1 | 0.644 | 0.1 | 0.1 | X |
| Comparative example 31 | Large | 0.700 | — | 0.2 | 0.644 | 0.2 | 0.1 | X |
| Practical example 31 | Large | 0.700 | — | 0.4 | 0.644 | 0.4 | 0.2 | AA |
| Practical example 32 | Large | 0.700 | — | 0.6 | 0.644 | 0.6 | 0.4 | AAA |
| Practical example 33 | Large | 0.700 | — | 1.0 | 0.644 | 1.0 | 0.6 | AAA |
| Practical example 34 | Small | 0.700 | 0.1 | 0.1 | 0.644 | 0.1 | 0.2 | AA |
| Practical example 35 | Small | 0.700 | 0.2 | 0.2 | 0.644 | 0.2 | 0.3 | AAA |

As shown, the eighth table indicates a result of evaluation and measurement of a testing sample having a thickness of 0.700 mm before brazing. As shown in the eighth table, brazing quality of each of 30th to 31th comparative examples is defective. By contrast, brazing quality of each of 31th to 35th practical examples is satisfactory. In this situation, a remaining plate thickness is 0.644 mm. An Mg concentration at a plate thickness center after heating is from 0.1% or more to 1.0% or less by mass. An Mg concentration of a fillet is from 0.2% or more to 0.6% or less by mass. As shown, brazing quality of each of 32th, 33th and 35th practical examples is particularly excellent. In this situation, an Mg concentration of a fillet is from 0.3% or more to 0.6% or less by mass.

A ninth table is herein below described.

NINTH TABLE

| | | Before brazing | | | After brazing | | |
|---|---|---|---|---|---|---|---|
| | | | | | Mg | | |
| | Brazing heat input amount | Plate thickness (mm) | Amount of Mg added to brazing material layer (mass %) | Amount of Mg added to core material layer (mass %) | Remaining Plate thickness (mm) | Concentration at plate thickness center (mass %) | Mg Concentration of fillet (mass %) | Brazing quality |
| Practical example 36 | Medium | 1.000 | 1.0 | — | 0.920 | 0.0 | 0.8 | AAA |
| Comparative example 32 | Medium | 1.000 | — | 0.2 | 0.920 | 0.2 | 0.1 | X |
| Practical example 37 | Medium | 1.000 | — | 0.5 | 0.920 | 0.5 | 0.3 | AA |
| Practical example 38 | Medium | 1.000 | — | 1.0 | 0.920 | 1.0 | 0.5 | AAA |
| Practical example 39 | Medium | 1.000 | 1.0 | 0.5 | 0.920 | 0.5 | 1.0 | AAA |
| Practical example 40 | Medium | 1.000 | 1.0 | 1.0 | 0.920 | 1.0 | 1.3 | AAA |
| Practical example 41 | Medium | 1.000 | 0.5 | 1.0 | 0.920 | 1.0 | 0.9 | AAA |

As shown, the ninth table indicates a result of evaluation and measurement of a testing sample having a thickness of 1.000 mm before brazing. As shown in the ninth table, brazing quality of a 32th comparative example is defective. By contrast, brazing quality of each of 36th to 41th practical examples is satisfactory. In this situation, a remaining plate thickness is 0.920 mm. An Mg concentration of a fillet is from 0.3% or more to 1.3% or less by mass. As shown, brazing quality of each of 36th and 38th to 41th practical examples is particularly excellent. In this situation, an Mg concentration of a fillet is from 0.5% or more to 1.3% or less by mass.

Further, as a result of measurement and evaluation of each of 37th to 41th practical examples, a Mg concentration at a plate thickness center after heating is from 0.5% or more to 1.0% or less by mass. Further, an Mg concentration of a fillet is from 0.3% or more to 1.3% or less by mass.

A tenth table is herein below described.

TENTH TABLE

| | | Before brazing | | | After brazing | | |
|---|---|---|---|---|---|---|---|
| | | | Amount of Mg added to brazing material layer (mass %) | | | Mg Concentration at plate thickness center (mass %) | | |
| | Brazing heat input amount | Plate thickness (mm) | | Amount of Mg added to core material layer (mass %) | Remaining Plate thickness (mm) | | Mg Concentration of fillet (mass %) | Brazing quality |
| Practical example 42 | Medium | 2.000 | 1.0 | — | 1.840 | 0.0 | 0.8 | AAA |
| Comparative example 33 | Medium | 2.000 | 1.0 | 0.2 | 1.840 | 0.2 | 0.1 | X |
| Practical example 43 | Medium | 2.000 | — | 0.5 | 1.840 | 0.5 | 0.2 | AA |
| Practical example 44 | Medium | 2.000 | — | 0.5 | 1.840 | 0.5 | 1.0 | AAA |
| Practical example 45 | Medium | 2.000 | 1.0 | 1.0 | 1.840 | 1.0 | 1.2 | AAA |
| Practical example 46 | Medium | 2.000 | 0.5 | 1.0 | 1.840 | 1.0 | 0.8 | AAA |

As shown, the tenth table indicates a result of evaluation and measurement of a testing sample having a thickness of 2.000 mm before brazing. As shown in the tenth table, brazing quality of a 33th comparative example is defective. By contrast, brazing quality of each of 42th and 43th to 46th practical examples are satisfactory. In this situation, a remaining plate thickness is 1.840 mm. An Mg concentration of a fillet is from 0.2% or more to 1.2% or less by mass. Brazing quality of each of 42th and 44th to 46th practical examples is particularly excellent. In this situation, an Mg concentration of a fillet is from 0.8% or more to 1.2% or less by mass.

Further, as a result of measurement and evaluation of each of 43th to 46th practical examples, a Mg concentration at a plate thickness center after heating is from 0.5% or more to 1.0% or less by mass. Further, an Mg concentration of a fillet is from 0.2% or more to 1.2% or less by mass.

Hence, as understood from the first to fourth tables, to obtain preferable brazing quality when the remaining plate thickness is from 0.025 mm or more to 0.150 mm or less, it is only needed that the Mg concentration of the fillet is 0.2% or more by mass and the Mg concentration at the plate thickness center is from 0.2% or more to 1.0% or less by mass. To further obtain excellent brazing quality, it is only needed that the Mg concentration of the fillet is 0.3% or more by mass.

Further, as understood from the fourth to sixth tables, to obtain preferable brazing quality when the remaining plate thickness is from 0.100 mm or more to 0.400 mm or less, it is only needed that the Mg concentration of the fillet is 0.2% or more by mass and the Mg concentration at the plate thickness center is from 0.1% or more to 1.0% or less by mass. Further, to obtain excellent brazing quality, it is only needed that the Mg concentration of the fillets is 0.3% or more by mass.

Further, as understood from the sixth to seventh tables, to obtain preferable brazing quality when the remaining plate thickness is from 0.200 mm or more to 0.600 mm or less, it is only needed that the Mg concentration of the fillet is 0.2% or more by mass and the Mg concentration at the plate thickness center is from 0.1% or more to 1.0% or less by mass. Further, to obtain excellent brazing quality, it is only needed that the Mg concentration of the fillet is 0.3% or more by mass.

Further, as understood from the seventh to tenth tables, to obtain preferable brazing quality when the remaining plate thickness is from 0.500 mm or more to 2.000 mm or less, it is only needed that the Mg concentration of the fillet is 0.2% or more by mass. Further, to obtain excellent brazing quality, it is only needed that the Mg concentration of the fillet is 0.3% or more by mass. Further, substantially the same evaluation result may be obtained when the remaining plate thickness is greater than 0.600 mm and is 2.000 mm or less.

However, as seen in the 36th and 42th practical examples, when the remaining plate thickness is greater than 0.500 mm and is 2.000 mm or less, the Mg concentration of the fillet sometimes becomes 0.2% or more by mass even if the Mg concentration at the plate thickness center is 0% by mass. Since a preferable brazing quality can be obtained as far as an Mg concentration of a fillet is 0.2% or more by mass, an Mg concentration at a plate thickness center is not necessarily 0.1% or more by mass. Substantially the same evaluation result may be obtained when the remaining plate thickness is greater than 0.600 mm and is 2.000 mm or less.

Here, Mg has a nature of easily spreading to a molten brazing material layer during brazing. Hence, regardless of a value of remaining plate thickness, an upper limit of an Mg concentration of the fillet sometimes exceeds a value shown in the table. However, it has been known from another test that erosion occurs when an Mg concentration of the fillet is greater than 2.0% by mass. Hence, to avoid such a problem, it is enough that the Mg concentration of the fillet is 2.0% or less by mass.

Now, a result of measurement and evaluation of each of 47th to 51th practical examples and 34th to 36th comparative examples is described with reference to an applicable table. That is, the applicant also has evaluated brazing quality of each of testing samples of 47th to 51th practical examples and 34th to 36th comparative examples as shown in an eleventh table. Here, the 47th to 51th practical examples correspond to the second to fourth embodiments of the present disclosure, respectively. Herein below, a configuration of each of the testing samples, brazing processing applied to each of the testing samples and a method of evaluation after brazing of each of the testing samples are initially described.

First, a configuration of each of the testing samples is as follows. As the testing samples, plate members each functioning as a flow channel forming member are prepared. Each of the testing samples includes a core material layer and a cladding layer made of given material excluding brazing material stacked on the core material layer. The core material layer is composed of an Al—Mn-based alloy. The cladding layer is composed of an Al—Si—Bi-based alloy. In each of the testing samples, Mg is added to each to the core material layer and the cladding layer.

Further, as a counterpart member serving as a joining counterpart for each of the testing samples, a plate material having a core material layer and a brazing material layer stacked on the core material layer is prepared. The core material layer is composed of an Al—Mn-based alloy. The brazing material layer is composed of an Al—Si—Bi-based alloy. Mg is added to the core material layer before brazing to enable an Mg concentration of a fillet to be 0.2% or more by mass after the brazing.

A brazing process is performed as described below. Specifically, multiple assembly structures are assembled by connecting testing samples with respective counterpart members. In this situation, the cladding layer of each of the testing samples is contacted to a brazing material layer as the counterpart member. Then, like the first to 46th practical example, the assembly structures are heated in a nitrogen ambience at atmospheric pressure. A brazing heat profile is the same as obtained when heat input is small.

Now, a result of evaluation of brazing is herein below described with reference to applicable table. That is, brazing quality is evaluated like the first to 46th practical example. Further, a remaining plate thickness, an Mg concentration at a plate thickness center, and an Mg concentration of a cladding layer of each of the testing samples after heating are also measured. A method of measuring the remaining thickness and Mg concentration is substantially the same as employed in the above-described practical example. Various results of evaluation of the brazing quality and measurement are shown in an eleventh table. Here, a remaining plate thickness of each of the testing samples after heating is 0.184 mm.

An eleventh table is herein below described.

ELEVENTH TABLE

|  | Mg Concentration at plate thickness center (mass %) | Mg Concentration in surface layer of cladding layer (mass %) | Brazing quality |
| --- | --- | --- | --- |
| Comparative example 34 | 1.0 | 1.0 | X |
| Practical example 47 | 1.0 | 0.5 | AA |
| Practical example 48 | 1.0 | 0.1 | AAA |
| Comparative example 35 | 0.2 | 0.2 | X |
| Practical example 49 | 0.2 | 0.1 | AAA |
| Practical example 50 | 0.2 | 0.05 | AAA |
| Comparative example 36 | 0.1 | 0.1 | X |
| Practical example 51 | 0.1 | 0.05 | AA |

As shown in the eleventh table, brazing quality of each of 34th to 36th comparative examples is defective. That is, in each of the 34th to 36th comparative examples, an Mg concentration of a surface layer of the cladding layer is substantially the same as an Mg concentration of a plate thickness center. By contrast, brazing quality of each of 47th to 51th practical examples is satisfactory. That is, in each of the 47th to 51th practical examples, an Mg concentration of a surface layer of the cladding layer is lower than an Mg concentration of a plate thickness center. Hence, it is realized that when the cladding layer is joined to the brazing material layer, an Mg concentration of a surface layer of a cladding layer after brazing is desirably lower than an Mg concentration at a plate thickness center of a flow channel forming member.

Now, measurement and evaluation of 52th to 56th practical examples and a 37th comparative example are described with reference to an applicable table. That is, the applicant also has evaluated a brazing quality of each of testing sample of the 52th to 56th practical examples and the 37th comparative example as shown in twelfth table. Here, the 52th to 56th practical examples correspond to the tenth embodiment of the present disclosure. Herein below, a configuration of each of the testing samples, brazing processing and a method of evaluation after brazing are described.

First, each of testing samples is configured as described below. As the testing samples, plate members each functioning as a flow channel forming member are prepared. A thickness of each of the testing samples before brazing is 0.2 mm. Each of the testing samples includes a core material layer and a cladding layer made of given material excluding brazing material stacked on the core material layer. The core material layer is composed of an Al—Mn-based alloy. The cladding layer is composed of an Al—Si—Bi-based alloy. In the 53th practical example, Mg is added to the core material layer before brazing and is not added to the cladding layer before brazing. In the 55th practical example, Mg is not added to the core material layer before brazing and is added to the cladding layer before brazing. In the 56th practical example, Mg is added to each to the core material layer and the cladding layer before brazing.

Further, as a counterpart member serving as a joining counterpart joining each of the testing samples, a plate material having a core material layer and a brazing material layer stacked on the core material layer is prepared. The core material layer is composed of an Al—Mn-based alloy. The brazing material layer is composed of an Al—Si—Bi-based alloy. Mg is added to the core material layer before brazing to enable an Mg concentration of a fillet to be 0.2% or more by mass after the brazing.

A brazing process is performed as described below. Specifically, each of multiple assembly structures is assembled by connecting each of testing samples with each of counterpart members, respectively. In this situation, the cladding layer of the testing sample is contacted to a brazing material layer acting as the counterpart member. Subsequently, like the first to 46th practical example, the assembly structure is heated in a nitrogen ambience at atmospheric pressure. Further, a brazing heat profile is the same as used when heat input is small.

Further, a result of evaluation of brazing is obtained as herein below described with reference to applicable table. That is, brazing quality is evaluated like the first to 46th practical example. Further, a remaining plate thickness, an Mg concentration at a plate thickness center, and an Mg concentration of a cladding layer of the testing sample after heating are also measured. A method of measuring the remaining thickness and an Mg concentration is substantially the same as employed in the above-described embodiment of the present disclosure. With this, various results of evaluation of the brazing quality and measurement are obtained as shown in a twelfth table. Here, a remaining plate thickness of the testing sample after heating is 0.184 mm.

A twelfth table is herein below described.

TWELFTH TABLE

|  | Mg Concentration at plate thickness center (mass %) | Mg Concentration in surface layer of cladding layer (mass %) | Brazing quality |
| --- | --- | --- | --- |
| Practical example 52 | 0.1 | 0.05 | AA |
| Practical example 53 | 0.1 | 0.0 | AAA |
| Comparative example 37 | 0.05 | 0.5 | X |
| Practical example 54 | 0.05 | 0.1 | AA |
| Practical example 55 | 0.0 | 0.1 | AA |
| Practical example 56 | 0.0 | 0.0 | AAA |

As shown in the twelfth table, brazing quality of 37th comparative example is defective. That is, in the 37th comparative example, an Mg concentration in a surface layer of the cladding layer is 0.5% and is greater than an Mg concentration at a plate thickness center. By contrast, brazing quality of each of 52th to 56th practical examples is satisfactory. That is, in each of the 52th to 56th practical examples, a Mg concentration in a surface layer of the cladding layer is from 0% or more to 0.1% or less by mass. Hence, it is realized that when the cladding layer is joined to the brazing material layer, an Mg concentration in a surface layer of the cladding layer after brazing is desirably 0% or more to 0.1% or less by mass.

A result of measurement and evaluation of each of 61th to 62th practical examples and a 61th comparative example is obtained as described herein below with reference to an applicable table. That is, the applicant also has evaluated a brazing quality of each of testing samples of the 61th to 62th practical examples and the 61th comparative example as shown in thirteenth table. Here, the 61th to 62th practical examples collectively correspond to the fifth embodiment of the present disclosure. A configuration of each of the testing samples, brazing processing applied to each of the testing samples, and a method of evaluation of each of the testing samples after brazing are described herein below.

First, each of testing samples is configured as described below. As testing samples, multiple tubes and fins configured substantially in the same manner as in the fifth embodiment of the present disclosure are prepared. A thickness of each of the fins as prepared is 0.03 mm. The fin is a bare member composed only of a core material layer composed of an Al—Mn-based alloy. A thickness of each of the prepared tubes is 0.2 mm. This tube includes a core material layer and a brazing material layer stacked on the core material layer. The core material layer is composed of an Al—Mn-based alloy. The brazing material layer is composed of an Al—Si—Bi-based alloy. Mg is added to the core material layer (before brazing) to enable a Mg concentration of a fillet to be 0.2% or more by mass after brazing and a Mg concentration at a plate thickness center thereof to be 0.1% or more by mass after brazing as well.

A brazing process is performed as described below. First, a fin and a tube are assembled thereby collectively forming an assembly structure. Subsequently, like the first to 30th practical example, the assembly structure is heated in a nitrogen ambience at atmospheric pressure. A brazing heat profile is the same as used when heat input is small.

A result of evaluation of brazing is obtained as herein below described with reference to applicable table. That is, brazing quality is evaluated like the first to 46th practical example. Also, like evaluation of the first to 46th practical example, a remaining plate thickness, a Mg concentration at a plate thickness center after heating are measured again. Various results of evaluation of the brazing quality and measurement are obtained as shown in a thirteenth table. Here, a remaining plate thickness of each of the tubes after heating is 0.184 mm.

A thirteenth table is herein below described.

FOURTEENTH TABLE

| | Mg Concentration at plate thickness center (mass %) | | Mg Concentration of fillet (mass %) | Brazing quality |
|---|---|---|---|---|
| | Fin | Tube | | |
| Comparative example 61 | 0.5 | ≥0.1 | ≥0.2 | X |
| Practical example 61 | 0.1 | ≥0.1 | ≥0.2 | AA |
| Practical example 62 | 0 | ≥0.1 | ≥0.2 | AAA |

As shown in the thirteenth table, brazing quality of 61th comparative example is defective. That is, in the 61th comparative example, an Mg concentration of the fin is 0.5% by mass at a plate thickness center thereof. By contrast, brazing quality of each of 61th to 62th practical examples is satisfactory. That is, in each of the 61th to 62th practical examples, an Mg concentration of the fin at the plate thickness center thereof is from 0% or more to 0.1% or less by mass. Hence, it is realized that when the fin is composed of the bare member, an Mg concentration of the fin at a plate thickness center thereof desirably is from 0% or more to 0.1% or less by mass.

A result of measurement and evaluation of each of 63th to 64th practical examples and a 62th comparative example is obtained as herein described with reference to an applicable table. That is, the applicant also has evaluated brazing quality of each of testing samples of the 63th to 64th practical examples and the 62th comparative example as shown in 14th table. Here, the 63th to 64th practical examples collectively correspond to the sixth embodiment of the present disclosure. Herein below, a configuration of each of the testing samples, brazing processing applied to each of the testing samples and a method of evaluation of each of the testing samples after brazing are described.

First, each of testing samples is configured as described below. That is, as testing samples, tubes and fins similarly configured as in the sixth embodiment are prepared. A thickness of each of the tubes as prepared is 0.2 mm. This tube is a bare member composed only of a core material layer composed of an Al—Mn-based alloy. Further, a thickness of the fin as prepared is 0.03 mm. This fin includes a core material layer and brazing material layers respectively stacked on both sides of the core material layer. The core material layer is composed of an Al—Mn-based alloy. The brazing material layer is composed of an Al—Si—Bi-based alloy. Mg is added to the core material layer (before brazing) to enable a Mg concentration of a fillet to be 0.2% or more by mass after brazing and a Mg concentration at a plate thickness center thereof to be 0.2% or more by mass after the brazing as well.

A brazing process and evaluation after brazing are obtained as described herein below. That is, a brazing process, evaluation after brazing and respective measurements are substantially the same as executed in the practical examples 61 and 62. Results of evaluation of brazing and respective measurements are obtained as shown in a 14th table. Here, a remaining plate thickness of the fin after heating is 0.028 mm.

A fourteenth table is herein below described.

FOURTEENTH TABLE

| | Mg Concentration at plate thickness center (mass %) | | Mg Concentration of fillet (mass %) | Brazing quality |
|---|---|---|---|---|
| | Fin | Tube | | |
| Comparative example 62 | ≥0.2 | 0.5 | ≥0.2 | X |
| Practical example 63 | ≥0.2 | 0.1 | ≥0.2 | AA |
| Practical example 64 | ≥0.2 | 0 | ≥0.2 | AAA |

As shown in the 14th table, brazing quality of 62th comparative example is defective. That is, in the 62th comparative example, an Mg concentration of the tube is 0.5% by mass at a plate thickness center thereof. By contrast, brazing quality of each of 63th to 64th practical examples is satisfactory. That is, in each of the 63th to 64th practical examples, an Mg concentration at the plate thickness center thereof is from 0% or more to 0.1% or less by mass. Hence, it is realized that when a core material layer of the tube is joined to a brazing material member of the fin, an Mg concentration of the tube at a plate thickness center thereof desirably is from 0% or more to 0.1% or less by mass.

Now, a result of measurement and evaluation of each of 71th to 73th practical examples and a 71th comparative example is described with reference to an applicable table. That is, the applicant also has evaluated a corrosion resistance of each of testing samples of the 71th to 73th practical examples and a 71th comparative example as shown in 15th table. Here, the 71th to 73th practical examples collectively correspond to the seventh embodiment of the present disclosure. Herein below, a configuration of each of the testing samples and a method of evaluating a corrosion resistance of the testing samples are described.

First, each of testing samples is configured as described below. As the testing samples, plate members each functioning as a flow channel forming member are prepared. A thickness of each of prepared tubes is 0.2 mm. This tube includes a core material layer, a brazing material stacked on one side of the core material layer and a cladding layer stacked on the other side of the core material layer opposite to the brazing material layer. The core material layer is composed of an Al—Mn-based alloy. The brazing material layer is composed of an Al—Si—Bi-based alloy. The cladding layer is composed of an Al—Zn-based alloy again. Further, zinc (i.e., Zn) is added to the cladding layer of each of testing samples to enable a potential difference in a plate thickness direction of each of the testing samples to be a value as shown in 15th table. Here, Mg is added to the core material layer.

A corrosion resistance test and a method of evaluating a corrosion resistance are conducted as described below. That is, a corrosion test is applied to each of testing samples. As corrosion resistance tests, in addition to a CASS test serving as an external corrosion resistance test, an internal corrosion resistance test is conducted using a corrosive liquid, such as so-called OY water, etc. Specifically, a presence of perforation in each of the testing samples due to corrosion is investigated and a corrosion resistance is thereby evaluated based thereon as shown in the 15th table. In the table, a sign x indicates presence of perforation due to corrosion and is defective. In the table, a sign AA indicates absence of perforation and the corrosion resistance is, therefore, satisfactory. Also, in the table, a sign AAA indicates that a degree of corrosion is smaller than a situation indicated by the sign AA and the corrosion resistance is excellent. Here, in the table the signs AA and AAA are results of both of the external corrosion and internal corrosion resistance tests.

A fifteenth table is herein below described.

FIFTEENTH TABLE

|  | Potential difference | Corrosion resistance |
| --- | --- | --- |
| Comparative example 71 | 20 | X |
| Practical example 71 | 50 | AA |
| Practical example 72 | 100 | AAA |
| Practical example 73 | 200 | AAA |

As shown in the 15th table, a corrosion resistance of a 71th comparative example is defective. By contrast, a corrosion resistance of each of 71th to 73th practical examples is satisfactory. That is, in each of the 71th to 73th practical examples, a potential difference in the plate thickness direction is from 50 mV or more to 200 mV or less. Hence, since the difference is 50 mV or more, a fine corrosion resistance can be obtained.

Numerous additional modifications and variations of the present disclosure are possible in light of the above teachings. It is therefore to be understood that within the scope of the appended claims, the present disclosure may be executed otherwise than as specifically described herein. For example, the heat exchanger is not limited to the above-described various embodiments and may be altered as appropriate. Similarly, the method of manufacturing the heat exchanger is not limited to the above-described various embodiments and may be altered as appropriate.

What is claimed is:

1. An aluminum alloy heat exchanger produced by excluding flux, the heat exchanger comprising:
   a flow channel forming member to form a flow channel in which a fluid flows through;
   a heat transfer member having a heat transfer surface, the heat transfer member joined to a flow channel forming surface of the flow channel forming member, the heat transfer surface wider than the flow channel forming surface;
   a reinforcing member joined to the flow channel forming member to reinforce the flow channel forming member;
   a joining member joined to the reinforcing member;
   a first fillet formed in a first braze joining portion in which the heat transfer member and the flow channel forming member join with each other;
   a second fillet formed in a second braze joining portion in which the flow channel forming member and the reinforcing member join with each other; and
   a third fillet formed in a third braze joining portion in which the reinforcing member and the joining member join with each other,
   wherein the flow channel forming member, the heat transfer member, the reinforcing member and the joining member are composed of aluminum alloys, respectively,
   wherein an average plate thickness of the flow channel forming member is in the range of 0.200 mm or more and 0.600 mm or less, an average plate thickness of the heat transfer member is in the range of 0.025 mm or more and 0.150 mm or less, an average plate thickness of the reinforcing member is in the range of 0.600 mm or more and 2.000 mm or less, and an average plate thickness of the joining member is in the range of 0.600 mm or more and 2.000 mm or less,
   wherein each of the first to third fillets is composed of an aluminum alloy containing magnesium, bismuth, and silicon,
   wherein a concentration of the magnesium of each of the first to third fillets is in the range of 0.2% or more and 2.0% or less by mass,
   wherein at least one of the flow channel forming member and the heat transfer member includes a brazing material layer on a surface thereof,
   wherein when the flow channel forming member includes the brazing material layer, a concentration of magnesium of the flow channel forming member at its plate thickness center is in the range of 0.1% or more and 1.0% or less by mass, and when the heat transfer member includes the brazing material layer, a concentration of magnesium of the heat transfer member at its plate thickness center is in the range of 0.2% or more and 1.0% or less by mass.

2. The aluminum alloy heat exchanger as claimed in claim 1, wherein the concentration of the magnesium of each of the fillets is 0.3% or more by mass and 2.0% or less by mass.

3. The aluminum alloy heat exchanger as claimed in claim 1, wherein the flow channel forming member includes:
   a core material layer; and
   a cladding layer located on one side of the core material layer, the cladding layer excluding brazing material,
   wherein the heat transfer member includes the brazing material layer,
   wherein the cladding layer is joined to the brazing material layer,
   wherein a concentration of magnesium in a surface layer of the cladding layer is lower than the concentration of the magnesium of the flow channel forming member at the plate thickness center thereof.

4. The aluminum alloy heat exchanger as claimed in claim 1, wherein the flow channel forming member includes:
   a core material layer; and
   a cladding layer located on one side of the core material layer, the cladding layer excluding brazing material,
   wherein the heat transfer member includes the brazing material layer,
   wherein the cladding layer is joined to the brazing material layer, wherein the concentration of the magnesium in a surface layer of the cladding layer is in the range of 0% or more and 0.1% or less by mass.

5. The aluminum alloy heat exchanger as claimed in claim 1, wherein one of the flow channel forming member and the heat transfer member includes a core material layer and the brazing material layer, wherein the other one of the flow channel forming member and the heat transfer member includes a bare member, a core member of the bare member being exposed, wherein the brazing material layer and the bare member are joined together, wherein a concentration of magnesium of the other one of the flow channel forming member and the heat transfer member at its plate thickness center is in the range of 0% or more and 0.1% or less by mass.

6. The aluminum alloy heat exchanger as claimed in claim 1, wherein a surface of the flow channel forming member comprises zinc, wherein a potential difference of 50 mV or more is created in the flow channel forming member in a thickness direction of the flow channel forming member.

* * * * *